US 12,263,663 B2

United States Patent
Wardle et al.

(10) Patent No.: US 12,263,663 B2
(45) Date of Patent: Apr. 1, 2025

(54) MULTISCALE COMPOSITE MATERIAL AND METHOD FOR FABRICATION THEREOF

(71) Applicants: Metis Design Corporation, Boston, MA (US); Massachusetts Institute of Technology, Cambridge, MA (US)

(72) Inventors: Brian L. Wardle, Lexington, MA (US); Jeonyoon Lee, Cambridge, MA (US); Estelle Kalfon-Cohen, Chestnut Hill, MA (US); Travis Hank, Cambridge, MA (US); Seth S. Kessler, Newton, MA (US); Shannon M. Cassady, Cambridge, MA (US)

(73) Assignees: Metis Design Corporation, Boston, MA (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/233,249

(22) Filed: Aug. 11, 2023

(65) Prior Publication Data
US 2024/0034047 A1 Feb. 1, 2024

Related U.S. Application Data

(63) Continuation-in-part of application No. PCT/US2022/041519, filed on Aug. 25, 2022.
(Continued)

(51) Int. Cl.
*B32B 37/18* (2006.01)
*B32B 5/02* (2006.01)
(Continued)

(52) U.S. Cl.
CPC ............ *B32B 37/18* (2013.01); *B32B 5/02* (2013.01); *B32B 5/024* (2013.01); *B32B 5/24* (2013.01); *B32B 37/06* (2013.01); *B32B 37/1018* (2013.01); *B32B 2260/023* (2013.01); *B32B 2260/046* (2013.01);
(Continued)

(58) Field of Classification Search
CPC ....... B32B 5/02; B32B 5/24; B32B 2260/023; B32B 2250/42; B32B 2260/046; B32B 2262/02; B32B 2262/0261; B32B 2262/106; B32B 2266/0214; B32B 2266/126; B32B 2305/026; B32B 2305/076; B32B 2305/10; B32B 2309/105; B32B 2309/68; B32B 37/06; B32B 37/1018; B32B 37/18; B32B 5/024; B32B 5/18; B32B 5/245
See application file for complete search history.

(56) References Cited

U.S. PATENT DOCUMENTS

| 6,265,333 B1* | 7/2001 | Dzenis | B32B 5/28 156/276 |
| 2013/0052897 A1* | 2/2013 | Rogers | B32B 27/288 156/182 |

(Continued)

*Primary Examiner* — Hai Vo
(74) *Attorney, Agent, or Firm* — McCarter & English, LLP

(57) ABSTRACT

A multiscale composite materials with few or no void defects are described. The composite materials include a network of porous materials. Methods and systems for the fabrication of the composite materials are generally described. According to certain embodiments, composite materials are fabricated without the use of an autoclave or low pressure environments.

25 Claims, 55 Drawing Sheets

Related U.S. Application Data

(60) Provisional application No. 63/238,507, filed on Aug. 30, 2021.

(51) Int. Cl.
  *B32B 5/24* (2006.01)
  *B32B 37/06* (2006.01)
  *B32B 37/10* (2006.01)

(52) U.S. Cl.
  CPC . *B32B 2262/0261* (2013.01); *B32B 2305/026* (2013.01); *B32B 2305/076* (2013.01); *B32B 2305/10* (2013.01); *B32B 2309/105* (2013.01); *B32B 2309/68* (2013.01)

(56) References Cited

U.S. PATENT DOCUMENTS

| | | | |
|---|---|---|---|
| 2013/0189509 A1* | 7/2013 | Kasuga | B29C 70/086 156/60 |
| 2014/0287641 A1* | 9/2014 | Steiner, III | F41H 5/0471 428/317.1 |
| 2016/0059517 A1* | 3/2016 | Dhakate | D01F 9/10 428/220 |

* cited by examiner

Baseline Hot Plate Cured Specimen:
No NPN

Hot Plate Cured Specimen: 1.5 GSM 8 μm
Polyamide XD10 SILC All 15 Interfaces $P_r$: resin pressure  $P_{cn}$: capillary pressure into the SILC network
$P_v$: gas pressure within an entrapped void  $P_{vn}$: gas pressure inside the SILC network $P_r$: resin pressure  $P_{cn}$: capillary pressure into the SILC network
$P_v$: gas pressure within an entrapped void  $P_{vn}$: gas pressure inside the SILC network 4.5 gsm 23 μm Polyamide 66 SILC
Void Content 0.00%

No SILC Void Content
1.67% ± 0.01%

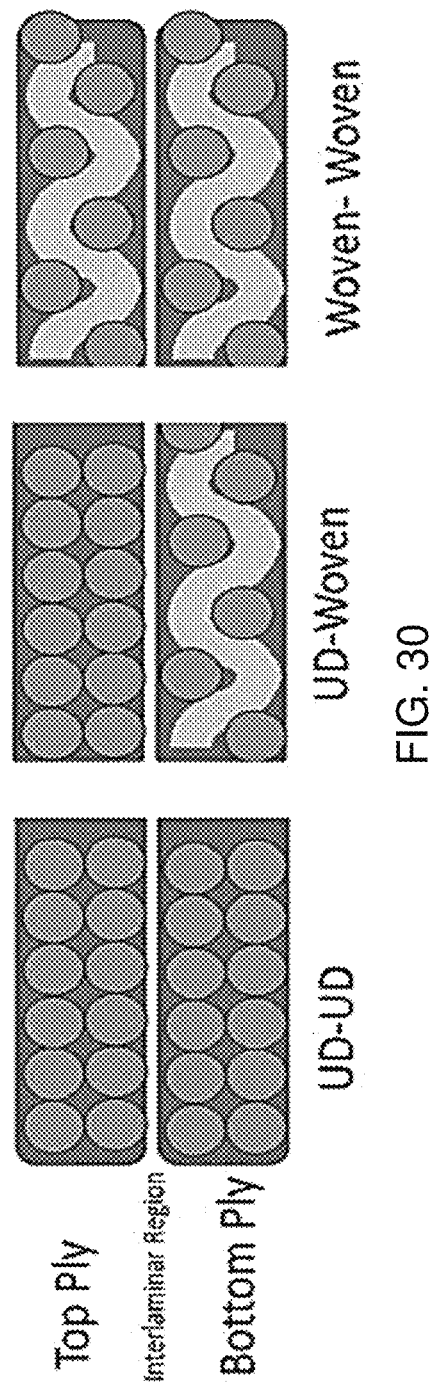

No SILC
Void Content - 5.61%

145μm A-CNT
Void Content - 2.91%

**4.5 gsm 23 μm PA 66
Void Content - 3.67%**

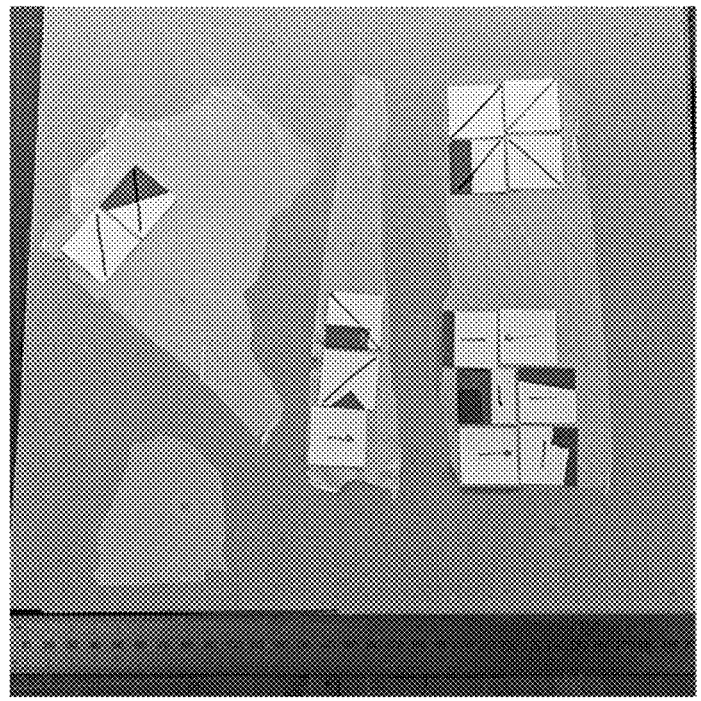
UD plies with 20 µm PI aerogel
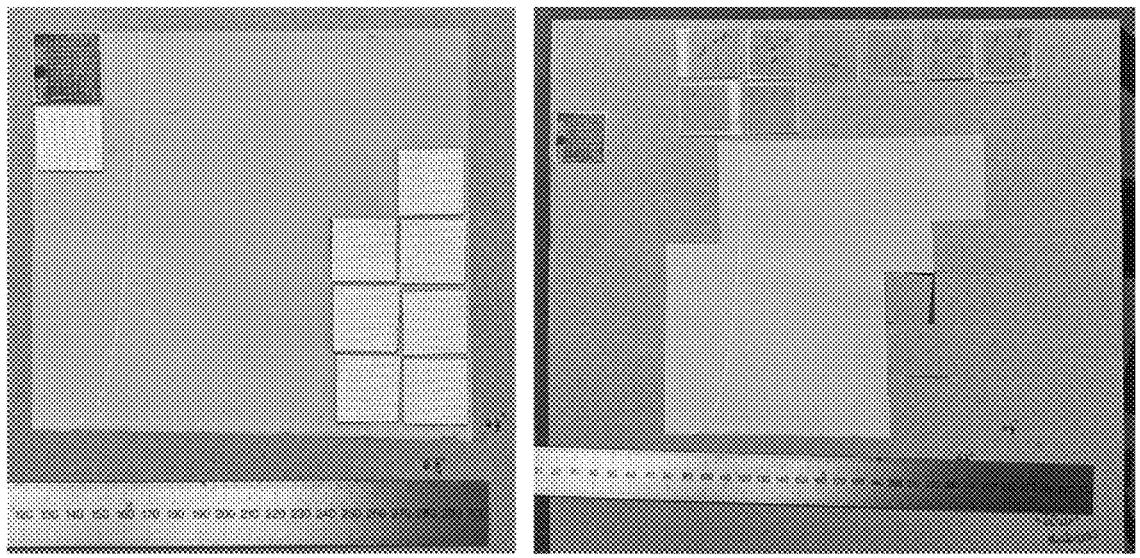
Woven plies with 60 µm PI aerogel
FIG. 41

16-ply QI UD IM7/8552

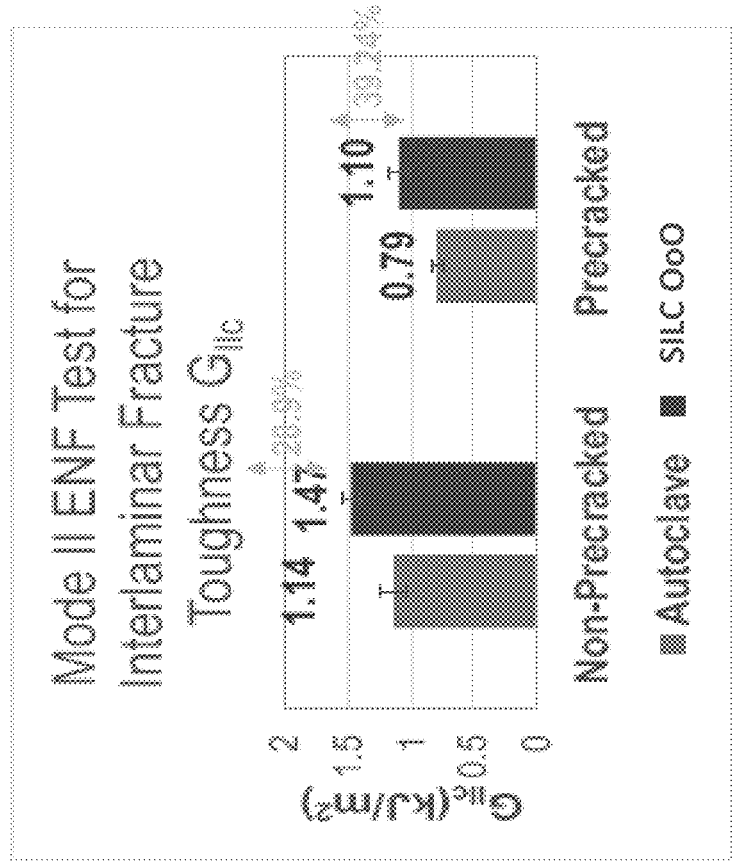
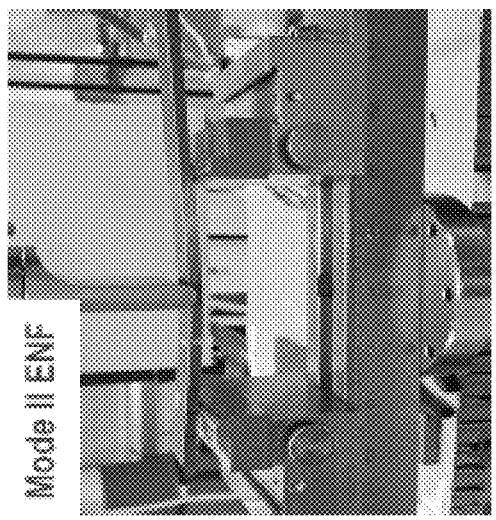
FIG. 50

MULTISCALE COMPOSITE MATERIAL AND METHOD FOR FABRICATION THEREOF

CLAIM OF PRIORITY

This application is a continuation-in-part of International Application No. PCT/US2022/041519 filed Aug. 25, 2022, which claims priority to provisional U.S. Application No. 63/238,507, filed Aug. 30, 2021, which is incorporated by reference in its entirety.

STATEMENT OF FEDERAL GOVERNMENT SUPPORT

This invention was made with Government support under Award No. N68335-20-C-0213 and Award No. N68335-20-C-0590 awarded by the Naval Air Systems Command (NAVAIR). The Government has certain rights in the invention.

FIELD OF THE INVENTION

This invention relates to materials and methods of manufacturing materials.

BACKGROUND

The use of composite materials has grown in industries as diverse as but not limited to wind energy, aerospace, automobile, medical, and civil engineering. Void free composites is a key goal in high grade composite manufacturing as voids cause a severe drop in mechanical properties. As such, lots of time and effort is spent on manufacturing parts with a minimal to no void content and verifying this fact. Defective parts that have voids often have to be scrapped and are deemed unusable. To reduce void quantity, commonly, an autoclave or heated pressure vessel is used. Autoclave based manufacturing techniques are extremely capital intensive, have limited in production rates and part size, have slow cycle time, and require high labor intensity. As composites have expanded their use in industry and make up a larger percentage of the product cost has become a more influential factor.

SUMMARY

In one aspect, a composite can include a matrix including a plurality of fibers, and a porous material adjacent at least a portion of the fibers or the matrix. The composite can be a layered materials, for example, a laminate.

In another aspect, a preform for a composite can include a plurality of fibers, and a porous material adjacent to at least a portion of the fibers. The preform can include a matrix. The matrix can includes a polymer, a metal or a ceramic. The porous material can be adjacent to the matrix.

In another aspect, a method of manufacturing a composite article can include providing a matrix and a preform, applying a reduced pressure to the preform, and heating the preform to densify the preform to the composite article. The matrix can includes a polymer, a metal or a ceramic. The porous material can be adjacent to the polymer matrix. The preform can include a plurality of fibers and a porous material adjacent to at least a portion of the fibers or the polymer matrix.

In certain circumstances, the porous material can be a porous network.

In certain circumstances, the porous material can include a network of capillary pores extending along a horizontal dimension of the composite. The network of capillary pores can be an open pore network with porosity in the vertical dimension and the horizontal dimension of the composite. The porous material can have open porosity.

In certain circumstances, the porous material can be a layer.

In certain circumstances, the porous material can be a mat.

In certain circumstances, the porous material can include an aerogel.

In certain circumstances, porous material can include polymer nanofibers, for example, electrospun nanofibers.

In certain circumstances, the porous material can have a pore size of less than 100 nm, less than 80 nm, less than 60 nm, less than 40 nm, less than 20 nm, less than 10 nm, or less than nm.

In certain circumstances, voids can be present at 1 vol % or greater in the absence of the porous material and voids can be substantially undetectable when the porous material is present.

In certain circumstances, the porous material can have a porosity of at least 70 vol %, at least 75 vol %, at least 80 vol %, at least 85 vol %, at least 90 vol %, at least 95 vol %, or at least 98 vol % prior to incorporation into the composite. For example, an aerogel can have a porosity of at least 99 vol %. In other circumstances, the porous material can have a porosity of at least 50 vol %.

In certain circumstances, the composite or preform can be a laminate. For example, the laminate can be a prepreg.

In certain circumstances, the composite can be a multilayer laminate including two or more layers of the plurality of fibers and matrix with the porous material between neighboring pairs of the two or more layers.

In certain circumstances, the laminate can include layers of unidirectional fibers on unidirectional fibers, unidirectional fibers on woven fibers, or woven fibers on woven fibers, or combinations thereof.

In certain circumstances, the matrix and the porous material can be composed of the same material.

In certain circumstances, heating includes moving a source of the heat laterally across the preform.

In certain circumstances, the preform or composite can include a contoured surface with a bend. For example, the preform or composite can be a complex surface, which can be a surface having multiple curvatures in different directions.

In certain circumstances, at least a portion of the heating does not take place within an autoclave.

In certain circumstances, the composite article can have a volume fraction of porous material of greater than or equal to 0.001.

Unexpectedly, the composite can be substantially free of voids when cured.

Other aspects, embodiments, and features will be apparent from the following description, the drawings, and the claims.

BRIEF DESCRIPTION OF DRAWINGS

FIG. 30 depicts a diagram of the different prepreg morphologies and interfaces of specimens tested.

FIG. 41 depicts forming a composite layup.

FIG. 50 shows a standard end-notched flexure experimental setup per American Society for Testing and Materials (ASTM) D7905 for measuring Mode II Interlaminar Fracture Toughness GIIc.

DETAILED DESCRIPTION

Figure 1:
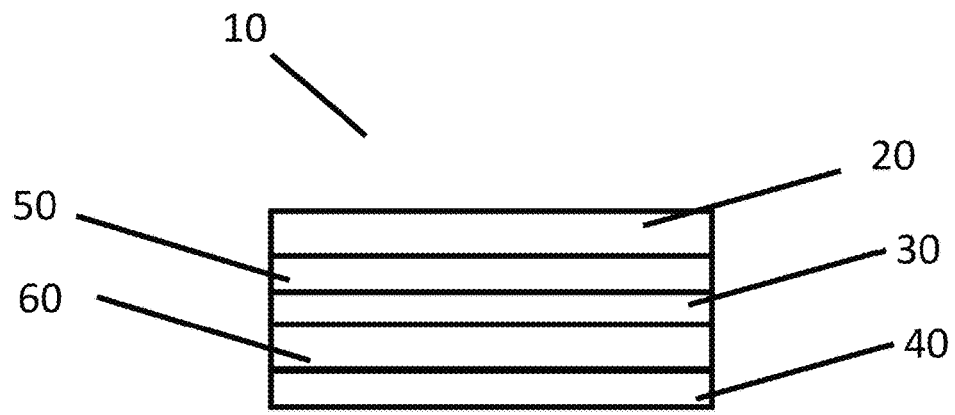
FIG. 1 depicts a schematic of a preform or composite as described herein.

In general, a porous material network based on polymers can be used in layered or laminate structures as a Scaffold for InterLaminar Capillarity (SILC). The SILC forms a framework of supporting elements in a matrix region between fibrous layers that are sized and spaced to promote capillarity. Capillarity refers to the phenomenon in which fluid spontaneously rises or falls in a narrow space such as in the voids of a porous material. The SILC is absorbed into the host matrix during curing of a multilayer laminate through capillary-induced wetting.

A preform can include fibers and an SILC that can be infused with a polymer, such as by infusion or similar process (resin transfer molding (RTM), resin film infusion (RFI), or other method).

Driven by manufacturing challenges, there has been development of a prepreg material system fittingly called Out-of-Autoclave prepreg where the prepreg morphology is changed as dry fiber channels are left in the prepreg enabling gas to evacuate the material system more easily. These materials are designed to cure in an oven and therefore do not have some of the same cost and manufacturing challenges. However, this material system can have many drawbacks. The cycle times may actually be longer due to the time spend debulking or edge-breathing required for low void content, there are surface quality issues for sandwich structures such as honeycomb composite structures, and there are immense challenges in using automation in such layups. These material systems require specific material and environmental parameters and are very sensitive to deviations from ideal conditions with not-full void evacuation being the consequence. Furthermore, the matrix material rheology is often altered from the autoclave standard.

The approach described herein applies various porous material systems, many of them with nanoscale elements, which are applied to interfaces between composite plies to remove voids by encouraging resin infusion. The inclusion of the SILC removes the need for applied autoclave pressure to a composite structure and enables oven-curing of autoclave grade materials, or out-of-oven (OoO) curing using conductive heaters. This can reduce or eliminate the drawbacks of autoclave manufacturing without the need to alter the prepreg material system. By applying a SILC at fibrous ply interfaces, a capillary effect can be induced, which draws the resin into dry areas, collapsing bubbles of trapped air or resin volatiles. Without an SILC in the structure, if a laminate is cured just under vacuum pressure in an oven or on a hot plate significant voids occur. However, when SILC is applied, there are no observable voids. While it is possible to use aligned carbon nanotube (CNT) systems as textured nanostructures with aligned capillaries for interlaminar void removal, more affordable and scalable SILC materials described herein can be efficiently and effectively used to reduce or eliminate the need to apply pressure during curing to avoid formation of voids. See, for example, US 2019/0085138, U.S. application Ser. No. 16/056,745, filed Aug. 7, 2018, which is incorporated by reference in its entirety. A variety of SILC materials, described below, can be used in the systems described herein. Initial investigations (proof-of-concept) focused on a polyimide (PI) aerogel material system (SILC Alternative 1) and a Nylon 66 electrospun nanofiber fiber film system (SILC Alternative 2) as examples. Industry aerogel and electrospun fiber systems are available with various thicknesses, material compositions, and material properties (porosity etc.) that give the SILC composite materials and methods of manufacture described herein scale and affordability, creating an easier path forward for implementation.

For example, tested specimens were laid up in a 16 ply quasi isotropic fashion utilizing carbon fiber reinforced epoxy composite prepreg. The void analysis completed was done primarily via μCT but no voids were found visually after polishing, during microscopy or SEM in samples that underwent those techniques. As described below, the void removal can be most clearly seen in the images where there are clearly no voids in interlaminar layers with the SILC and voids in the interlaminar region without the SILC. The results show full void removal in flat composite material. Voids can also be reduced or substantially eliminated in curved laminate structures. Strength of the interface was assessed for the electospun nylon 66 SILC via short beam shear (SBS) strength (ASTM 2344) with strength maintained. Examples of the technology described herein has been demonstrated on small 1"×1" panel sizes, 6"×6" panel sizes and 60 cm×60 cm panel sizes. The layup process for adding the SILC material is similar to that of prepreg systems and would be feasible for integration into conventional hand layup or automated layup systems. The SILC material described herein has a clear pathway for industrial implementation due to it removing autoclave manufacturing challenges without alteration of material composition and/or morphology.

FIG. 1 features a composite structure 10. Composite structure 10 includes fiber layers 20, 30 and 40. The fiber layers can include a polymer layer. Porous material layer 50 is positioned adjacent to fiber layer 20 and fiber layer 30. Porous material layer 60 is positioned adjacent to fiber layer 30 and fiber layer 40. A matrix can infuse fiber layers 20, 30 and 40 and porous material layers 50 and 60, which can be cured under reduced pressure to form a substantially void-free composite structure. The composite can be a layered materials, for example, a laminate. For example, each layer can be composite, metal, ceramic, polymer, wood or combination thereof. If there is no polymer in adjacent layers, for example, a metal to metal bond, then there can be an adhesive (for example, polymer) layer used to bond them. In this example, the polymer that can infuse the SILC comes from the adhesive and that gets rid of the voids. In this composite, the SILC at an interface can generate layer-to-layer bonding. Each layer can include ceramic or metal precursor materials. The fiber layers 20, 30, and 40 along the with the porous material layers 50 and 60 can be combined as illustrated in FIG. 1 thereby creating a planar hybrid layer. The porous material layers 50 and 60 can include a plurality of structural elements that are separated by pore regions, and can be comprise one or more of fibers, tubes, gels, foam or lattices. The structural elements support one or more porous layers and the pores that form the space or gaps between the structural elements. The structural elements can be referred to as the skeletal portion or frame of the porous layer. The structural elements hold the shape of the layer and enforce the gaps or spaces between the structural elements. In some embodiments, the structural elements are similar to a truss structure where the structural elements are the truss bars and the pores are the area of empty space (air) between those bars. The empty space is then filled with a polymer.

In some embodiments, the structural elements are formed in response to the one or more fibers, tubes, gels, foams, or lattices being combined with organic materials including polymers that are formed from carbon, nitrogen, boron, oxygen, or a covalent organic network. In other embodiments, the structural elements are formed in response to the one or more fibers, tubes, gels, foams, or lattices being combined with inorganic materials including silicon, oxide, nitride, carbide compounds or metals, or a combination of both inorganic and organic materials such a polymer-reinforced inorganic structure.

The structural elements can be grown, printed, moulded, formed, deposited, electrospun, etched, or solvent evaporated. The structural elements can be aligned or arranged in a crystalline pattern presenting well-defined pore sizes arranged in long-scale order, and can be arranged amorphously with a large distribution of pore sizes arranged in a disordered macrostructure. A pore size can be said to be well-defined when the structural elements are distributed in such a way that a crystalline pattern is formed, and the crystalline pattern and spacing between each of the structural elements is defined and repeats over a certain distance.

In certain circumstances, or embodiments, the total thickness of the combined porous material layers 50 and 60, can be less than half of a total thickness of the fiber layers 20, 30, and Still further in other circumstances, or embodiments, the porous material layers 50 and 60 can be microporous in size (e.g., 0.2 nanometer average pore size), mesoporous in size (e.g., 2.50 nanometers average pore size), or macroporous in size (50-1000 nanometer average pore size).

Several planar hybrid layers can be combined or stacked together and a polymer matrix can be cured thereby causing the polymer matrix to bind the layers of the planar hybrid layers to together. In the instant application the word planar can be interpreted to mean that the length and width of the hybrid layer is significantly greater than the thickness of the hybrid layer. In other words, the planar hybrid layer is extremely thin. In some embodiments, the planar hybrid layer can be anywhere between a few centimeters to several meters in length and width, but the planar hybrid layer may be only between a few microns and several millimeters in thickness. For example, in some applications the width and length of the hybrid planar layer can be between at least 10's of centimeters and a few meters in size, and the thickness of the hybrid planar layer can be between 10's of micron and just a couple 100 microns.

In some embodiments the planar hybrid layers can be conductively manufactured on a heated molded tool. The heat molded tool can include a mold that is flat or a complex curved shape that can be heated with two flat plates that have resistive coils coupled to them to heat the tool so that when the polymer is added to the tool it will be molded into the shape of the tool. In some embodiments, the heating method could be conductive curing. In some embodiments, the composite structure 10 can be made in a single sided tool, and the surfaces of the tool can be referred to as the tool surface or bag surface. The bag surface refers to the tool being in contact with a vacuum bag. In some embodiments the mold can be closed, meaning that the composite structure can be molded on both sides separately. As a result, when the molded tool is heated using conductive curing, one or more surfaces of the molded tool can be heated depending on whether the molded tool is open or closed.

In some embodiments, when the polymer is added, it can start out within a fibrous layer (fiber layers 20, 30, or 40) and then can move into and penetrate the porous layers during the curing process. In other embodiments, the polymer can start out in the porous layer and then fill the fibrous layer. Yet still in other embodiments, the polymer can exist as independent layer than penetrates both the porous layer and the fibrous layer. Regardless of where the polymer is positioned relative to the porous layer or fibrous layer, by the end of the curing process, the polymer will penetrate into both the fibrous layer and porous layer.

Figure 2:
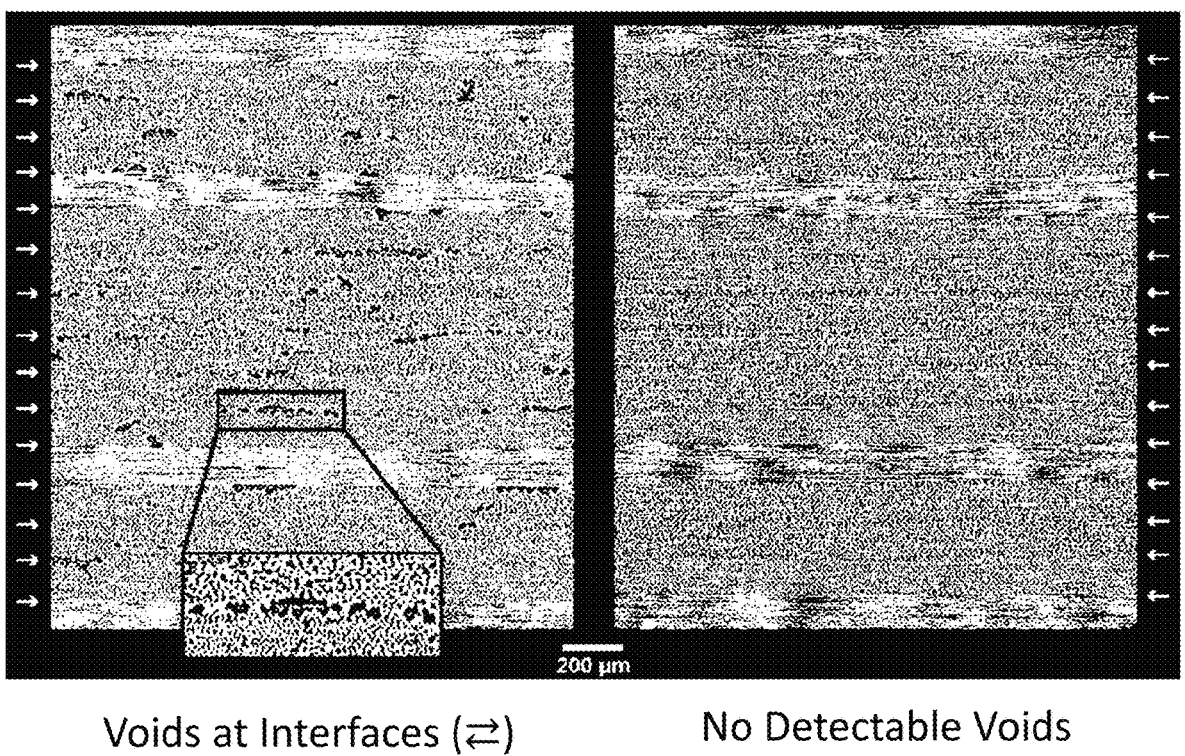
FIG. 2 depicts analysis of composites showing substantially no detectable voids.
Figure 3:
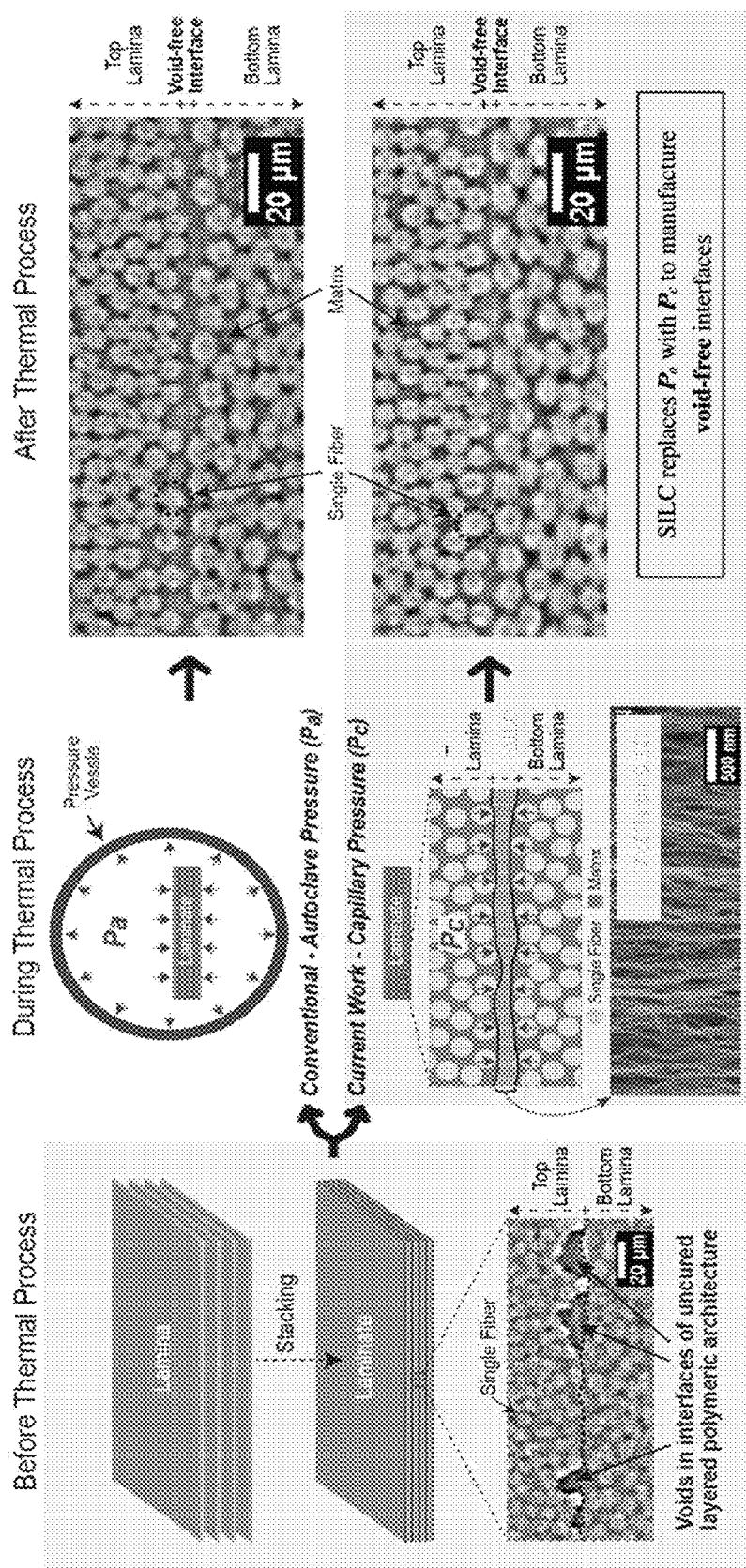
FIG. 3 depicts schematic of steps in a process to form void free composites in the absence of elevated pressure
Figure 4:
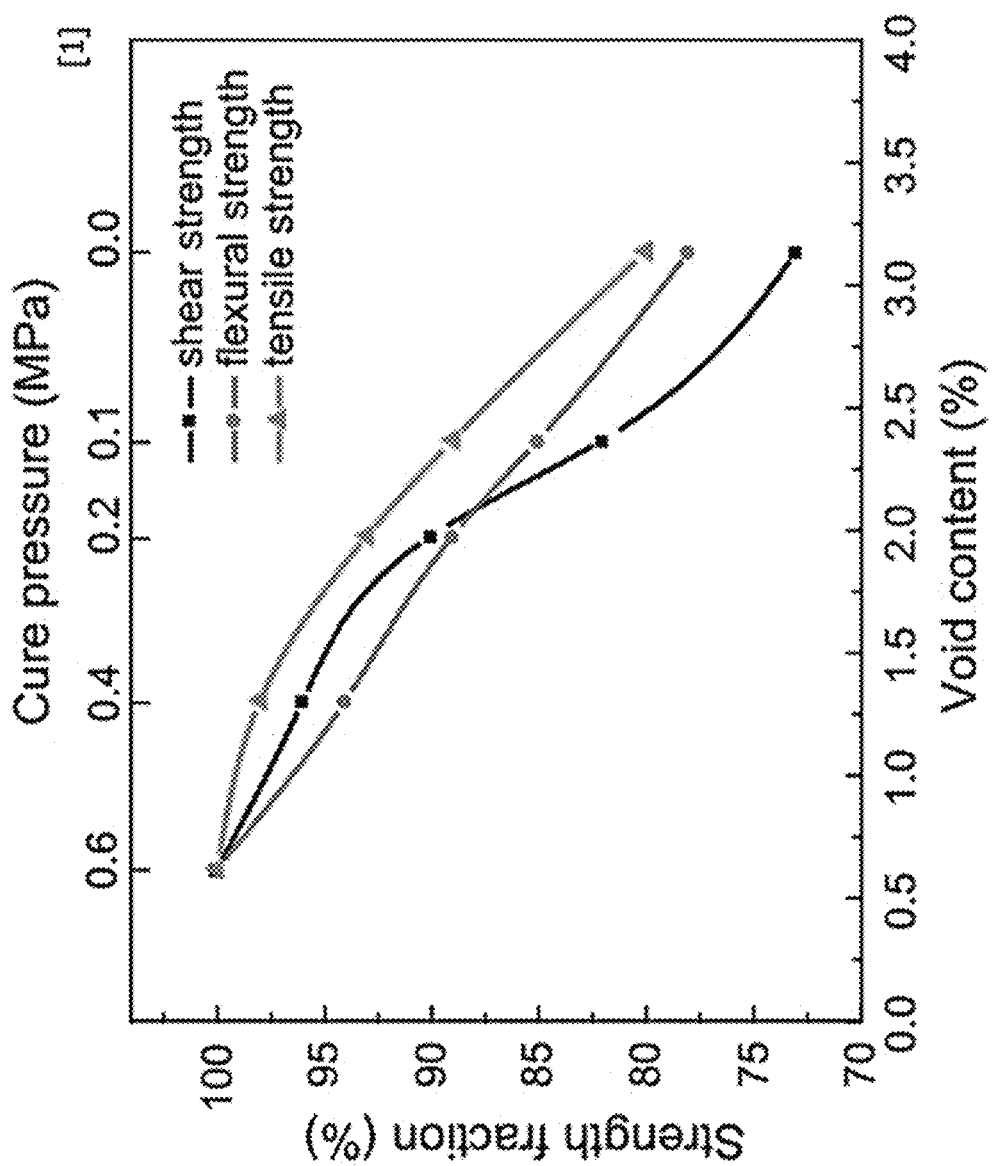
FIG. 4 depicts a graph showing the dependence of strength of laminate composites with void content.
Figure 5:
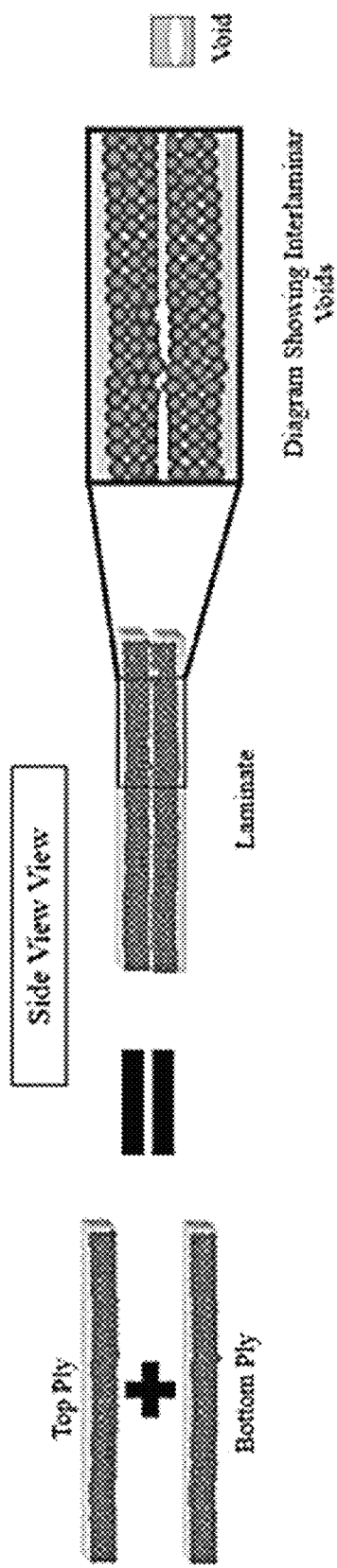
FIG. 5 is a schematic of a carbon microfiber reinforced plastics composite laminate consisting of stacked plies to form a laminate.

Referring to FIG. 2, the composite as described herein uses capillary-pressure enhanced manufacturing to create composites with substantially no detectable voids. In addition to voids being reduced or eliminated, the composite can be substantially the same thickness. In other words, the scale in FIG. 1 is illustrative only. With and without an SILC in FIG. 2, the material can have substantially the same thickness of interlaminar region (and therefore the entire laminate thickness). For example, an interlaminar region can have a thickness of less than 1%, less than 5%, or less than 10% of the and overall laminate thickness. FIG. 3 shows schematic of steps in a process to form void free composites in the absence of elevated pressure. FIG. 4 shows the dependence of strength of laminate composites with void content.

A composite can include a matrix including a plurality of fibers, and a porous material adjacent at least a portion of the fibers. In another example, a preform for a composite can include a plurality of fibers, and a porous material adjacent to at least a portion of the fibers. The preform can include a matrix. The matrix can include a polymer, a metal or a ceramic. The polymer can include, but is not limited to, epoxies (e.g., rubber strengthened epoxy), bis-malemides (BMI), polyesters, vinylesters, polyamides, polyimides, polyarylene sulfides, polyetherimide, polyesterimides, polyarylenes, polysulfones, polyethersulfones, polyphenylene sulfides, polyetherimide, polypropylenes, polyolefins, polyketones, polyetherketones, polyetherketoneketone, polyetheretherketones, and/or polyesters. The metal can include, but is not limited to, aluminum, copper, stainless steel, molybdenum, titanium, or iron. The ceramic can include a metal oxide, a metal nitride or a metal carbide. The matrix can be cured in an autoclave (e.g., convective heating) under a predetermined pressure, temperature, and vacuum, or can be cured using a heated tool (e.g., conductive heating).

The preform can be processed into a composite by creating the matrix around the plurality of fibers and the porous material. For example, a preform is a preliminary structure that is processed into a composite material. As described herein, a method of manufacturing a composite article can include providing a polymer and a preform, applying a reduced pressure to the preform, and heating the preform to densify the preform to the composite article. The preform can include a plurality of fibers and a porous material adjacent to at least a portion of the fibers. In certain examples, the preform or composite can include a contoured surface with a bend, such as an L shape or other sharp curve. For example, the preform or composite can be a complex surface, which can be a surface having multiple curvatures in different directions. In certain examples, the complex surface can be an airfoil or wing, which can have a surface with varying curvature direction and radius of curvature.

In certain circumstances, the polymer matrix and the porous material can be the same composition, for example, the same polymer.

The polymer can be, for example, an organic polymer. In some embodiments, the polymer is a thermoset polymer (e.g., a thermoset resin). In certain embodiments, the polymer is a thermoplastic polymer (e.g., a thermoplastic resin). Examples of suitable polymers include, but are not limited to, epoxies (e.g., rubber strengthened epoxy), bis-malemides (BMI), polyesters, vinylesters, polyamides, polyimides, polyarylene sulfides, polyetherimide, polyesterimides, polyarylenes, polysulfones, polyethersulfones, polyphenylene sulfides, polyetherimide, polypropylenes, polyolefins, polyketones, polyetherketones, polyetherketoneketone, polyetheretherketones, and/or polyesters. In some embodiments, the thermoset material can include epoxy, rubber strengthened epoxy, BMI, PMK-15, polyesters, and/or vinylesters. In certain embodiments, the thermoplastic material can include polyamides, polyimides, polyarylene sulfides, polyetherimides, polyesterimides, polyarylenes, polysulfones, polyethersulfones, polyphenylene sulfides, polyetherimides, polypropylenes, polyolefins, polyketones, polyetherketones, polyetherketoneketone, polyetheretherketones, and/or polyesters. In some embodiments, polymer of the polymer matrix may soften and/or melt during at least a portion of the heating (e.g., the portion of the heating during which the pressure of the environment is reduced). The softening and/or melting of the polymer may cause the polymer to become more compliant and/or less viscous. In certain embodiments, the softening and/or melting of the polymer may reduce the absolute viscosity of the polymer (e.g., from greater than or equal to 1000 Poise, 2000 Poise, 3000 Poise, or greater) to less than or equal to 100 Poise, less than or equal to 50 Poise, less than or equal to 20 Poise, or less than or equal to 10 Poise. In some cases, the softening and/or melting of the polymer may cause the polymer to flow within plurality of fibers and/or through the porous material arranged there between (e.g., into one or more channels or pores present in the porous material). One or both of these effects may cause one or more nanostructures within the porous material to penetrate into the space around the plurality of fibers (e.g., into the polymer(s) therein). In some cases, one or more nanostructures within the porous material may become at least partially embedded in the plurality of fibers (e.g., during a heating step). The embedded porous material and the plurality of fibers may together form a composite article.

As described herein, two components (e.g., a porous material and a plurality of fibers) are directly adjacent when they are adjacent and there is no intervening component positioned between them. Two components that are adjacent may be directly adjacent, or may have one or more intervening components positioned between them (e.g., the plurality of fibers may be adjacent to a second plurality of fibers when the porous material is positioned between the plurality of fibers may be adjacent to a second plurality of fibers). It should also be understood that when a component is referred to as being "adjacent" or "between" another component(s), it may be adjacent or between the entire component(s) or adjacent or between a part of the component(s). For example, the collection of nanostructures may be arranged between the entirety of the plurality of fibers and a second plurality of fibers, may be arranged between a portion of the plurality of fibers and the entirety a second plurality of fibers, or may be arranged between a portion of the plurality of fibers and a portion of the second plurality of fibers.

The porous material can be an object having at least one cross-sectional dimension of less than 20 microns. For example, the porous material can be a porous gel or fiber mat having a thickness of less than 15 microns, less than 10 microns, less than 8 microns or less than 5 microns. In some embodiments, the nanostructure has at least one cross-sectional dimension of less than 500 nm, less than 250 nm, less than 100 nm, less than 75 nm, less than 50 nm, less than nm, less than 10 nm, or, in some cases, less than 1 nm. The solid portion of the porous material described herein may have, in some cases, a maximum cross-sectional dimension of less than 1 micron, less than 500 nm, less than 250 nm, less than 100 nm, less than 75 nm, less than 50 nm, less than 25 nm, less than 10 nm, or, in some cases, less than 1 nm.

In some cases, a porous material may comprise a high volume fraction of nanostructures. For example, the volume fraction of the nanostructures within the porous material may be at least 0.001, at least 0.002, at least 0.005, at least 0.01, at least 0.02, at least 0.05, at least 0.1, at least 0.2, at least 0.4, at least 0.6, at least 0.7, at least 0.75, at least 0.78, or higher. The volume fraction of the nanostructures may be less than or equal to 0.8, less than or equal to 0.78, less than or equal to 0.75, less than or equal to 0.7, less than or equal to 0.6, less than or equal to 0.4, less than or equal to 0.2, less than or equal to 0.1, less than or equal to 0.05, or less than or equal to 0.02. Combinations of the above-referenced ranges are also possible (e.g., at least 0.001 and less than or equal to 0.8). Other ranges are also possible. (Those of ordinary skill in the art would understand that these volume fractions expressed in decimals would be multiplied by 100% to determine percent volume. For example, a component having a volume fraction of 0.8 within an article would make up 80% of the volume of that article.)

In some embodiments, polymers may make up a volume fraction of a porous material prior to a step in which the collection of nanostructures is embedded in a substrate. In certain circumstances, the porous material can have a polymer composition that is the same as the polymer composition of the polymer matrix. For instance, polymers may make up a volume fraction of 0.1, 0.2, 0.3, 0.4, 0.5, 0.6, 0.7, 0.8, or 0.9 of the composition of the composite.

The porous material is a material with an open pore structure. This allows liquid to penetrate the entirety of the porous material. In some embodiments, the porous material can include channels or pores that make up a volume fraction of the porous material prior to a step in which the porous material is surrounded by the polymer matrix, for example, in an embedding step of manufacture. Prior to an embedding step, channels or pores may make up a volume fraction of the collection of nanostructures of less than or equal to 0.999, less than or equal to less than or equal to 0.995, less than or equal to 0.99, less than or equal to 0.98, less than or equal to 0.95, less than or equal to 0.9, less than or equal to 0.8, less than or equal to 0.6, less than or equal to 0.4, less than or equal to 0.3, less than or equal to 0.25, less than or equal to 0.22, or lower. Prior to an embedding step, channels or pores may make up a volume fraction of the collection of nanostructures of greater than or equal to 0.2, greater than or equal to 0.22, greater than or equal to 0.25, greater than or equal to 0.3, greater than or equal to 0.4, greater than or equal to 0.6, greater than or equal to 0.8, greater than or equal to 0.9, greater than or equal to 0.95, greater than or equal to 0.98, greater than or equal to 0.99, greater than or equal to or greater than or equal to 0.998. Combinations of the above-referenced ranges are also possible (e.g., less than or equal to 0.999 and greater than or equal to 0.2). Other ranges are also possible.

The porous material can be a porous network. The porous network can form a sheet, a mat, or layer of material. The mat can be a woven or unwoven mat or fabric. For example, the porous network can be an assembly of nanofibers, polymer nanoparticles, or a porous gel such as an aerogel. The porous network can be made of a polymer as described herein. The porous material can be a layer, sheet or mat. In preferred embodiments, the porous material includes an aerogel or an electrospun nanofiber. For example, the composite can be a multilayer laminate including two or more layers of the plurality of fibers with the porous material between neighboring pairs of the two or more layers.

The composite can be made of material that can also include a non-fibrous layer that includes very thin metal sheets that are relied on for impact protection, or can include a layer of Teflon for erosion protection. In some embodiments, the metal sheets can have a thickness that is within the range between the thickness of the porous layer and the fibrous layer. For instance, the thickness of the metal sheets can be between 2 micron and 200 micron. The metal sheets offer protection from impact, erosion and moisture ingress.

In some embodiments, the composite can also include a layer of non-porous material as well as include very thin metal sheets that are relied on for impact protection, or can include a layer of Teflon for erosion protection as well.

The composite can be a layered structure. The layered structure can have plies or films, which have a ply or film direction and a thickness direction. The ply or film direction can be referred to as a planar dimension, also referred to herein as a horizontal dimension. This dimension description can apply to curved and complex structures. The layered structure can form a curved surface or other complex structure. The porous material can have a porosity in the horizontal dimension. The porous material can have a material in the ply or film direction, or the horizontal dimension.

The porous material can include a nanofiber material such as a polymer nanofiber. Nanofiber materials can have a high surface area to volume ratio, high porosity/tortuosity, and high permeability. Nanofibers can be manufactured using one of several techniques, such as nanolithography, phase separation, self-assembly, electrospinning, melt-blowing, and template synthesis have been used for the production of nanofibers. Electrospinning can be a simple, versatile, and flexible processes for producing nanofibers. For example, electrospun nanofibers can be manufactured using a syringe, a flat tip needle, a high voltage power supply, and a conducting collector. The material can be a solution or melt. Electrospinning is able to fabricate continuous nanofibers from a wide range of materials such as polymers, composites, semiconductors, or ceramics.

The nanofibers can have an average diameter of about 500 nm, 400 nm, 300 nm, 200 nm, 100 nm, 50 nm, 25 nm, 20 nm, 10 nm, 5 nm, or smaller. Examples of suitable polymers for nanofibers, including electrospun nanofibers, include, but are not limited to, epoxies (e.g., rubber strengthened epoxy), bis-malemides (BMI), polyesters, vinylesters, polyamides, polyimides, polyarylene sulfides, polyetherimide, polyesterimides, polyarylenes, polysulfones, polyethersulfones, polyphenylene sulfides, polyetherimide, polypropylenes, polyolefins, polyketones, polyetherketones, polyetherketoneketone, polyetheretherketones, and/or polyesters.

The porous material can include an aerogel. An aerogel can have a very low density, for example, between about 0.001 to about 0.5 g cm$^{-3}$. Aerogel can have high porosity content. The porosity content of an aerogel can be greater than 80%, greater than 90%, greater than 95%, greater than 97%, greater than 98%, greater than 99% or greater than 99.5% by volume. Aerogels can have open porosity (that is, the gas in the aerogel is not trapped inside solid pockets). Aerogels can have average pore diameters of about 1 nanometer, about 10 nm, about 15 nm, about 20 nm, about 30 nm, about 40 nm, about 50 nm, about 60 nm, about 70 nm, about 80 nm, about 90 nm, or about 100 nanometers.

In general, an aerogel can be considered a dry, low-density, porous, solid framework of a gel that can be isolated intact from a liquid component of a gel (the part that makes up most of the volume of the gel). An aerogel can be manufactured by drying a gel, for example, by supercritical drying of a gel. The aerogel can be a monolith, a sheet, or a composite of an aerogel in a matrix material. The aerogel can be a polymer aerogel. Examples of suitable polymers for aerogels, include, but are not limited to, epoxies (e.g., rubber strengthened epoxy), bis-malemides (BMI), polyesters, vinylesters, polyamides, polyimides, polyarylene sulfides, polyetherimide, polyesterimides, polyarylenes, polysulfones, polyethersulfones, polyphenylene sulfides, polyetherimide, polypropylenes, polyolefins, polyketones, polyetherketones, polyetherketoneketone, polyetheretherketones, and/or polyesters.

In certain circumstances, the porous material can have a pore size of less than 100 nm, less than 80 nm, less than 60 nm, less than 40 nm, less than 20 nm, less than 10 nm, or less than 5 nm. Because the porous material is an open cell material, the pores, or other channels are contiguous openings through the bulk of the material.

In certain circumstances, the porous material can have a porosity of at least 70 vol %, at least 75 vol %, at least 80 vol %, at least 85 vol %, or at least 90 vol % prior to incorporation into the composite. In other circumstances, the porous material can have a porosity of at least 50 vol %.

In certain circumstances, the porous material can include a network of capillary pores extending along a horizontal dimension of the composite. For example, when the composite is a multilayer laminate or prepreg, the capillary pores can extend along the planar dimension, also referred to as the horizontal dimension, of the layers of the laminate or prepreg. The capillary pores can be randomly arranged vertically, horizontally, or in both horizontal and vertical directions. The horizontal dimensions of the capillary pores can be a network providing lateral mobility of the materials. This mobility of the materials can improve the final quality of the material when in a bent configuration (for example, an L shape) by reducing or substantially eliminating the creation of voids in the layers of the cured product. For example, each layer is a sheet with long dimensions (usually x-y or curvilinear plane, also referred to herein as a horizontal dimension) and a thickness, usually z-direction (also referred to here as a vertical dimension). The layers are stacked in the thickness or ply direction. The pores in SILC are both vertical (z-direction) and horizontal direction. More than 20%, more than 30%, more than 40%, more than 50%, more than 60%, more than 70%, or more than 80% of the capillary pores can be substantially oriented along a horizontal, or planar, dimension of the composite. Less than 80%, less than 70%, less than 60%, less than 50%, less than 40%, less than 30%, or less than 20% of the capillary pores can be substantially oriented along a vertical, or thickness, dimension of the composite.

As described above, certain embodiments relate to methods of forming composite articles by heating one or more substrates. In some embodiments, one or more of the substrates (e.g., a first substrate and/or a second substrate) comprises a prepreg. As used herein, the term "prepreg" refers to one or more layers of polymer (e.g., thermoset or thermoplastic resin) containing embedded fibers, for example fibers of carbon, glass, silicon carbide, and the like. According to certain embodiments, the prepreg includes fibers that are aligned and/or interlaced (woven or braided). In some embodiments, the prepregs are arranged such the fibers of many layers are not aligned with fibers of other layers, the arrangement being dictated by directional stiffness requirements of the article to be formed. In certain embodiments, the fibers cannot be stretched appreciably longitudinally, and thus, each layer cannot be stretched appreciably in the direction along which its fibers are arranged. Exemplary prepregs include thin-ply prepregs, non-crimp fabric prepregs, TORLON thermoplastic laminate, PEEK (polyether etherketone, Imperial Chemical Industries, PLC, England), PEKK (polyetherketone ketone, DuPont) thermoplastic, T800H/3900 2 thermoset from Toray (Japan), and AS4/3501 6 thermoset from Hercules (Magna, Utah), IMA from Hexcel (Magna, Utah), IM7/M21 from Hexcel (Magna, Utah), IM7/977-3 from Hexcel (Magna, Utah), Cycom 5320-1 from Cytec (Woodland Park. N.J.), and AS4/3501 6 thermoset from Hexcel (Magna, Utah).

As also described above, one or more substrate(s) (e.g., a first substrate and/or a second substrate) may comprise a prepreg that is an autoclave prepreg. As used herein, an autoclave prepreg is a prepreg that is configured to be cured in an autoclave (i.e., it would be believed by one of ordinary skill in the art to have inferior properties if cured outside of an autoclave and/or at a pressure less than 3 bar). One of ordinary skill in the art would be capable of distinguishing autoclave prepregs from other prepregs. Non-limiting examples of autoclave prepregs include certain prepregs manufactured by Hexcel (e.g., part nos. M76, 913, 8551-7, ZM91, M21, 8552, M18, M18/1, 922-1, HT93, 200, M65, F655, 996, 954-3, 954-6, M35-4, M47, and M81), certain prepregs manufactured by Tencate (e.g., part nos. EX-1515, TC410, TC890, BTCy-2, EX-1522, C640, C740, E650, E720, E721-FR, E722, E726, E731, E732, RS-1, E745, E750, RS-17B, RS-3, E760, 8020, RS-51, 8020 Rapi-Ply, 8020-FR, BTCy-1, BTCy-1A, TC380, RS-8HT), certain prepregs manufactured by Cytec Solvay Group (e.g., part nos. CYCOM 381, CYCOM 919, CYCOM 934, CYCOM 950, CYCOM 970, CYCOM 985, CYCOM 997, CYCOM 2237, CYCOM 5216, CYCOM 7668, CYCOM 7701, CYCOM 7714, Avimid RB, CYCOM 5250-4, CYCOM 5250MC, CYCOM 5276-1, CYCOM 7714A, CYCOM 937A, CYCOM 5575-2, CYCOM 950-1, CYCOM 977-2, CYCOM 977-3, CYCOM 985 LV, Avimid N, Avimid R), certain prepregs manufactured by Toray (e.g., part nos. #2500, #2580-14, #2573, #2574, #2592, #3631-2, #3633, #3900-2B), and certain prepregs manufactured by Gurit (e.g., part nos. SC 110(T2), SC 160). Non-limiting examples of prepregs that are not autoclave prepregs include certain prepregs manufactured by Hexcel (e.g., part nos. M56, M26T, M92, M20, HT93, M9.X, M103, M104, M34, M49, M77, M79, 3H04), certain prepregs manufactured by Tencate (e.g., part nos. BT250E-1, BT250E-6, TC250, TC275-1, TC350-1, TC420), certain prepregs manufactured by Cytec Solvay Group (e.g., part nos. CYCOM 6101, CYCOM 5320-1, CYCOM 5215, MTM45-1, MTM44-1), certain prepregs manufactured by Toray (e.g., part nos. #2510, #2511), and certain prepregs manufactured by Gurit (e.g., part nos. SE70, SE84LV, SE 84 Nano, Sparpreg™, WE 91-1, WE 91-2). The lists above should not be taken to be exhaustive; it should be understood that there are numerous autoclave prepregs that are not listed above, and numerous prepregs that are not autoclave prepregs that are not listed above. In some embodiments, one or more substrate(s) (e.g., a first substrate and/or a second substrate, either or both of which may be a prepreg) does not include a channel in the surface that is adjacent to the porous materials. For example, out of autoclave prepregs generally include channels in their surfaces that allow for the transport of gas (e.g., air) away from the surface that is being bonded. In some embodiments, layers of fibers in prepregs or laminates can be free of such channels. In some such embodiments, layers of fibers in prepregs or laminates are free of such channels at their interface surfaces while still forming a strong, low-void bond between each other.

In certain circumstances, the composite or preform can be a laminate. For example, the laminate can be a prepreg. The prepreg or laminate can have 2, 3, 4, 5, 6, 7, 8, 9, 11, 12, 13, 14, 15, 16, 17, 18, 19 or 20 layers. The prepreg or laminate can include layers of unidirectional fibers on unidirectional fibers, unidirectional fibers on woven fibers, or woven fibers on woven fibers, or combinations thereof.

Polymers may make up any suitable volume fraction of a porous material after a step in which the porous material becomes at least partially embedded in the plurality of fibers. After the porous material becomes at least partially embedded in the plurality of fibers, polymers may make up a volume fraction of the porous material that is complementary to the volume fraction of nanostructures in the porous material prior to a step in which the porous material has become embedded in the plurality of fibers. In other words, the porous material may include mainly nanostructures and polymer after the nanostructures have become embedded in the plurality of fibers. After an embedding step, polymers may make up a volume fraction of the porous material of less than or equal to 0.999, less than or equal to 0.998, less than or equal to 0.995, less than or equal to 0.99, less than or equal to 0.98, less than or equal to 0.95, less than or equal to 0.9, less than or equal to 0.8, less than or equal to 0.6, less than or equal to 0.4, less than or equal to 0.3, less than or equal to 0.25, less than or equal to 0.22, or lower. After an embedding step, polymers may make up a volume fraction of the porous material of greater than or equal to 0.2, greater than or equal to 0.22, greater than or equal to 0.25, greater than or equal to 0.3, greater than or equal to 0.4, greater than or equal to 0.6, greater than or equal to 0.8, greater than or equal to 0.9, greater than or equal to 0.95, greater than or equal to 0.98, greater than or equal to 0.99, greater than or equal to 0.995, or greater than or equal to 0.998. Combinations of the above-referenced ranges are also possible (e.g., less than or equal to 0.999 and greater than or equal to 0.2). Other ranges are also possible.

The suitable porous material may have a size and/or arrangement, as described in further detail below, which promotes capillary flow such that the polymer matrix surrounds the plurality of fibers and the porous material. The capillary forces may cause the polymer to flow through porous material via channels or pores or combinations thereof. The channels may also provide a direction along which any gas or other trapped material can escape. In some embodiments, the flow may be in a relatively uniform direction, which may promote relatively even filling of the channels. In certain cases, the embedded nanostructures may have a morphology that exerts sufficiently strong capillary forces on the polymer so that the channels may be completely (or almost completely) filled when capillary forces make up a relatively large percentage of the total force the polymer is subject to. For example, in some cases adjacent layers of fibers can be joined together with relatively few voids without supplying external pressure during manufacture. In certain embodiments, reduced pressure or vacuum can be applied.

In certain embodiments, the method comprises locally heating the preform. For example, in some embodiments, the preform is not located within an autoclave or any other type of oven during the heating process. In some embodiments, vacuum bag curing is employed (e.g., in which the first substrate and the second substrate are located within a vacuum bag during the heating process). In some embodiments, less than 30% (or less than 20%, less than 10%, less than 5%, or less) of the energy used to heat the first substrate and the second substrate is transferred to the substrates via convective heat transfer.

It is believed that the porous material may provide one or more advantages. For example, when certain portions of the porous material become embedded sequentially, relatively few or substantially no voids may be present at the conclusion of the embedding process. Any voids that form as a given portion of the porous material becomes embedded may be formed around the edges of the embedded portions. As these portions then become heated and the nanostructures therein become embedded in the fibers, the voids (if any) may move towards the edges of newly embedded portions. If this process continues throughout the embedding process, any voids formed during embedding may move to the last portion(s) of the substrate(s) into which the porous material becomes embedded. If these portions are on one or more edges and/or corners of the fibers, the voids may be eliminated through the edges and/or corners of the fibers when the embedding concludes. By contrast, if the preform is heated uniformly, the porous material may become embedded in the fibers in a random and/or non-uniform manner. Voids may form at any and/or multiple location(s) within the substrate(s), and may become trapped if there is not a pathway for their escape.

Through this approach, interlaminar and intralaminar voids can be present at 1 vol % or greater in the absence of the porous material and voids can be substantially undetectable when the porous material is present. One test for comparing structures with and without voids can be to construct an article with and without the porous material and comparing the occurrence of voids, for example, by the optical techniques or x-ray computed tomography, or methods described herein. In other words, the porous material contributes to the reduction or elimination of voids in the composite material when manufactured at atmospheric pressure or reduced pressure. The SILC can reduce or eliminate voids in the interlaminar region of the composite. The SILC can impact voices in the intralaminar region of the composite by gas diffusion or physical connection of spaces prior to densification.

In certain embodiments, the reduction or elimination of voids using SILC structures can be at a curve or other non-planar portion of the composite structure. For example, a non-planar section can have an arc or a radius of curvature that can be measured, such as a bend, 90 degree angle, an L-shape, or another angled shape. The SILC can reduce or eliminate voids at a bend, 90 degree angle, an L-shape, or other angled shape of the composite.

Certain methods described herein may comprise one or more steps in which one or more substrate(s) are heated. The substrate(s) may be heated to any suitable temperature. In some embodiments, the substrate(s) may be heated to a temperature of less than or equal to 1200° C., less than or equal to 1000° C., less than or equal to 750° C., less than or equal to 500° C., less than or equal to 400° C., less than or equal to 300° C., or less than or equal to 200° C., less than or equal to 100° C. In some embodiments, the substrate(s) may be heated to a temperature of greater than or equal to 25° C., greater than or equal to 100° C., greater than or equal to 200° C., greater than or equal to 300° C., greater than or equal to 400° C., greater than or equal to 500° C., or greater than or equal to 750° C. Combinations of the above-referenced ranges are also possible (e.g., greater than or equal to 25° C. and less than or equal to 1000° C., or greater than or equal to 25° C. and less than or equal to 1200° C.). Other ranges are also possible.

In some embodiments, one or more substrate(s) may comprise a polymer that softens and/or melts during at least a portion of a heating step. In some embodiments, the polymer may soften and/or melt (e.g., experience a reduction in absolute viscosity to less than or equal to 100 Poise) at a temperature of less than or equal to 350° C., less than or equal to 300° C., less than or equal to 250° C., less than or equal to 200° C., less than or equal to 150° C., less than or equal to 110° C., less than or equal to 100° C., less than or equal to 90° C., less than or equal to 80° C., or less than or equal to 70° C. The polymer may soften and/or melt at a temperature of greater than or equal to 60° C., greater than or equal to 70° C., greater than or equal to 80° C., greater than or equal to 90° C., greater than or equal to 100° C., greater than or equal to 110° C., greater than or equal to 150° C., greater than or equal to 200° C., greater than or equal to 250° C., or greater than or equal to 300° C. Combinations of the above-referenced ranges are also possible (e.g., greater than or equal to 60° C. and less than or equal to 350° C., or greater than or equal to 60° C. and less than or equal to 110° C.). Other ranges are also possible.

As described above, certain embodiments relate to methods for forming composite articles. The composite articles formed by these methods may have one or more advantageous properties. For example, the composite articles may have a relatively small number voids. In some embodiments, the percentage of the composite article occupied by voids may be less than or equal to 10%, less than or equal to 5%, less than or equal to 2%, less than or equal to 1%, less than or equal to 0.5%, or less than or equal to 0.2%. The percentage of the composite article occupied by voids may be greater than or equal to 0.1%, greater than or equal to 0.2%, greater than or equal to 0.5%, greater than or equal to 1%, greater than or equal to 2%, or greater than or equal to 5%. Combinations of the above-referenced ranges are also possible (e.g., greater than or equal to 0.1% and less than or equal to 5%, greater than or equal to 0.1% and less than or equal to 2%, or greater than or equal to 0.1% and less than or equal to 10%). Other ranges are also possible. The percentage of the composite article occupied by voids may be determined by analyzing computerized X-ray tomography images. Briefly, three dimensional computerized X-ray tomography images are taken of the composite and voids in the images are identified by image processing software.

Electrospun Polymer Nanofiber (EPN) Films

Electrospun polymer nanofibers (EPNs) are a material class that has a multitude of industrial usages from biomedical applications, such as tissue engineering, to functional structural materials such as filtration or composite reinforcement. The nanofiber mats or films are manufactured by a high voltage electric force drawing charged threads of polymer solution. The high voltage is applied to the liquid droplet, charging it, and electrostatic forces stretch the droplet counteracting the surface tension. The liquid dries as it is deposited on the surface. This process enables nanometer-scale polymer fibers to be created. The fibers, when collected on a surface, form veils, mats, or films. The fiber morphological properties can be tuned by the polymer characteristics including surface tension and viscosity, the process parameters including voltage, federate capillary diameter, and shape, as well as environmental conditions including pressure, temperature, and humidity. The thickness of the film is altered by how fast the deposit surface is removed. Thermoplastic materials are typically used as there is a good bond between the fibers and matrix for composite applications which facilitates improved fracture toughness. When utilizing thermoset resins for the EPN, there is less improvement in fracture toughness. A popular EPN used is polyamide (PA) which is known commercially as Nylon. Polyamide is inexpensive, has relatively good mechanical properties in bulk and as individual nanofibers, a high melting temperature (compared to thermoset matrix cure temperatures), and is easily dissolved in a wide range of solvents. By having the melting temperature higher than cure temperature, when the CFRP laminate cures, the nanofibers in the EPN film maintain their shape and therefore can be used for reinforcement.

EPN films are used for mechanical reinforcement of glass and carbon reinforced polymer composites. The EPN films are used due to their ability to be manufactured in thin film only a few microns thick, their low density, their high porosity enabling-resin infiltration, and low volume. The low volume enables low interlaminar thickness changes of only a few percent, as the material is additionally compressed when pressure is applied to the laminate during curing, helping minimize the interlaminar thickness. Additionally, the high surface area promotes good bonding.

EPNs, when placed in the interlaminar region as an interlayer have been shown to improve mechanical properties including Mode I, Mode II interlaminar fracture toughness, compression after impact fatigue resistance, and vibrational damping. 1.5 gsm polyimide 66 was shown to improve Mode II critical strain energy release rate by 29%. The planar porous layers also improve interlaminar strength in addition interlaminar fracture toughness. Interlaminar strength can be defined as when a material is pulled apart in one of 3 directions (x, y, z) and interlaminar toughness can be defined as when the material is being peeling apart in one of 3 ways (usually called Mode I, II and III).

Thermosetting resins like epoxy tend to be brittle materials with little resistance to crack propagation. During delamination failure modes, cracks propagate through the matrix material. Two options to help address this are toughening the matrix with the addition of particles and inserting nanofiber mats as in the ply-ply interlayer. The nanofiber mat was seen to encourage nanofiber bridging, resin reinforcement, and crack path modification Toughening particles increase resin viscosity which can increase void content when curing in vacuum-bag-only conditions with OoA prepreg systems, but are a more common technology as they are included in the surface in CFRP prepreg in several aerospace autoclave CFRP systems in production of primary structures.

Figure 6A:
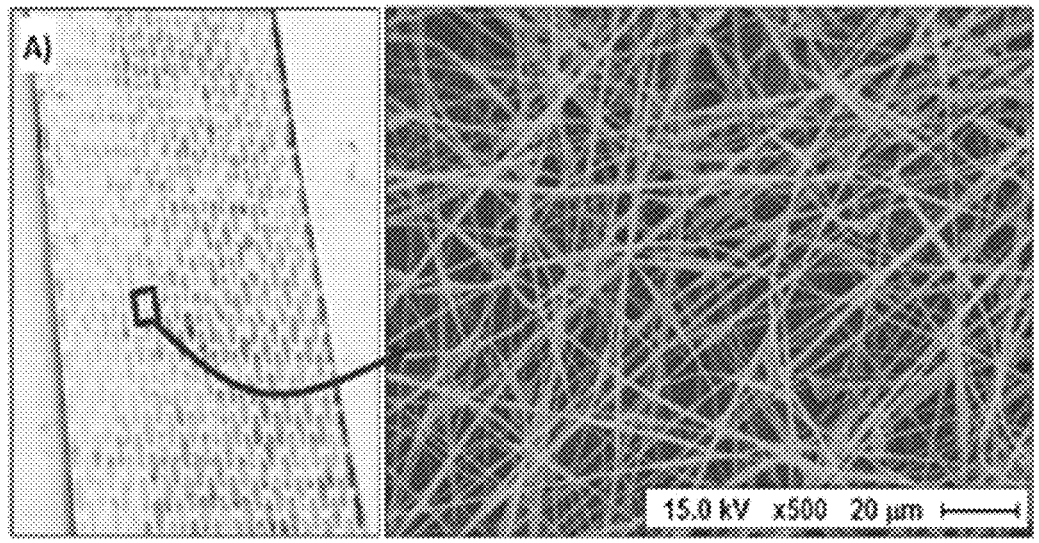
FIGS. 6A-6B depict micrographs of EPN films on a prepreg.
Figure 6B:
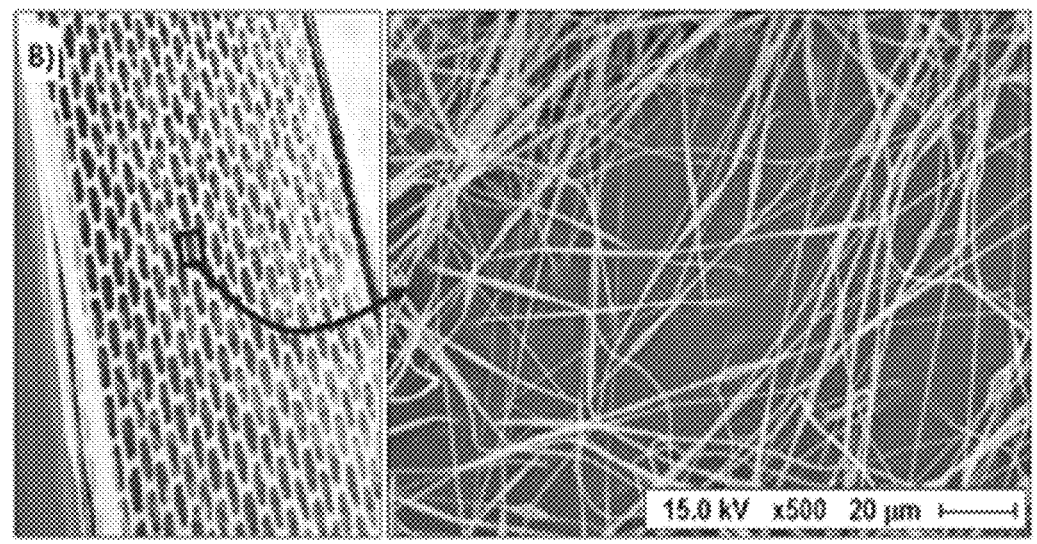

FIGS. 6A-6B represent micrographs of EPN films on a prepreg. FIG. 6A shows an initial layup and FIG. 6B shows the layup after a few minutes for due to resin infiltration.

Polymer Aerogel Material

Aerogels are a class of micro porous solids where the dispersed phase is a gas. They have ultra-low densities, large surface areas, high porosity, low values of thermal conductivity and form three dimensional solid networks that can be highly cross linked. They are often formed by supercritical drying to avoid structural collapse during manufacturing and have an air volume of 80-99%. Their large surface areas and porosity (pores are 1-100 nm) make them good candidates as SILCs for polymer composites. Aerogels can be made out of a variety of materials including CNTs, graphene, polymers, chalcogenides, silica, etc. The aerogel can be compressible. For example the thickness of an aerogel sheet can be compressed by two times, three, time, four times, five times, or more. Traditional silica aerogel nanocomposites have been attempted. However, their properties were lost when polymer was mixed into the aerogel. When a carbon aerogel was integrated into the matrix system of a CFRP laminate, modulus, strength, and interfacial properties increased. Mode I tests with a carbon 0.1 wt % aerogel showed delamination fraction energy increase from 265 J m$^{-2}$ to 346 J m$^{-2}$. The delamination fracture energy caused by Mode II loading was increased from 655 J m$^{-2}$ for the unmodified laminate to 1088 J m$^{-2}$ for laminate modified with 0.5 wt % aerogel. Aerogels form three dimensional hierarchical morphologies with large surface areas, porosities, and have ultra-low densities with some demonstrated reinforcement properties. Polymer aerogels are exemplified herein.

Composites can typically be categorized into three categories: flat panels, sandwich structures and complex geometries. Complex geometries are commonly used as stiffeners or to attach composite flat panels together, but also includes geometries comprised of single- and multiple complex curvatures such as shells, such as in a wing, fuselage, or pressure vessel. Stiffer cross sections come in various shapes. L, T, J, and hat shaped are most common and can be seen in FIG. 7. Manufacturing defects, in particular fiber wrinkling leading to void formation, are common in these types of parts around the curved section. When the part is put under load the complex section then develops a high stress concentration around the defect which leads to the laminate's failure. This reduces service life and leads to a decrease in the mechanical properties. The elimination of such manufacturing defects in the complex section leads to higher and longer performance before laminate failure.

Figure 7:
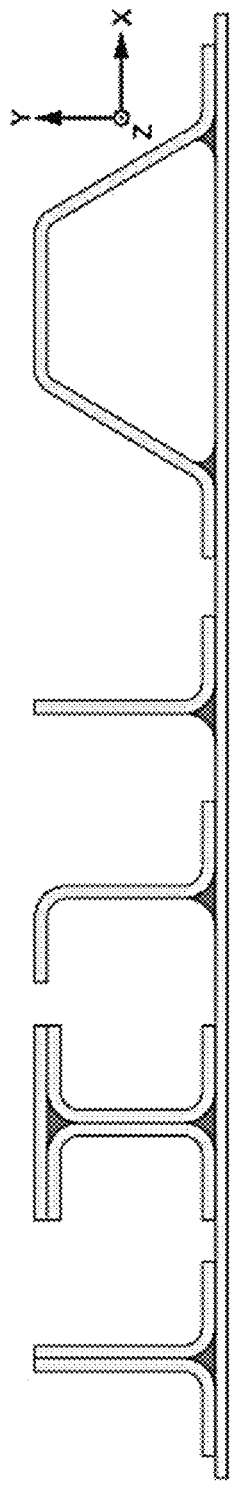
FIG. 7 depicts common complex geometries with corner fillers.

FIG. 7 shows cross-sections of common complex geometries, T, I, Z, L, and hat shaped stiffeners with corner fillers.

Vacuum-bag-only (VBO) Composite Manufacturing of Unidirectional Autoclave-grade Prepreg Using Capillary Effects SILC While traditionally aerospace-grade composites are cured with capital- and operational-intensive thermal pressure vessels or autoclaves, a next generation processing technique, where voids are evacuated from a composite laminate, not by external pressure but by capillary pressure, is presented utilizing polymer based SILC. The technique enables conduction or convection vacuum-bag-only (VBO) curing of traditional autoclave-grade prepreg material systems, and as discussed above, has been demonstrated using a conduction cure with aligned carbon nanotubes (A-CNTs) as SILC in a lab scale environment. Utilizing autoclave-grade prepreg systems enables a diverse selection of certified and widely studied materials to be manufactured in vacuum-bag-only conditions. These traditional materials do not contain morphology or polymer rheology modifications that comprise out-of-autoclave (OoA) prepreg systems, which are limited in the number of certified materials due to the additional testing required that costs millions of dollars and spans 15-20 years to complete. This description demonstrates a technique utilizing two SILC material systems: commercial electrospun polymer nanofiber (EPN) films with polyamide (PA) nanofibers and a bespoke polyimide (PI) aerogel, both having commercial scale capabilities. These polymer-based SILC systems have different morphologies and manufacturing techniques. The EPN material group utilizes two different polyamide variants: common PA 66 (Nylon 66), and PA XD10 (Lexter®), the latter of which is a thermoplastic bio-inspired polyamide resin developed by Mitsubishi Gas and Chemical Company. The XD10 resin, 8000 variant, has a melting point of 190° C., a bending modulus of 3.2 GPa, bending strength of 136 MPa, density of 1.13 g/cm 3, and saturated water gain of 2.4%. μCT images show interlaminar void elimination when the SILC systems are applied to the interlaminar region as an interlayer while an autoclave-grade prepreg laminate is cured under VBO conditions. Presented is the manufacturing process of the SILC applied composites, SEM images and characterization of the SILC, void content of the cured composites, mechanical testing of specimens made with the electrospun polyamide SILCs, and an interlaminar region thickness analysis. Results were compared to laminates cured via VBO without SILC interlayers and to autoclave-processed composites as a baseline for the same material system. The alternative-SILC polymer materials and the SILC approach shows great capability as the SILC material system can be transferred directly to a prepreg before layup, or likely applied in an automated layup capable manner, thereby enabling practical autoclave-less curing of autoclave-grade prepreg.

General Composite Manufacturing Process

Figure 10:
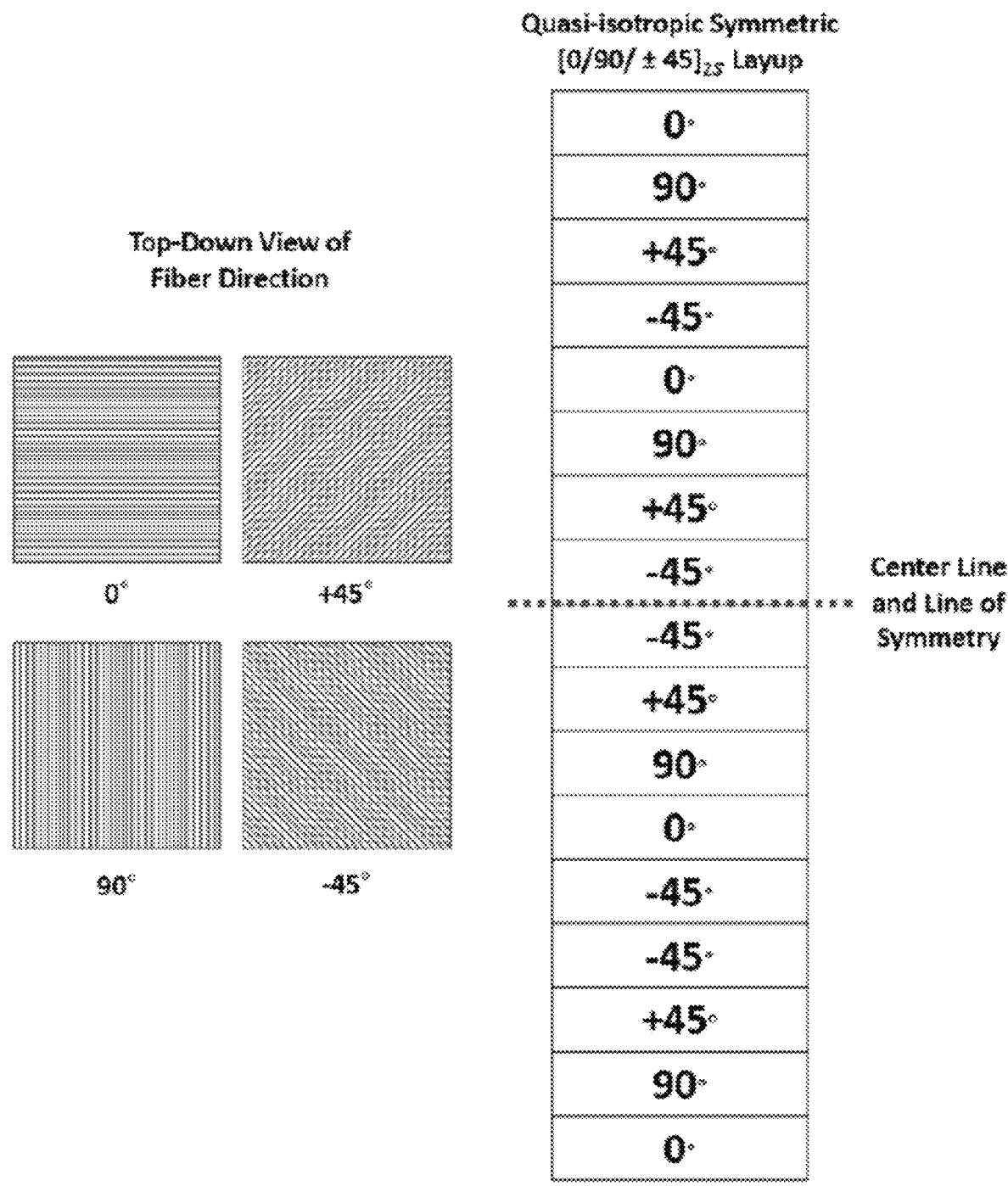
FIG. 10 depicts schematic of a ply orientation and layup.

The work presented herein utilizes unidirectional (UD) IM7/8552 which is an aerospace-grade carbon fiber prepreg designed to be cured with applied pressure under vacuum. It has a nominal cured ply thickness of 0.131 mm. The target fiber volume fraction is 57.7 vol % with a fiber density of 1.77 g/cm 3. Driven by the short beam shear standard, ASTM D2344, which utilizes a nominal 2 mm thickness, a 16-ply quasi-isotropic layup of [0/90/±45]$_{s2}$ was used, giving a nominal thickness of 2.10 mm. The stacking sequence is seen in FIG. 10.

The plies were cut to the desired specimen dimension. The first ply had its protective film removed and placed on a sheet of peel ply material in its desired orientation. A roller was then used to push firmly against the material before the backing sheet was removed. When an interface is to receive a SILC interlayer, the SILC was applied following the developed method: the SILC was cut larger than the specimen by 5 mm on each side, placed on the laminate, rolled firmly, and its backing paper removed. The oversized cut of SILC ensures full edge to edge coverage of the laminate. The process was repeated, ply-on-ply or ply-on-SILC, as determined by the stacking sequence and the desired SILC locations. After the last ply was placed, the edges were trimmed to ensure breathability (a common practice for OoA prepreg as well) and bagging materials were added to complete the vacuum bag layup process.

The bagging materials used include: guaranteed nonporous Teflon (GNPT) film (Airtech Release Ease 234 TFNP), breather (Airtech Release Ease 234 TFNP), 1 mm thick aluminum caul plate, 2.5 mm thick fiberglass plate, and a 2.25 mm tall cork dam. GNPT film was utilized as a base layer to prevent any resin that would bleed through the peel ply from attaching to either the hot plate or the caul plate. A caul plate on the laminate and an additional fiberglass plate (placed on top of the caul plate to make certain the bagging stacking sequence was higher than the cork dam) ensured that an even atmosphere pressure was exerted on the laminate (due to the setup being under vacuum). The cork dam prevents a pinching of laminate edges so as to make edges breathable while preventing resin bleed and the breather ensures vacuum is pulled from across the whole bag layup area, preventing a pinch in the bag from occurring, which would limit a uniform vacuum pull of the bagged area. These additional materials were added according to FIG. 8 based on manufacturer recommendations.

Figure 8:
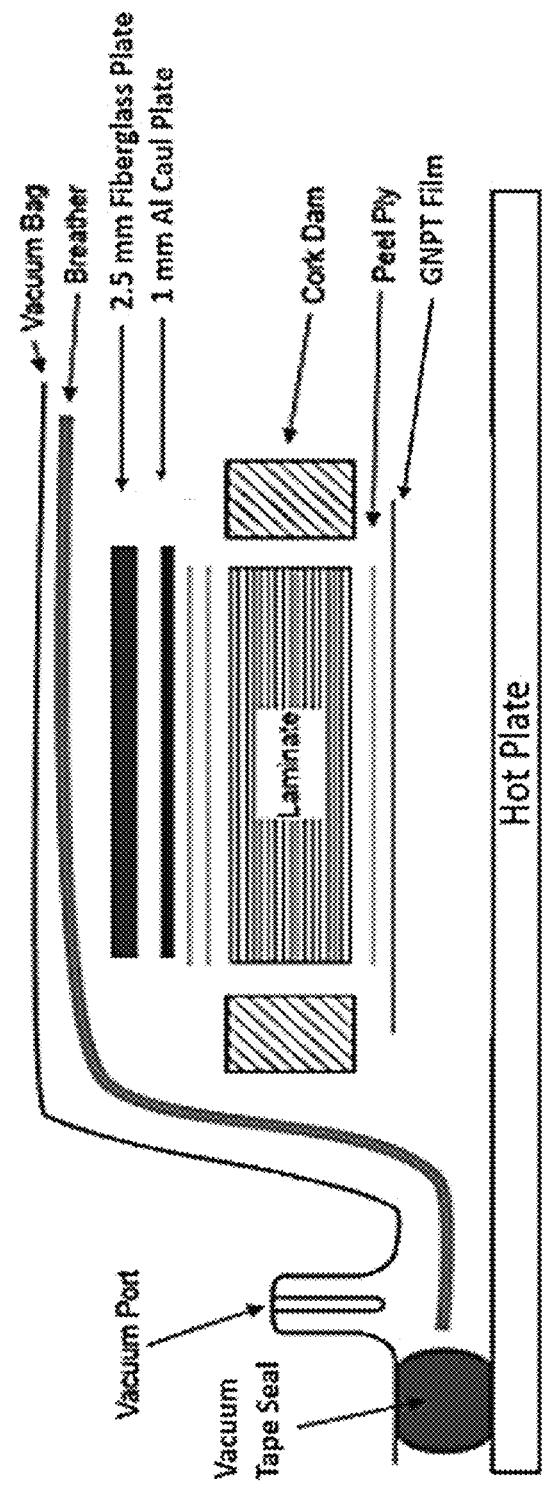
FIG. 8 depicts a vacuum bag layup diagram showing material and stacking sequence.

FIG. 8 shows a vacuum bag layup diagram showing material and stacking sequence.

A programmable hot plate (Torey Pines EchoTherm HS60A) was utilized as the thermal element for the flat plate VBO curing. The sample underwent a 180-minute (3 hr.) debulk at room temperature before the VBO cure cycle shown in FIG. 9. The cure cycle was ramp to temperature of 110° C. at 2° C. per minute with a hold time of 60 minute (1 hr.), ramp to a post cure temperature of 180° C. at 2° C. per minute with a hold of 120 minute (2 hr.), and then cool at 2-5° C. per minute. Vacuum of −1 bar was pulled throughout the cure with no applied pressure. The VBO cure cycle can be seen in FIG. 9 compared to the autoclave cure-manufacturer recommended cure cycle (MRCC).

Figure 9:
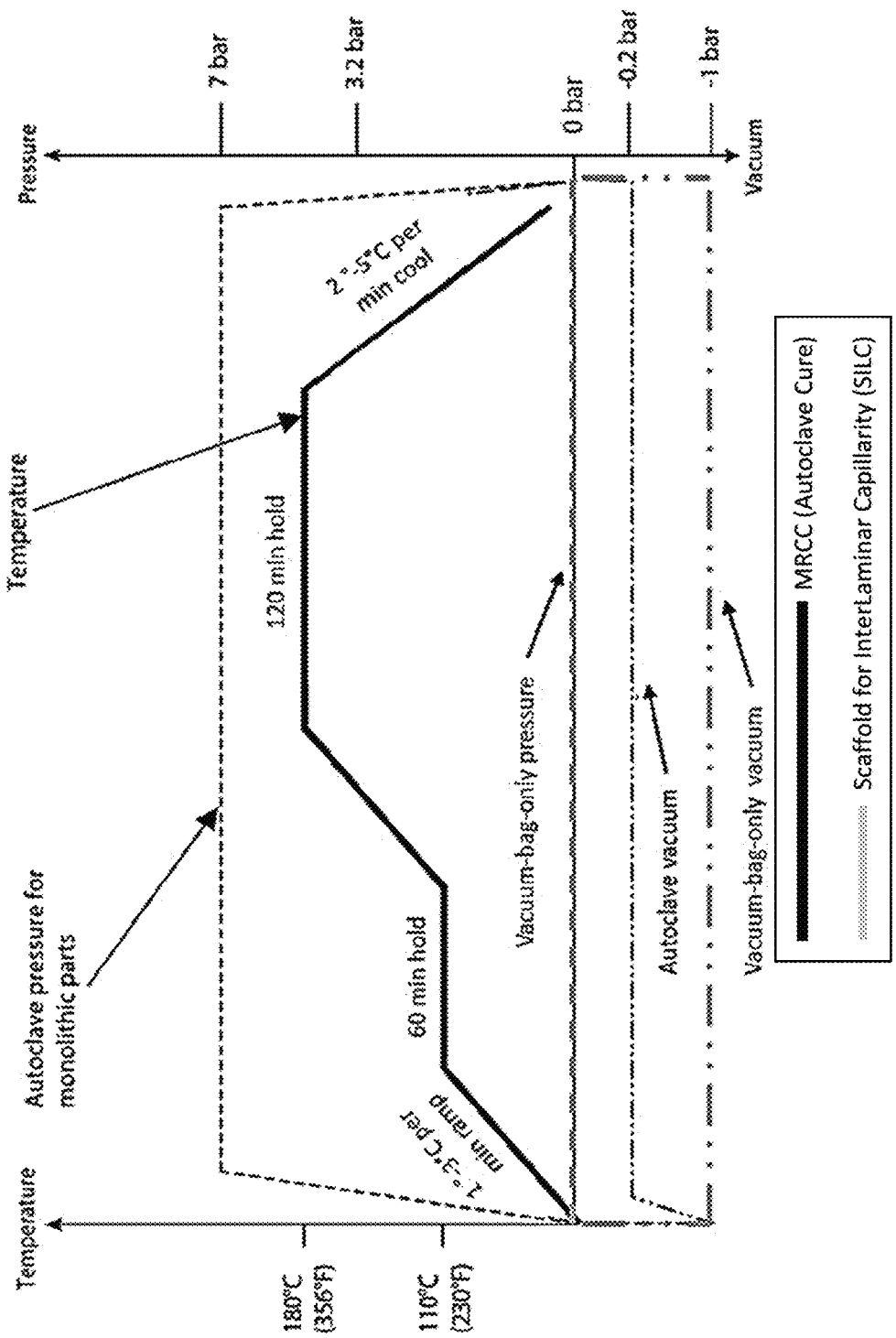
FIG. 9 depicts a manufacturer recommended cure cycle.

FIG. 9 shows a Hexply 8552 manufacturer recommended cure cycle (MRCC), and VBOx cure cycle used in this work for SILC studies. The temperature profile follows the MRCC, but with −1 bar vacuum and no applied pressure (dashed lines) throughout the cure.

Polymer Nanofiber Diameter Analysis

The electrospun nanofibers' diameters were analyzed using taken top-down SEM images of the nanofibers and the open-source software ImageJ, utilizing the Diameter) toolbox. The diagram, showing the open-source code method of fiber diameter measurement, followed by the process of image segmentation and then the histogram of the fibers diameters. The PA XD10 nanofibers with manufacturer specified nanofiber diameter of 230 nm was found to have diameter of 248 nm with a standard error of ±0.92 nm. The PA 66 nanofibers with a manufacturer specified diameter of 150 nm was measured to have a diameter 153 nm with a standard error of ±0.32 nm.

FIG. 10 shows ply orientation and layup schematic of 16-ply quasi-isotropic laminate with $[0/90/\pm45]_{s2}$ orientation.

μCT Imaging and Void Analysis

Void content is important as it effects the strength and fatigue performance of composites. High resolution μCT imaging is a method of imaging the 3D location, size, and quantity of voids distributed throughout a sample. The non-destructive nature of this technique enables imaging of samples before mechanical tests are performed, enabling the correlation between mechanical properties and void percentage. μCT was conducted at the Institute for Soldier Nanotechnology (ISN) at MIT. The scans utilized the Zeiss Xradia Versa High-Resolution 3D X-ray Imaging System. The tungsten source was set to an X-ray energy of 80 kV and 7 W with no filter applied (apart from the ambient air). The scan isotropic pixel size is between 1.25 and 1.5 μm, giving a resolution of 4-5 μm. The specimens were rotated 360 degrees with 3201 projections taken per scan with the exposure time varying between 2.4-4.5 seconds depending on the sample thickness. The images were reconstructed utilizing the manufacture's reconstruction software and exported as 2D slices in .tiff format. The reconstructed slices were imported into ImageJ where void analysis was performed.

Figure 11:
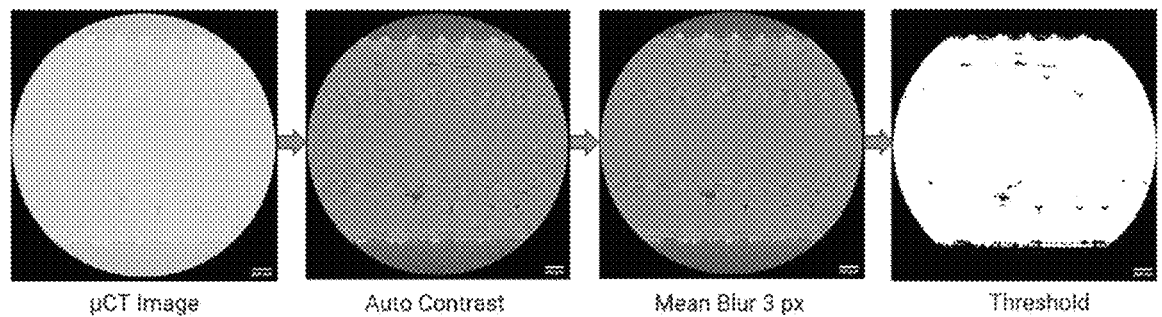
FIG. 11 depicts a process of segmenting image for void percentage analysis.

Void percentage analysis was conducted in ImageJ. The procedure is seen in FIG. 11 and is as follows: 1) The 2D μCT slices are imported and auto contrast is applied. 2) The slices are despeckled and a mean blur filter of 3 pixels is applied to help better differentiate the voids from the individual fibers. 3) The images are thresholded to draw contrast between the voids (black) and the composite (white). 4) The images are cropped to remove the edge effects at the top and bottom of the scan images. 5) Imager s particle analysis tool is used to obtain void content percentage. A void content percentage of each 2D slice is found, and the mean and standard error (SE) are calculated from the whole volume.

Short Beam Shear (SBS) Testing

SBS testing is utilized for material performance comparison under shear like conditions and measures interlaminar shear strength (ILSS). ASTM D2344 was followed to obtain short-beam strength, a common measure of ILSS, of the specimens. The specimens' dimensions were nominally 12 mm×4 mm×2 mm (length×width×thickness). The specimens were cut from a 16-ply IM7/8552 laminate that was 15 cm×15 cm (6 in x 6 in before edges were trimmed) composite laminate laid up as $[0/90/\pm45]_2$. A two-degree ply offset was used in the center, where two plies of the same orientation met, to limit the nesting of the carbon fibers of these two plies, which otherwise can give a non-conservative value of strength and contribute negatively to specimen-to-specimen variation/error. The samples were cut from the large laminate with a diamond coated band saw before being polished on a Struers TegraPol-21 grinder polisher. The short beam shear samples were polished at 320, 400, 500, 800, and 1200 American grit sandpaper (P400, P800, P1200, P2400, P1000 European grit) to remove rough edges and small cracks that might have occurred during the cutting of the laminate, or uneven surfaces. A three-point bend steel fixture with a loading nose diameter of 6 mm, support rods with diameters of 3 mm, and a span of four times the laminate thickness (nominally 8 mm) followed the ASTM D2344 standard. The loading nose was lowered at a rate of 1 mm per minute utilizing a mechanical testing machine (Zwick/Roell Z010). The thickness (tsbs) and width (wsbs) of each specimen was measured with a digital micrometer before being loaded on the test set-up. The maximum load observed during the test (Pm) was recorded. Short-beam strength (sbs) was calculated following Equation 4.1:

$$\sigma^{sbs} = 0.75 \times \frac{P_m}{t_{sbs} \times w_{sbs}} \quad (4.1)$$

FIG. 11 shows process of segmenting image for void percentage analysis in ImageJ. The μCT slices are imported and auto contrast is applied. A mean blur filter of 3 pixels is applied to help better differentiate the voids from the individual fibers. The image is thresholded to draw contrast between the voids (black) and the composite (white). Particle analysis is completed on thresholded voids. This exemplary specimen is a 16 ply quasi-isotropic layup with IM7/8552 with the 20 μm PI aerogel in the middle 5 interfaces.

It must be noted that SBS presents shear like values and not necessarily pure interlaminar shear due to different failure modes such as irregular interlaminar shear, tension, plastic deformation, and compression. More complex methodologies such as the Iosipescu shear test or v-notched rail shear test should be utilized for pure shear strength values. However, SBS is commonly used as a benchmarking tool for shear strength comparison.

Electrospun Polymer Nanofiber (EPN) SILC Films for VBO Curing

The polyamide nanofibers are manufactured by NanoLayr (formally known as Revolution Fibres until May 2021). The polyamide 66 (Nylon 66) came from the Xantu.Layr XLA Series, and the polyamide XD10 (poly-xylylenesebacamide, XD10, known as Lexter®) came from the Xantu.Layr XLB Series. Both materials have a manufacturer given porosity of 80 vol %. The nanofibers form non-woven mats or films of continuous polymer nanofibers. The polyamide 66 (PA 66) nanofiber film and the polyamide XD10 (PA XD10) film have manufacturer stated nanofiber diameters of 150 nm and 230 nm respectively. The films, likewise, had measured nanofiber diameters of 153 nm and 248 nm, similar to the manufacturer's stated fiber diameter. SEM images were taken utilizing a JEOL JSM-6010LA machine under 15 kV. Before imaging, both the aerogel and the nanofibers were gold (Au) coated using a SC 7640 sputter with a discharge voltage of 2200 V for 90 seconds for a target thickness of 12 nm. The thickness of the PA 66 at 4.5 gsm was 120 μm and the thickness of the PA XD10 at 1.5 gsm was 9 μm as measured by SEM. Additionally, the thickness was measured by a micrometer (Mitutoyo 293-344-30 Digimatic Micrometer). The measured PA 66 at 4.5 gsm nanofiber mat was 23 μm and 1.5 gsm PA XD10 nanofiber mat was 8 μm. As an SEM image for the PA 66 at 4.5 gsm had out of focus areas with an in focus area of ~20 μm, it is concluded that the 120 μm area is due to edge effects (both from the specimen preparation and the SEM focus) and not the true representation. As such, the thicknesses was determined to be 8 μm and 23 μm following the micrometer reading and is used throughout this description.

16-ply quasi-isotropic specimens were first manufactured with a planar area of 2.54 cm×2.54 cm (1 in x 1 in) as described above in three different variations. The first variation had no SILC in any of the ply interfaces, the second had 4.5 gsm 23 μm PA 66 SILC at only the middle seven interfaces, and the third had the 4.5 gsm 23 μm PA 66 SILC at all 15 interfaces. The specimens were scanned with the μCT.

In the interfaces where the 4.5 gsm 23 μm PA 66 SILC was inserted, there were no interlaminar voids as seen in FIGS. 12A-12D. In the regions that had no SILC interlayer, there were interlaminar voids. The void elimination can be observed in the specimen with only the middle seven interlaminar regions having the SILC, where the regions without SILC interlayers clearly have voids. Comparing the hot plate cure with 4.5 gsm 23 μm PA 66 SILC in all interlaminar regions to the hot plate cure without SILC, the void percentage is 0.0 vol % compared to 1.62 vol %. Complete void removal was also obtained when utilizing the 1.5 gsm 8 μm thick PA XD10 nanofiber SILC in all interlaminar regions as seen in FIGS. 13A-13B.

Next, 15.24 cm×15.24 cm (6 in x 6 in) samples were manufactured as described above with SILC at all interfaces and μCT scan was completed to assess voids at an isotropic voxel size of 1.3 μm. SBS testing was completed as described above following the ASTM D2344 standard. The results can be seen in FIGS. 14A-14B. In all cases, failure occurred via plastic deformation around the loading nose followed by interlaminar shear failure. Following ASTM D2344, this was the valid mode of failure. The short-beam strength of the baseline (i.e., autoclave-cured specimens without SILC) was 96.8 MPa (SE=1.35) and the sample hot plate cured without SILC was 82.3 MPa (SE=2.68). The hot plate cured sample with 4.5 gsm 23 μm PA 66 SILC in all interlaminar regions had a short-beam strength of 104.1 MPa (SE=1.14) and the hot plate cured sample with 1.5 gsm 8 μm PA XD10 SILC in the interlaminar region had a short-beam strength of 97.6 MPa (SE=1.51), increases of 7.5% and 0.7% respectively over the autoclave cured baseline. While the short-beam strength of the 1.5 gsm 8 μm PA XD10 is above that of the baseline, it falls within the standard error. Therefore, it can be concluded that there is no significant difference between the two specimens. The hot plate cure with 4.5 gsm 23 μm PA 66 in all interfaces with a 104.1 MPa short-beam strength is 7.5% higher than the baseline outside the standard error. Large interlaminar regions reduce the fiber volume fraction, a key metric in composite strength. As such an objective was to minimize the interlaminar thickness. The specimens that were hot plate cured without SILC in the interlaminar region had an interlaminar region thickness of 1-2 μm, while specimens with 1.5 gsm 8 μm PA XD10 and 4.5 gsm 23 μm PA 66 had interlaminar regions of 5-7 μm and 10-15 μm respectively. The high values of short-beam strength is thought to be from the increased resin-rich interlaminar region with thermoplastic filler especially in the 4.5 gsm 23 μm PA 66 case. A comparison of the interlaminar thicknesses of specimens made without SILC and 1.5 gsm 8 μm PA XD10 interlayers can be seen in FIGS. 19A-19F. Table 1 additionally compares the short-beam strength values with previous autoclave cured samples made with IM7/8552 with aligned CNTs and buckled CNTs as reinforcing interlayers.

Figure 12A:
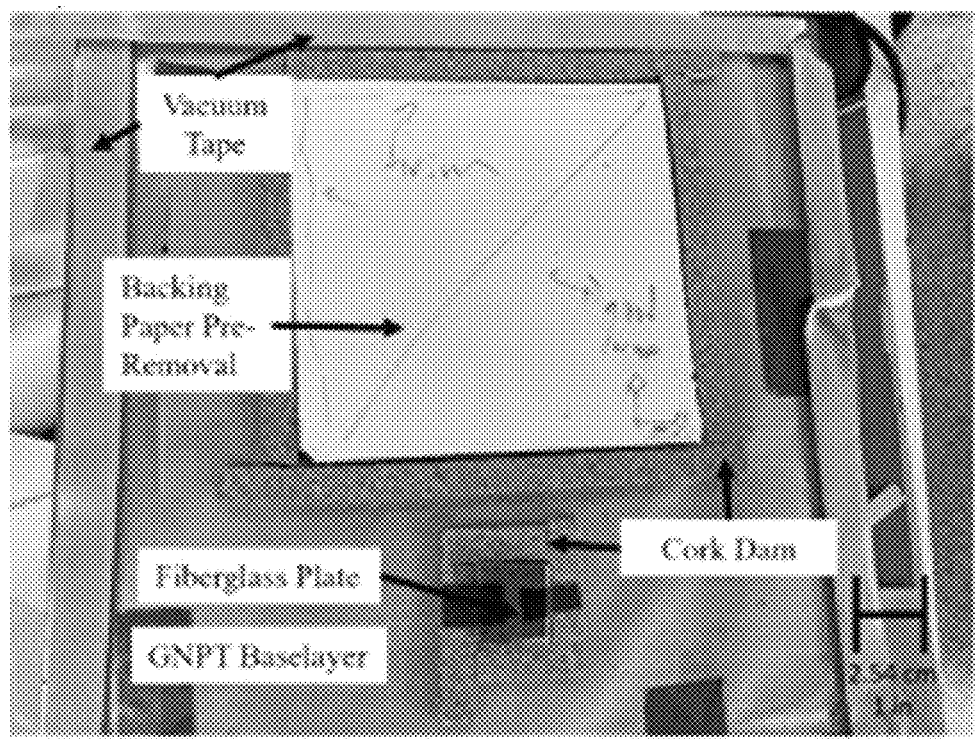
FIGS. 12A-12D depict layup images.
Figure 12B:
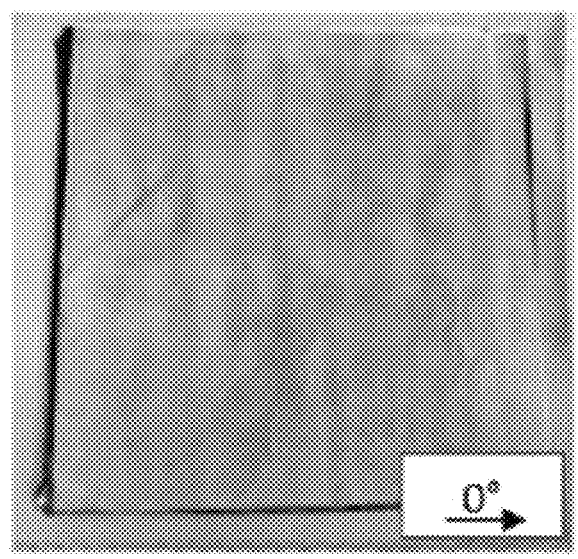
Figure 12C:
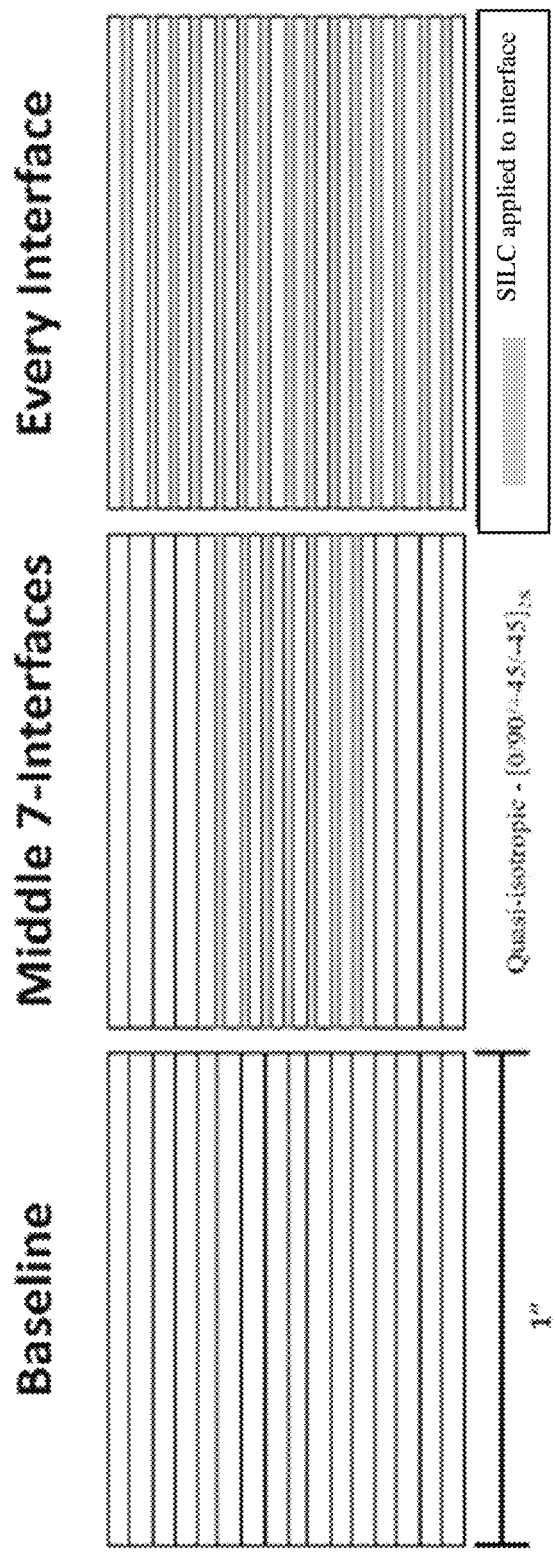
Figure 12D:
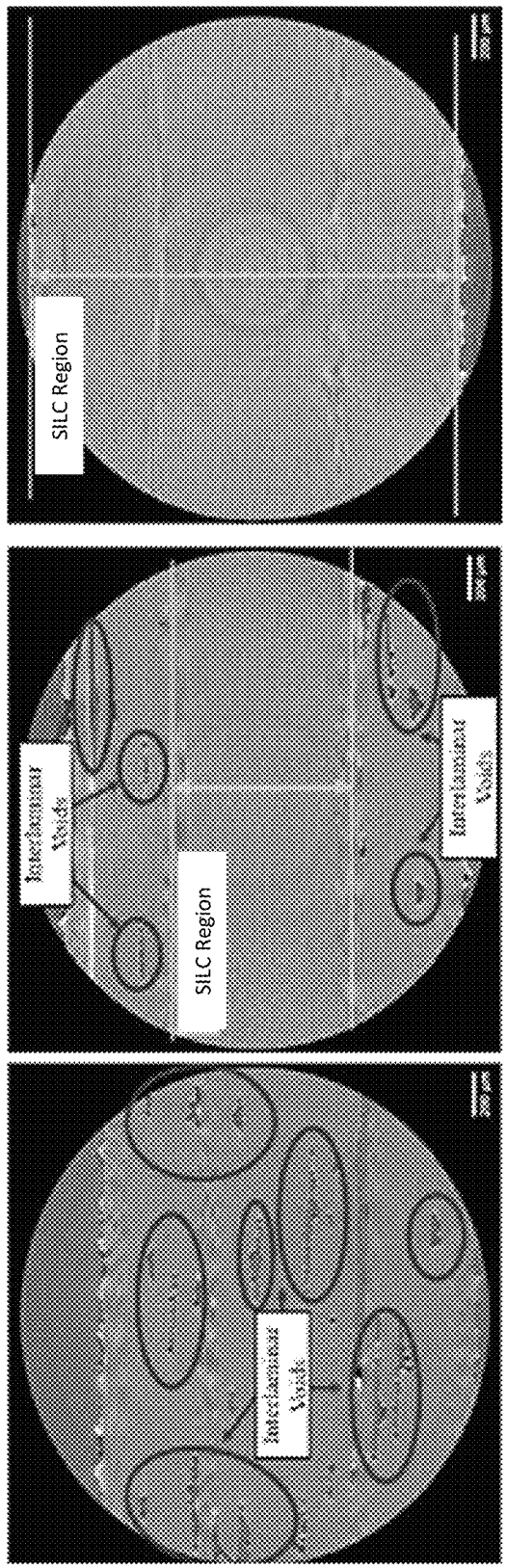

FIGS. 12A-12D show IM7/8552 layup images of: 1) prebagging manufacturing set up (FIG. 12A), and 2) midlayup laminate (FIG. 12B). The white film is the 1.5 gsm 8 μm PA XD10 SILC nanofibers and the underneath black square is a UD IM7/8552 ply at 90°. FIG. 12C shows a diagram of laminate layup with the gold lines representing the 4.5 gsm 23 μm PA 66 SILC interlayers. FIG. 12D shows representative μCT slices of the cured samples. The hot plate cured specimen without SILC interlayers had a void content percentage of 1.62 vol % compared to no measured voids when the SILC was applied. In the specimen with SILC interlayers applied to only middle seven interfaces, those interfaces are void-free while voids are observed in the non-SILC interfaces.

Figure 13A:
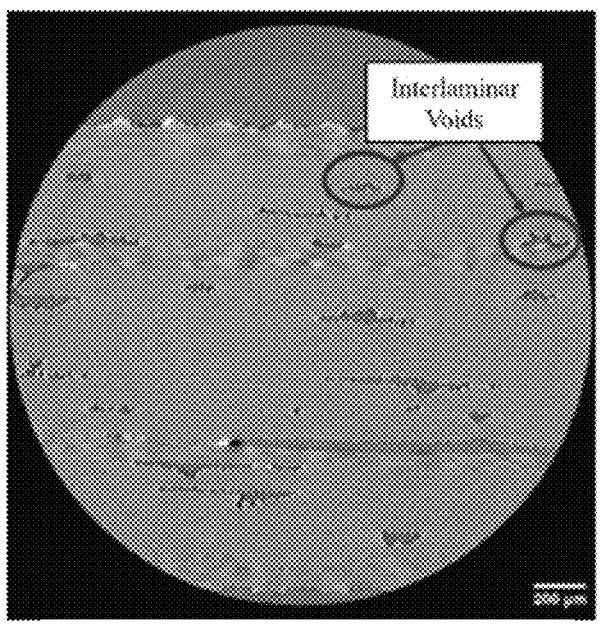
FIGS. 13A-13B depict representative μCT scans.
Figure 13B:
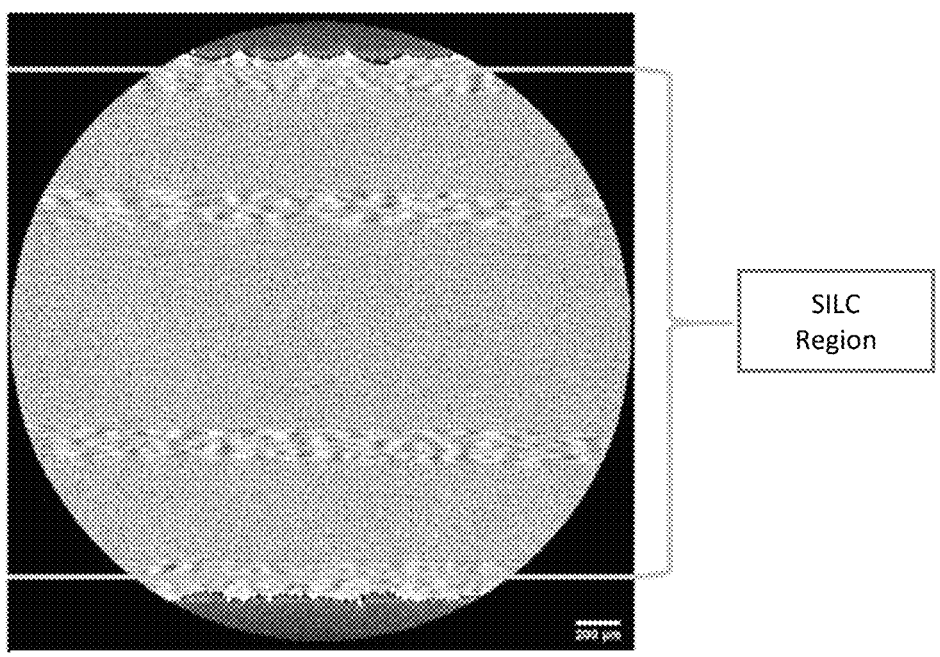

FIGS. 13A-13B show representative μCT scans comparing: 1) a hot plate cured specimen without SILC (FIG. 13A), and 2) a hot plate cured specimen with 1.5 gsm 8 μm PA XD10 in all interlaminar regions (FIG. 13B).

Figure 14A:
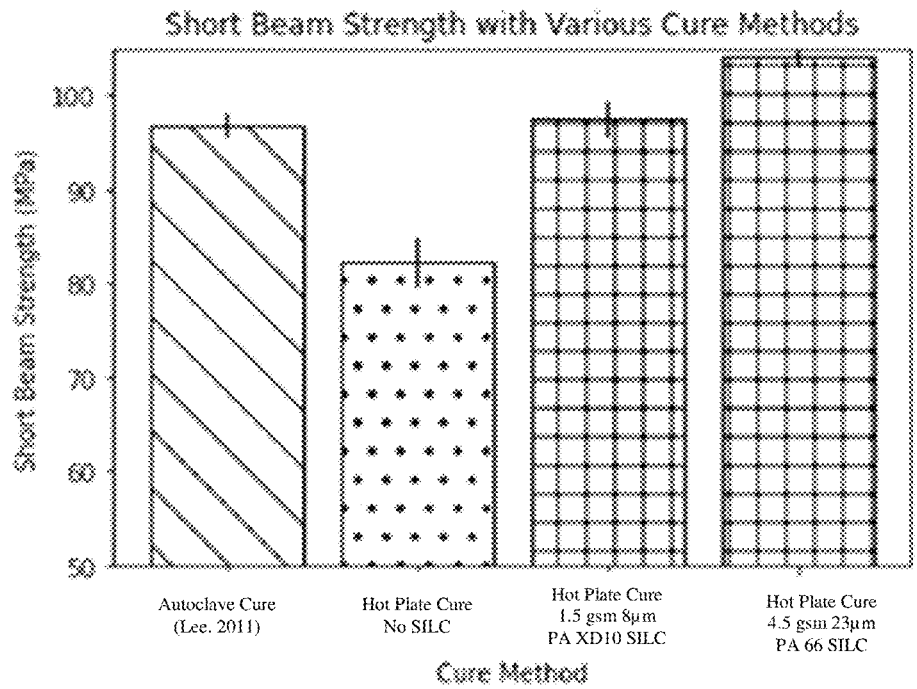
FIGS. 14A-14B depict short-beam strength comparisons.
Figure 14B:
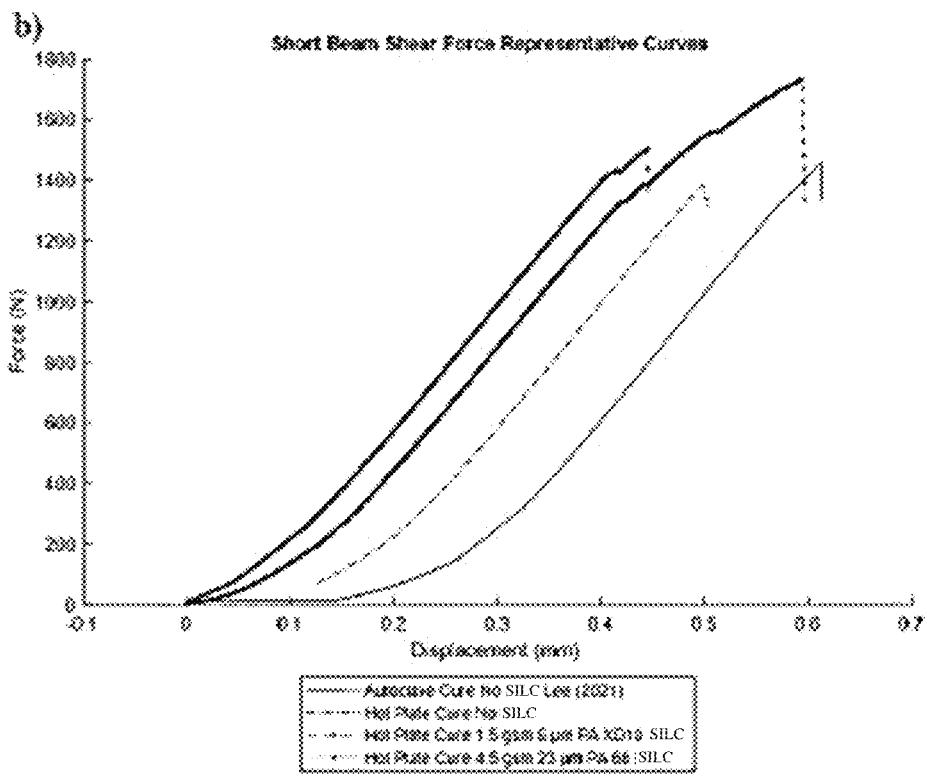

FIGS. 14A-14B show short-beam strength comparison with various cure methods with and without PA SILCs displaying: 1) average values, standard error (FIG. 14A), and 2) representative short beam shear test load-force displacement curves, where displacement is shifted for clarity (FIG. 14B). Autoclave cure data was previously reported in.

TABLE 1

Table of values for short-beam strength and standard error of samples cured with various methods and SILC interlayers. Autoclave cure data was previously reported in.

| Manufacturing Method | Short-beam Strength (MPa) | Standard Error (+/−) | Percent Difference from Autoclave Cured No SILC |
|---|---|---|---|
| Autoclave Cured No SILC | 96.8 | 1.35 | N/A |
| Hot Plate Cured No SILC | 82.3 | 2.68 | −15.0% |
| Hot Plate Cured 1.5 gsm 8 μm PA XD10 SILC | 97.6 | 1.51 | None |
| Hot Plate Cured 4.5 gsm 23 μm PA 66 SILC | 104.1 | 1.14 | +7.54% |
| Autoclave Cured 20 μm Tall Aligned Carbon Nanotube SILC | 100.9 | 1.39 | +4.24% |
| Autoclave Cured 10 μm Tall Buckled Carbon Nanotube SILC | 104.0 | 2.24 | +7.43% |

Polyimide Aerogel SILC Films for VBO Curing

A bespoke PI aerogel was obtained from Aerogel Technologies LLC with a stated manufacturer porosity of 96%. The measured thickness of 20 μm and pores can be observed in SEM and optical images in FIGS. 15A-15C.

Figure 15A:
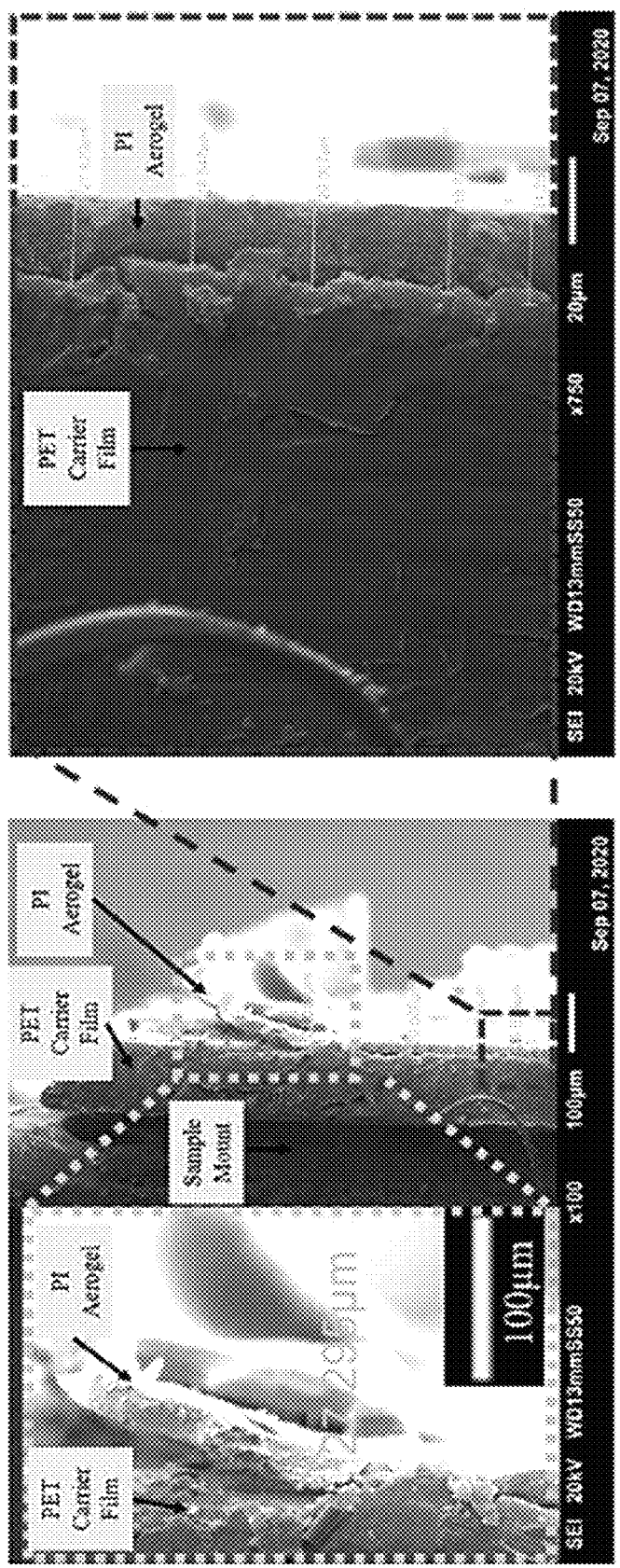
FIGS. 15A-15C depict SEM and optical images of structures.
Figure 15B:
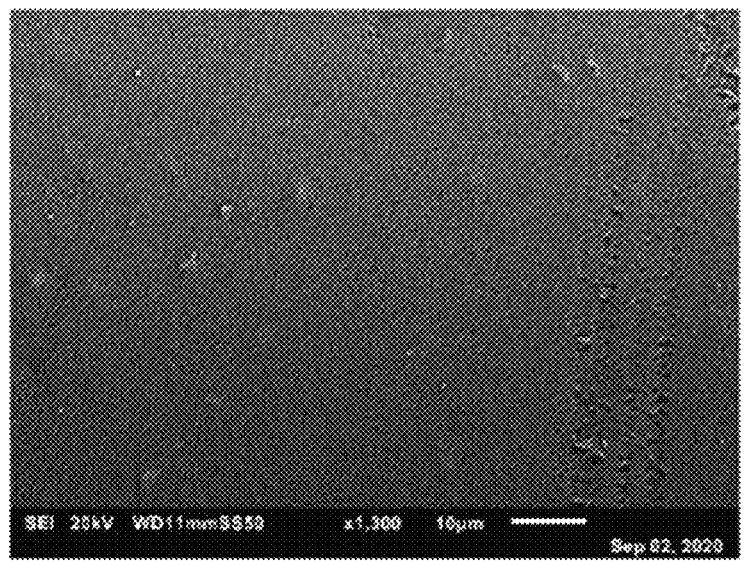
Figure 15C:
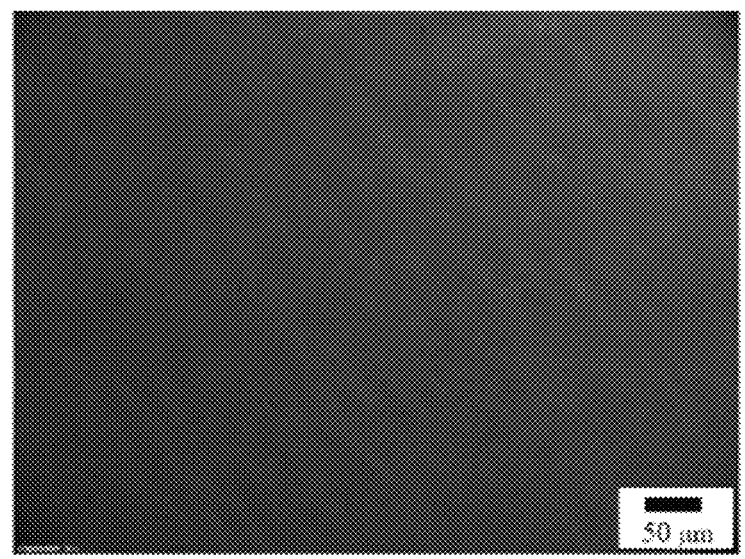

FIGS. 15A-15C show SEM and optical observations of 20 μm thick PI aerogel observed with sample mounted at 90° (FIG. 15A), and 20 μm PI aerogel porous structure observed top down via SEM (FIG. 15B), and optical microscope (FIG. 15C).

The laminate manufacturing procedure was the same as described above. However, due to strong adherence of the aerogel to the polyethylene terephthalate (PET) backing film, a heat-assisted method was used for application of the SILC to the prepreg. The prepreg plies were placed on a hot plate set to 30° C. for 3 minutes which increased their tack. The warmed plies were then placed face down on the aerogel. After 1 minute of resting the plies were removed. The heat-assisted transfer process is presented in FIG. 16. This pre-applied the aerogel to the plies' interfaces. The plies were then stacked up according to the $[0/90/\pm 45]_{2s}$ stacking sequence. The sample only had the 20 μm thick PI aerogel SILC in the middle five interfaces out of fifteen interfaces.

Figure 16:
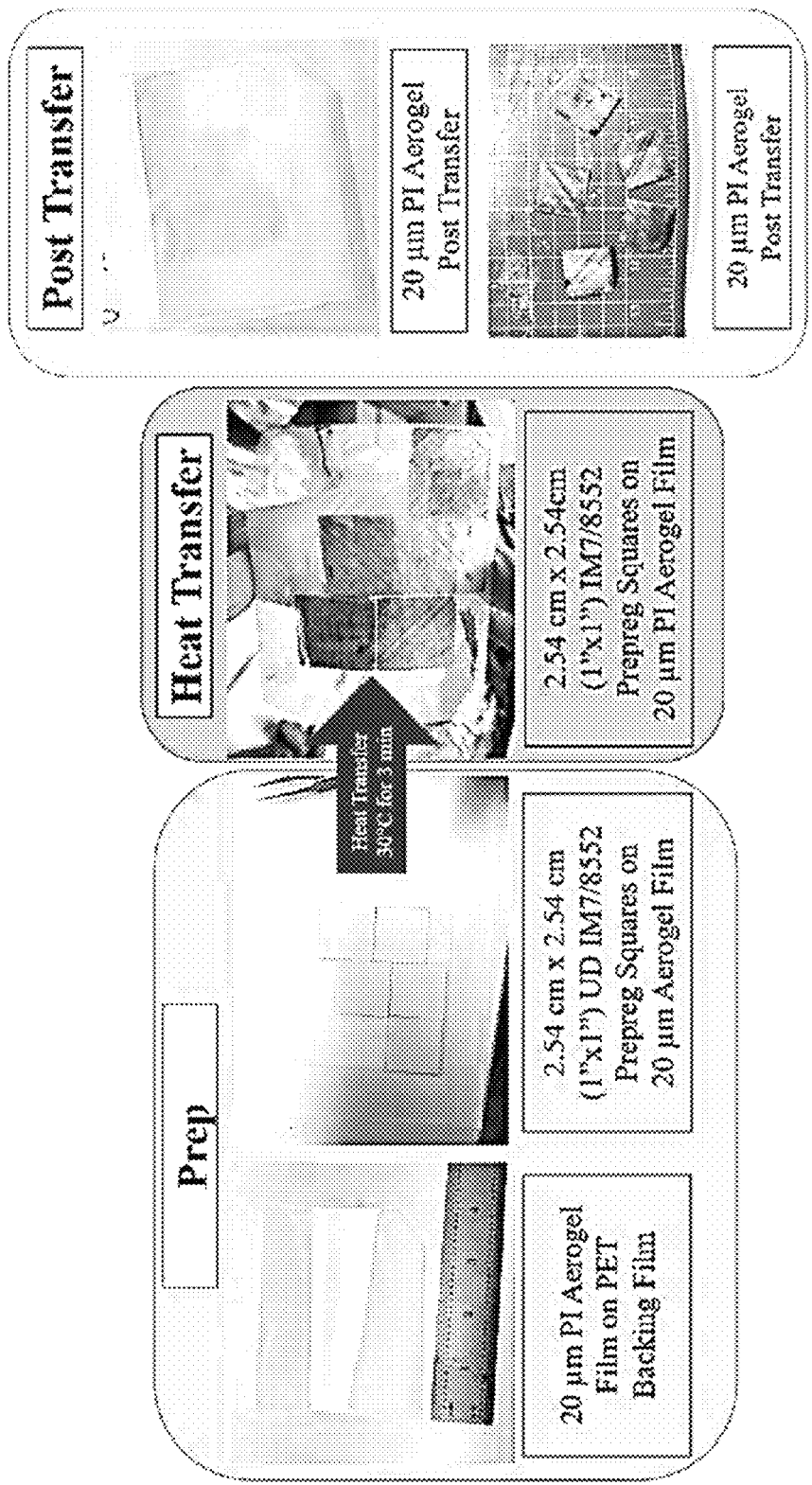
FIG. 16 depicts a heat assisted transfer process.

FIG. 16 shows heat assisted transfer process for the 20 μm thick PI aerogel from backing film to prepreg. The prepreg is then stacked directly to form a laminate with SILC at desired interfaces.

Figure 17:
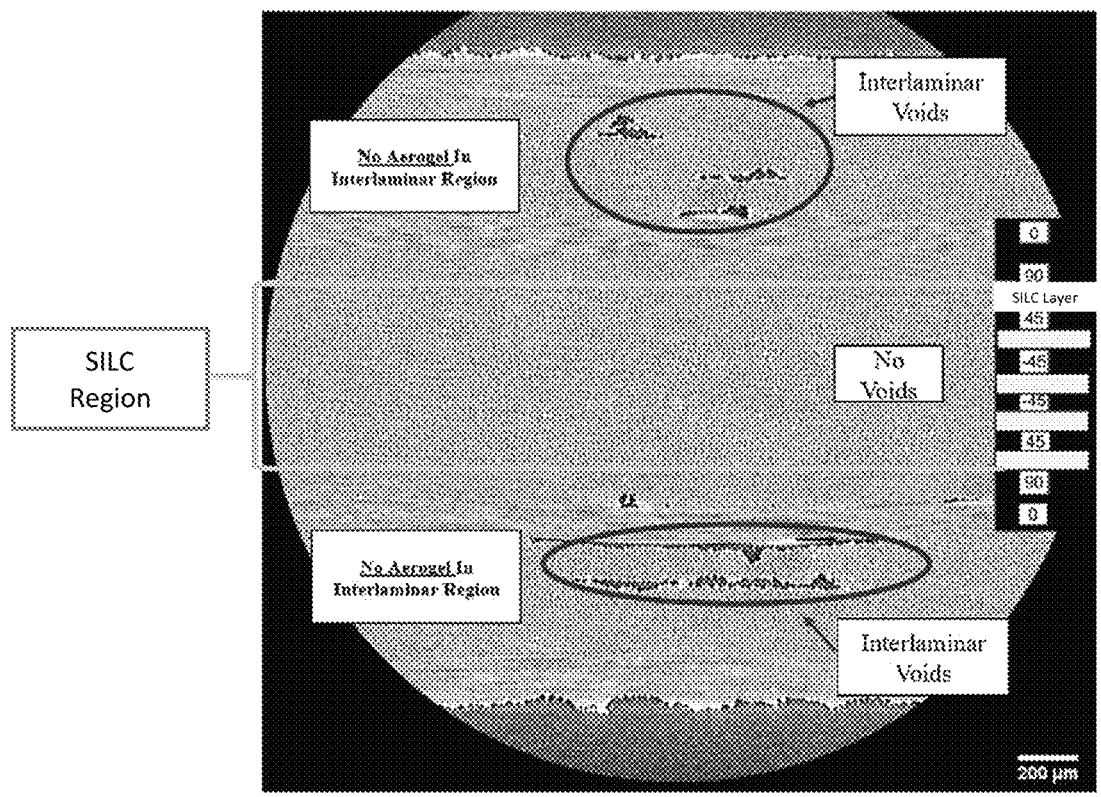
FIG. 17 depicts a μCT image of a sample.
Figure 18:
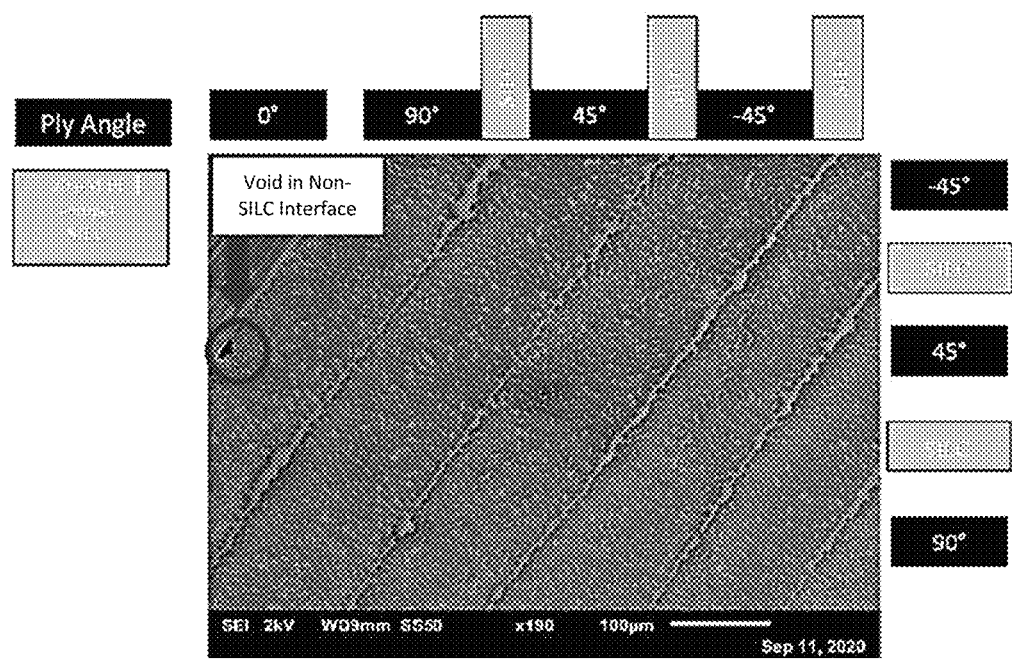
FIG. 18 depicts an SEM image of a sample.

The laminate was cured under vacuum on a hot plate following the same cure cycle and bagging procedure as described above. In the μCT scan, there were zero voids (void percentage of 0.0 vol %) in the region where the SILC was applied as seen in FIG. 17 while there were voids (void percentage of 0.76 vol %) in the interlaminar regions where there were no SILC layers. An SEM image of the middle interfaces is shown in FIG. 18. In that image, a void can be seen in the non-SILC interface.

FIG. 17 shows a μCT image of sample with 20 μm PI aerogel SILC applied in middle five interlaminar interfaces. No voids are present in the interfaces where the PI aerogel interlayer is incorporated. The average void content of the top and bottom sections (non-SILC regions) is 0.76 vol %.

FIG. 18 shows an SEM of sample with 20 μm PI aerogel SILC in middle five interlaminar interfaces. No voids are present in the middle five interfaces. In the one interface where no SILC was applied, a void can be seen.

Figure 19A:
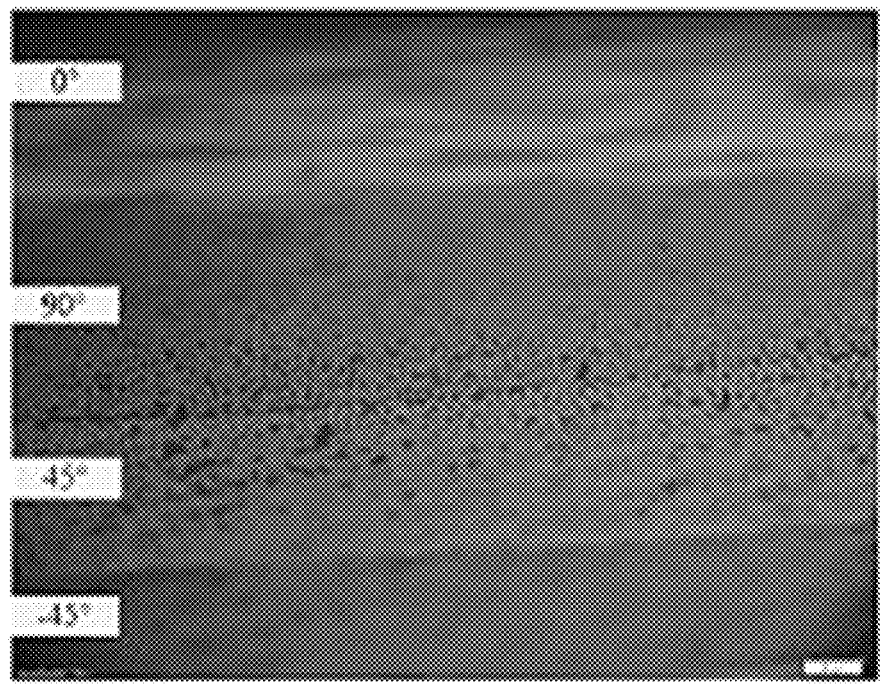
FIGS. 19A-19F depict representative optical microscopy images of a sample.
Figure 19B:
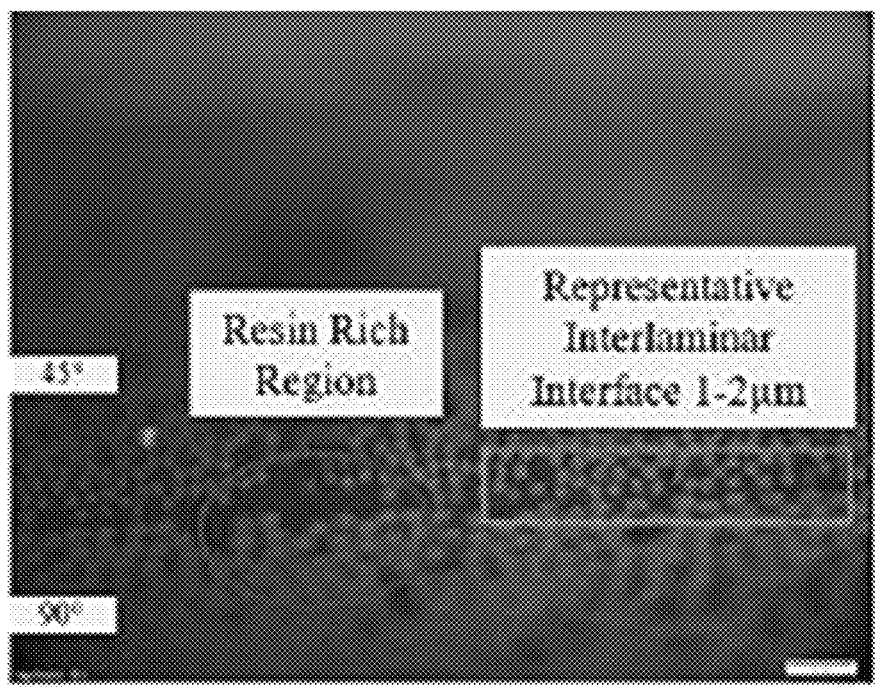
Figure 19C:
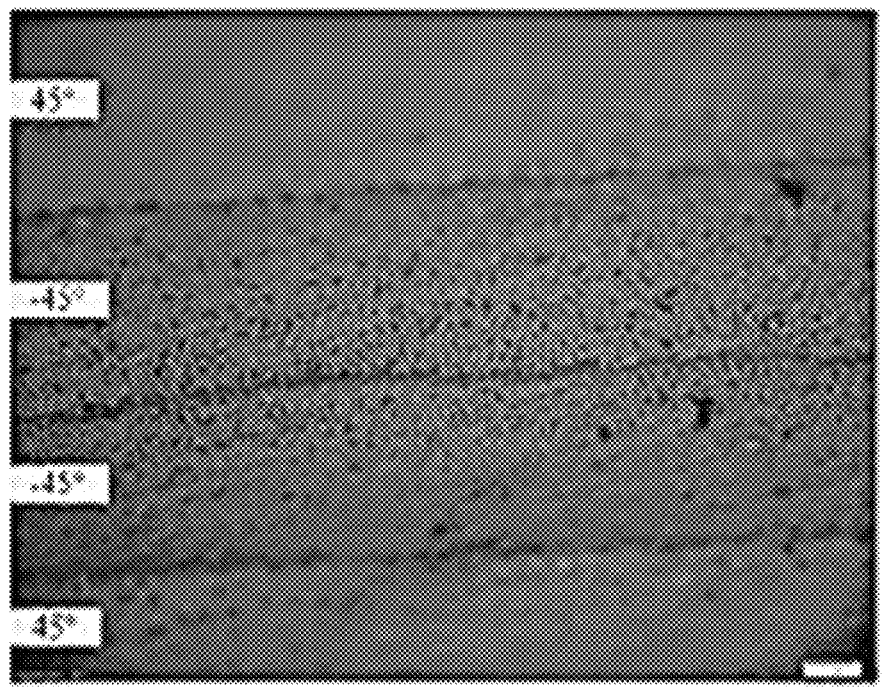
Figure 19D:
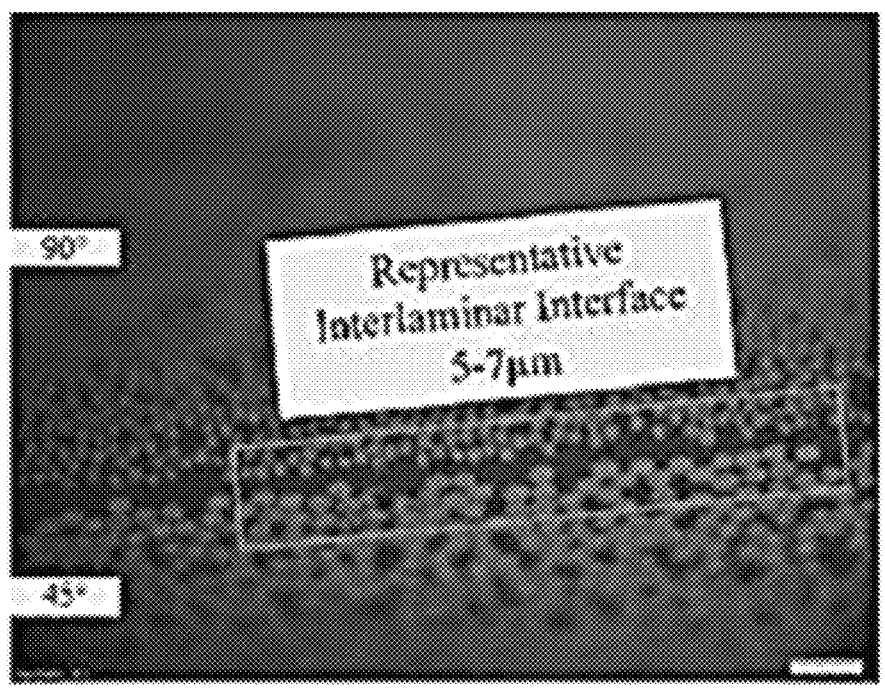
Figure 19E:
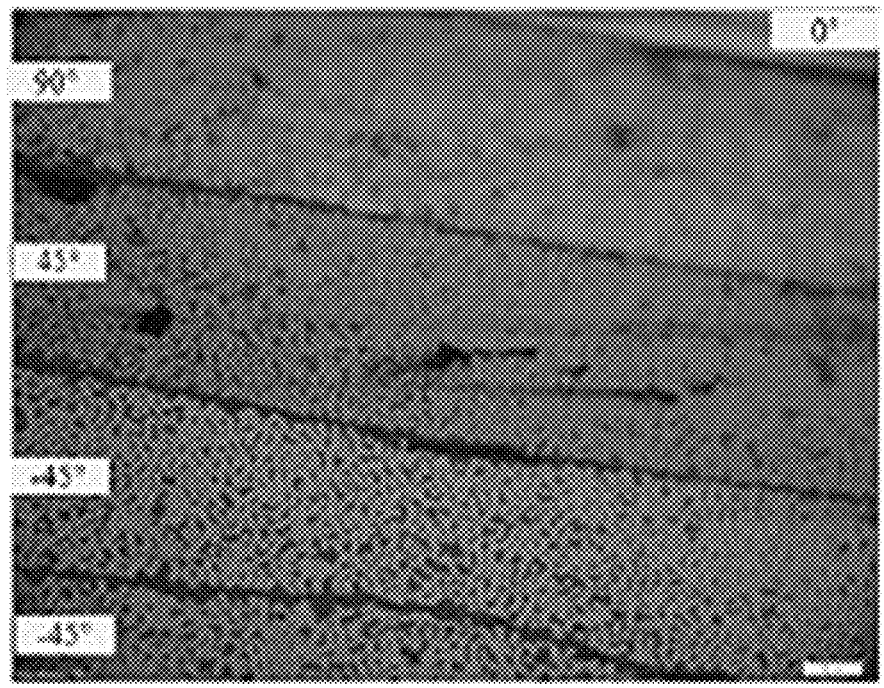
Figure 19F:
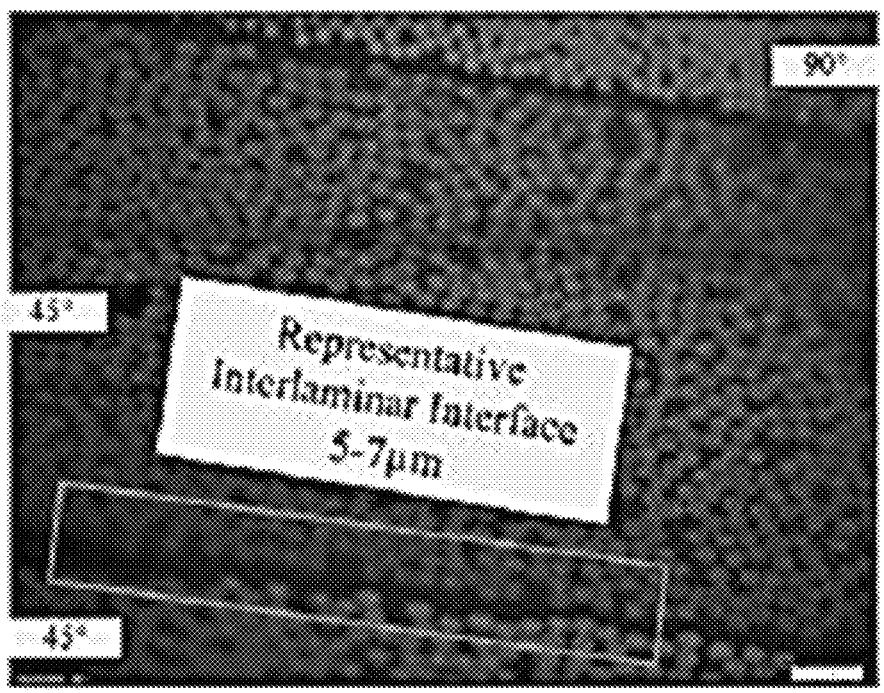

Interlaminar thickness was compared via microscopy as seen in FIGS. 19A-19F. FIGS. 19A-19F show representative optical microscopy images of hot plate cured specimens in a vacuum-bag-only environment. Specimens without any SILC show interfaces of 1-2 μm (FIGS. 19A and 19B). A resin-rich region in the image of FIG. 19B is observed, similar to the thickness of autoclave-cured IM7/8552 UD laminate material. Specimens with 20 μm thick PI aerogel SILC (FIGS. 19C and 19D) and 1.5 gsm 8 μm PA XD10 SILC (FIGS. 19E and 19F) interlayers placed in all interlaminar regions have an interlaminar thickness of 5-7 μm. The specimens with 20 μm thick aerogel SILC interlayers, which were hot plate cured in VBO conditions had an interlaminar region of 5-7 μm thick. Similarly cured specimens without SILC in the interlaminar region had an interlaminar thickness of 1-2 μm.

PI aerogel with 200 μm thickness was also obtained from Aerogel Technologies.

Figure 20:
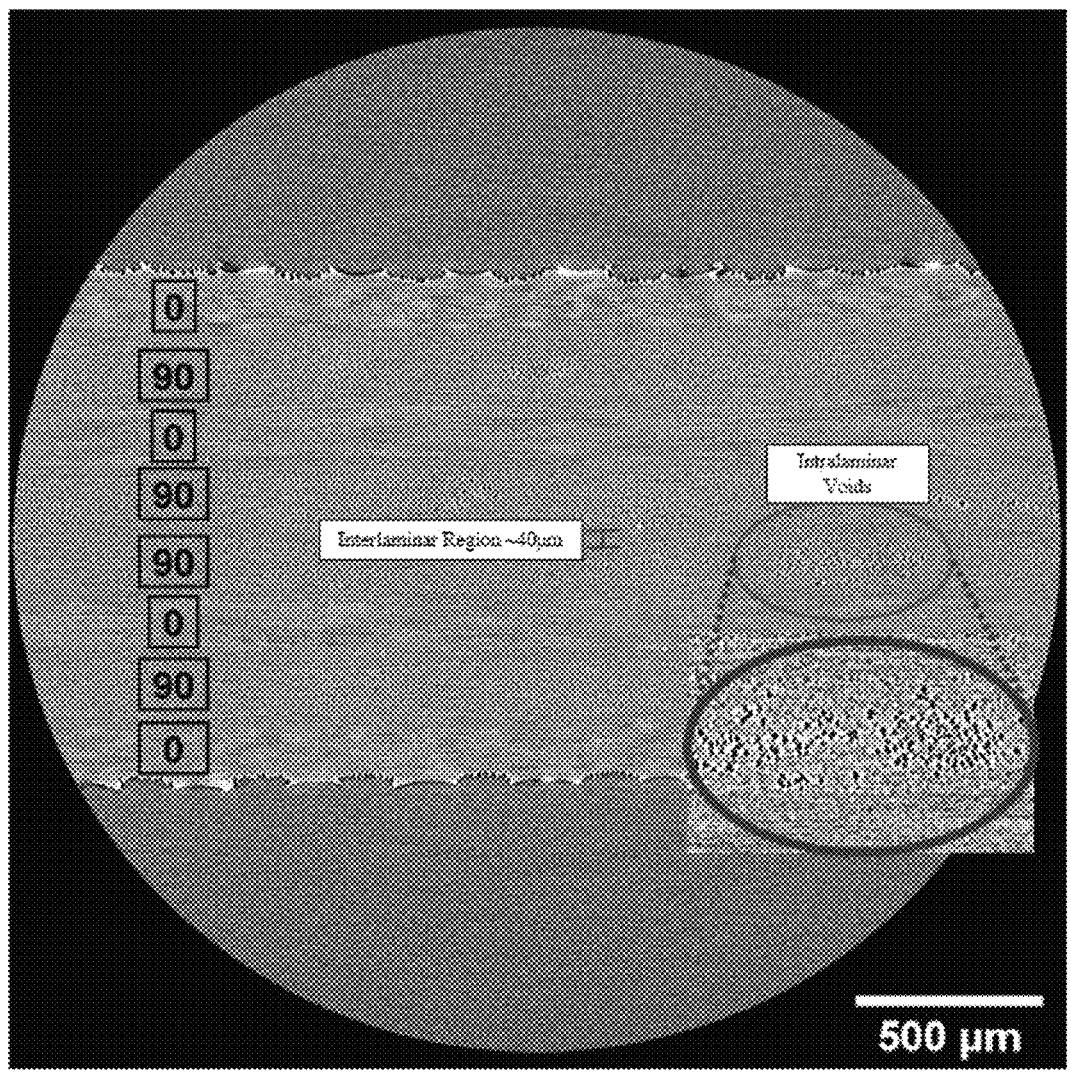
FIG. 20 depicts a representative μCT image of a sample.

The laminate manufacturing procedure was the same as described above with a stacking sequence of $[0/90/\pm 45]_{2s}$ with the SILC applied on all interfaces. The μCT image is seen in FIG. 20. FIG. 20 shows a representative μCT image of a sample with the uncompressed 200 μm PI aerogel SILC all interfaces. No interlaminar voids are present but interlaminar voids are seen throughout the specimen. The intralaminar voids can be seen in the call out. The overall void content percentage is measured to be 0.11 vol %. While interlaminar voids were eliminated, intralaminar voids emerged. It is thought that this is due to the large interlaminar thickness of 40 □m. As resin is drawn from the pre-impregnated plies into the large (thick) interlaminar region, not enough resin remains in the plies. The resin flow into the PI aerogel SILC in the interlaminar region is thought to lead to intralaminar voids due to the now intraply dry fibers. Another sample was prepared with the 200 μm PI aerogel, but first it was compressed down to 50 μm by placing a layer of GNPT over the film and firmly pressing down with roller in order to see if a pre-compressed sample would have a thinner interlaminar region. Intralaminar voids appeared in that specimen also and the interlaminar region remained at −40 Om thick. The interlaminar region thickness of the non-compressed 200 μm thick PI aerogel SILC specimen being 40 μm thick (see FIG. 20) and equal to the pre-compressed aerogel SILC specimen indicates internal compression either happens under vacuum or during the layup as each ply is added. The void content percentage of both the uncompressed and compressed sample was an overall 0.11 vol %.

Capillary Wetting from SILC Materials

The void elimination is obtained, in part, due to the capillary pressure applied by the SILC material. While polymer resins are not Newtonian fluids, the resin flow velocity is little when compared to the resin infusion. The low shear rate of resin flow during composite curing allows the process to be studied as Newtonian flow, following a similar procedure to Lee in a previous study. Darcy's law of capillary pressure, Equation 4.2, applies at the microscopic level to define the pressure at the interface between the resin and the gas. $V_{flow}$ is flow velocity vector; K is the permeability tensor; $\mu_v$ is dynamic viscosity; and $\nabla P_f$ is the pressure gradient at front of the flow:

$$V_{flow} = \frac{K}{\mu_v} \nabla P_f \qquad (4.2)$$

Figure 21A:
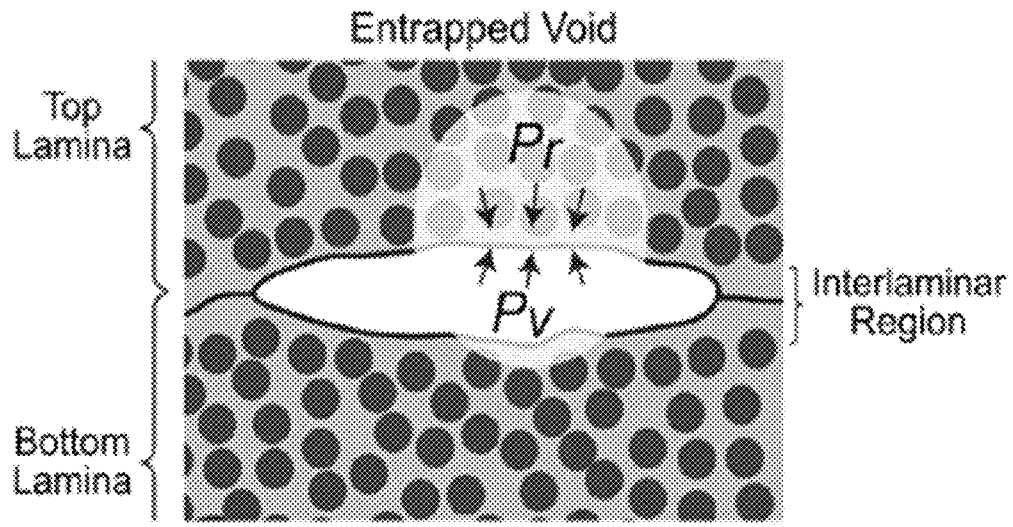
FIGS. 21A-21B depict an illustration displaying the interlaminar void pressure interface with and without an Scaffold for InterLaminar Capillarity (SILC) interlayer.
Figure 21B:
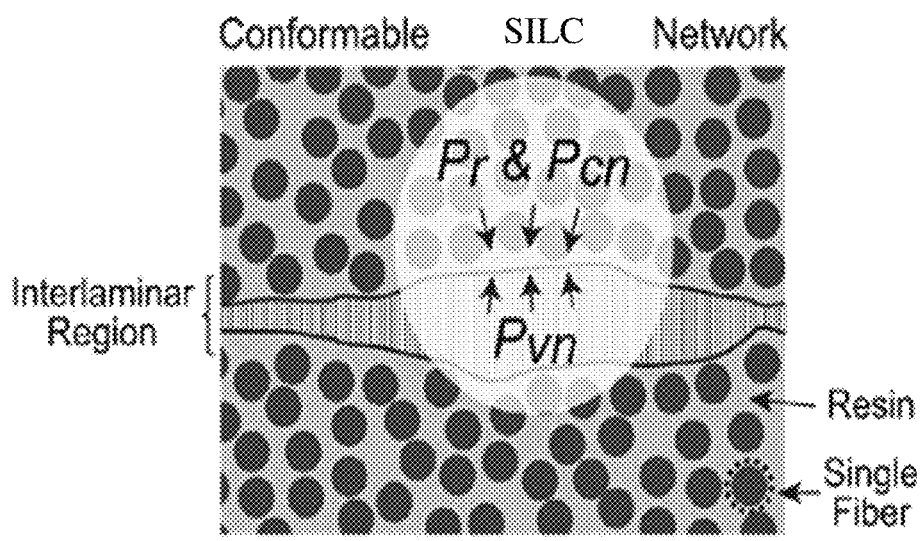

The pressure gradient predicts the front of the flow. FIGS. 21A-21B show voids trapped with and without SILC in the interlaminar region which occurs during the laminate layup due to entrapped air and non-smooth surfaces. The interface contours are defined by the pressure of the gas in the entrapped void and the pressure of the resin, $P_v$ and $P_r$ respectively. The pressure gradient is defined as $\Delta P = P_r - P_v$. If the laminate is cured in an autoclave under vacuum, a $P_r$ of 0.72 MPa is used as it is the difference between the external applied pressure of MPa and partial vacuum of −0.02 MPa (−0.2 bar). $P_v$ is assumed to be 0.1 MPa (1 bar), the pressure the laminate was laid up in. In an autoclave cure, the JP is 0.62 MPa and void growth does not occur. Additionally, as the resin is heated and liquifies, the gas can diffuse into the resin system collapsing the voids. In a VBO cure with no applied pressure, the JP becomes −0.08 MPa which is less than zero. In this case, the void can be expected to grow (expanding in volume and increasing the composite void percentage) according to the ideal gas law, Equation 4.3, reducing the p until $\Delta P = 0$. P is pressure, V is volume, n is number of moles, R is the universal gas constant, and T is temperature.

$$PV = nRT \qquad (4.3)$$

The void pressure gradient with SILC included is described in Equation 4.4, where JP is the void pressure gradient, P r is resin pressure, $P_{SILC}$ is the capillary pressure of the SILC due to its pores, and P v is void pressure.

$$\Delta P = [P_r + P_{NPN}] - P_v \qquad (4.4)$$

FIGS. 21A-21B are illustrations displaying the interlaminar void pressure interface with and without an SILC interlayer and the pressure forces defining the void boundary. The SILC enables capillary-driven polymer wetting into the interface, leading to void elimination and resin infiltration. FIGS. 21A-21B show that with the integration of the SILC, $\Delta P = P_r + P_{SILC} - P_v$ can be calculated by with the modeling assumption of 1D resin flow.

$$P_{NPN} = \frac{2 \times (1-\epsilon)}{D_f \times \epsilon} \times \sigma \times \cos(\theta) \qquad (4.5)$$

A pre-factor of 2 was used in Equation 4.5 due to the nominal orthogonality of the electrospun fiber film to the resin system rather than pre-factor of 4 which would be used if the nanofibers ran parallel to the flow field. $P_{SILC}$ is SILC pressure, $\epsilon$ is porosity, $D_f$ is fiber diameter, $\sigma$ is resin surface tension, and $\sigma$ is the contact angle between the resin and the nanofiber system. With a PA 66 SILC fiber diameter of 150 nm, a porosity of 80 vol %, both given by the manufacturer and an assumed resin surface tension of 35 mJ m$^{-2}$ and =20°, the capillary pressure from the SILC is estimated to be 0.11 MPa. The SILC capillary pressure, combined with the full vacuum pressure, creates a positive $\Delta P$ leading to void collapse. In this simplified model, when cured under full vacuum, only a minimal additional capillary pressure is needed with the contact angle <90° being the determining factor, as has to be only greater than zero and assumed positive values for other variables for a positive $\Delta P$. However, more investigations need to be done to determine the minimum capillary pressure to obtain void removal and full wetting if the interlaminar region. If cured under partial vacuum, SILC traits such as fiber diameter, contact angle porosity, etc. have more governing effects. The capillary pressure of the PA XD10 nanofibers decreases to 0.07 MPa due to the increased fiber diameter of 230 nm but still leading to a positive $\Delta P$.

In the case of no applied SILC in a vacuum-bag only-cure, the same Equation 4.5 can be used for intralaminar voids where the fiber diameter changes to 5.2 μm and porosity to 0.4 (based on fiber volume fraction). The pressure from the fibers would be 0.018 MPa. Due to the higher permeability of the carbon fibers, the void pressure is assumed to be zero. This leads to a positive pressure of 0.118 MPa as the resin pressure remains at 0.1 MPa. The 1D pressure modeling shows how intralaminar voids can be removed and helps explain why there are interlaminar voids but no intralaminar voids in hot plate cured laminates when no interlaminar SILC is added and helps explain why the interlaminar voids are more of a challenge than intralaminar voids in vacuum-bag-only cures and how the addition of SILC materials can enable VBO curing.

SILC Interlayers Acting as Porous Void Evacuation Channels

OoA prepreg systems are engineered to have alternating regions of dry fibers and resin-rich areas in-plane to the ply to enable VBO curing. These pathways facilitate air evacuation before resin flows into the dry fiber area and, as the cure progresses, resin flows into these dry fiber areas. Lee found that A-CNT SILCs can remove interlaminar morphology variations due to the A-CNTs compliance and eliminate interlaminar voids in autoclave-grade prepreg cured VBO due to the capillary effects of the A-CNT SILCs. Polymer SILC systems act with an alike mechanism. Compared to the OoA prepreg the breathable pathway when SILCs are inserted into the interlinear region, is larger in area, the size of the whole laminate area, and the pathway is out of plane as it is an interlayer. The furthest a breathable pathway is to the SILC layer is half a ply thickness. For IM7/8552 UD prepreg, that is 0.0655 mm or 65 μm. SILCs presented here and previously are highly porous (80-99 vol %), enabling the evacuation of volatiles, entrapped air, and moisture before the resin impregnates the interlaminar region. As this void evacuation pathway is nearby all areas of the ply, entrapped air bubbles have little distance to travel which could reduce the amount of time the pathway needs to stay open. When the resin viscosity decreases as temperature rises, the capillary effect of the SILC systems encourages full resin infusion into the interlaminar region. Therefore, SILC+VBO manufacturing can be thought of as creating an OoA prepreg system with out of plane void evacuation channels made from SILCs that have inherent enhanced capillary properties which can encourage resin infusion and enable traditional autoclave prepreg systems to be cured VBO.

The usage of two polymer based commercially scalable material systems as SILCs for use in a next generation composite manufacturing technique where there is no applied pressure during cure using autoclave-grade composites was described herein, along with no large manufacturing process changes or prepreg material changes (resin, morphology, etc.). The first explored SILC system is EPNs where two different versions of polyamide are demonstrated to remove voids: PA 66 (Nylon 66) and PA XD10 (Lexter®) each with a differing nanofiber diameter and film thickness. The second is a bespoke PI aerogel in different film thicknesses. The EPN specimens were demonstrated to be effective at the 15 cm×15 cm (6 in x 6 in) scale. With all SILC materials, μCT analysis was done to show void-free samples of VBO cured autoclave-grade prepreg with SILC interlayers. Short-beam strength was also evaluated for the EPN SILC systems showing no degradation of composite properties with the addition of the 1.5 gsm 8 µm PA XD10 and 4.5 gsm 23 µm PA 66 SILC interlayers. The higher short-beam strength values is thought to be from the increased resin-rich interlaminar region with thermoplastic filler. The PI aerogel material, in addition to showing interlaminar void elimination with the 20 µm thickness, revealed that with too large of an SILC layer (200 µm thick) intralaminar voids occur due to resin flow into the SILC from the plies. Microscopy showed that the interlaminar region is still thickened with the thinnest utilized SILC systems: the µm thick PI aerogel and the 8 µm thick 4.5 gsm PA XD10 EPN both had interlaminar regions of 5 to 7 µm as opposed to 1 to 2 µm regions of specimens cured without the SILC. Lastly, the mechanics of the capillary effects are discussed as well as the SILC layer acting as a whole ply area breathable pathway that is half a ply thickness away from any point before resin infiltration. This next generation composite cure methodology has the potential to eliminate autoclaves from the manufacturing process, improving the economics of composite manufacturing and revolutionizing aerospace-grade composite manufacturing.

SILC Integration into Geometric Complex L-Shaped Composites for Vacuum-Bag-Only Curing of Autoclave-Grade Prepreg Composites manufactured in L-shape geometries have many use cases such as operating as stringers and enabling joining of flat plates in a T-configuration. In these complex geometries, however, there have been unresolved challenges in void formation, fiber wrinkling, and thickness variation in the curved region of the laminate. This section focuses on the void elimination properties of SILCs and curing auto-clave-grade prepreg in VBO conditions in the L-shape geometries.

Figure 22:
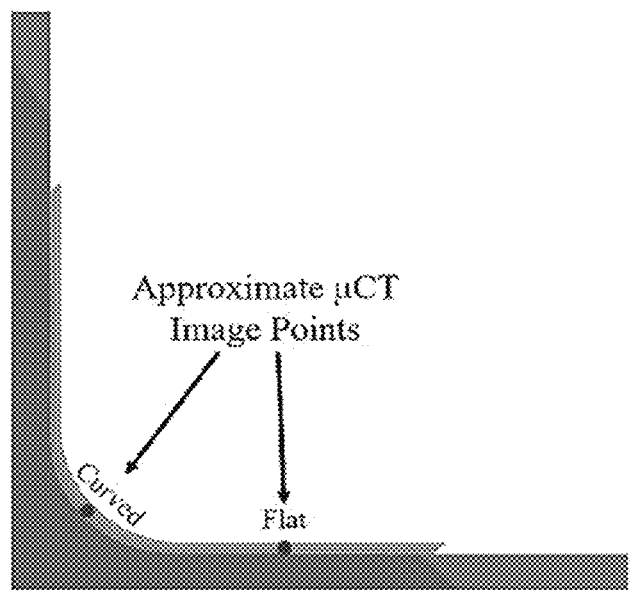
FIG. 22 depicts approximate L-shape μCT scan points.
Figure 23A:
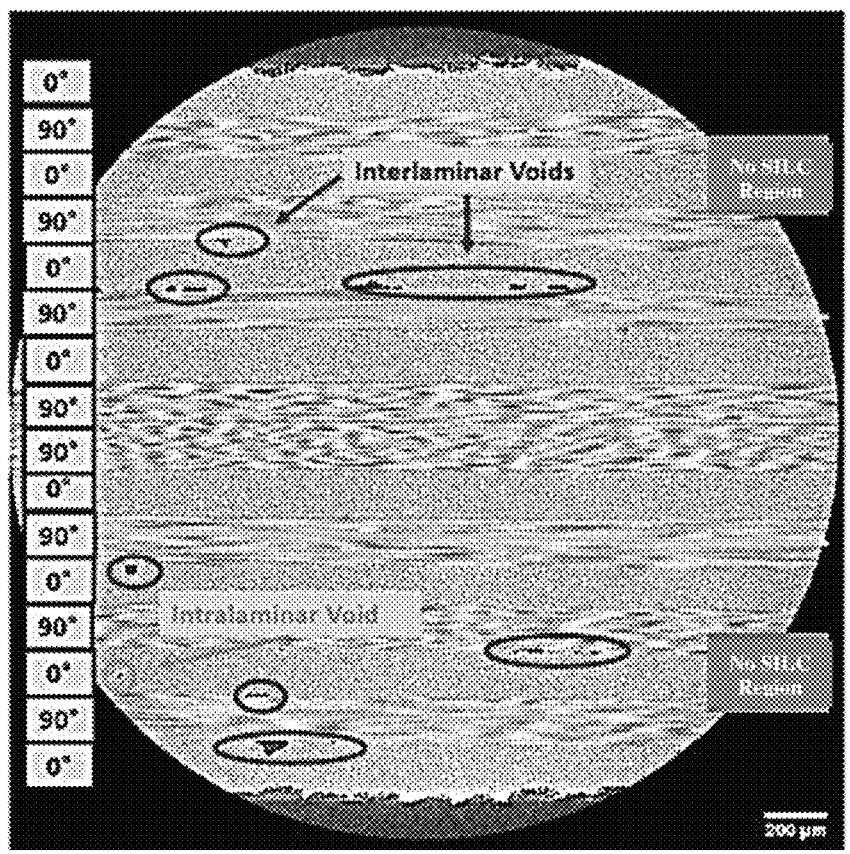
FIGS. 23A-23B depict representative μCT scans of a L-shape specimen.
Figure 23B:
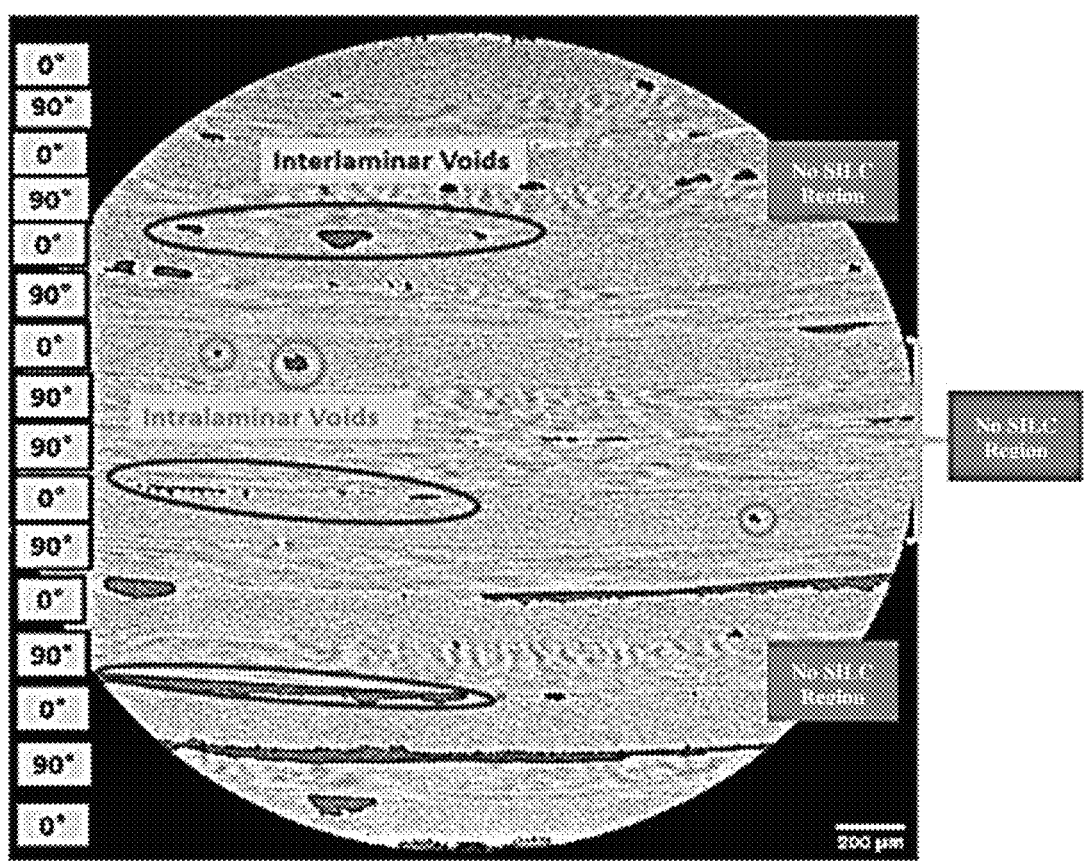

The layup and integration of the specimens was completed as described above with a stacking sequence of [0°/90°]4 s. L-shape geometries can be observed after they are cured. The µCT imaging and void analysis was completed as described above. Each sample was scanned in both the flat and curved section of the geometry midway through the laminate width at the midpoint of the curved and flat region. The approximate locations of the scan are seen in FIG. 22. The SILC utilized in the L-shape investigations was the 4.5 gsm 23 µm PA 66 SILC described above. In the first study, the SILC was applied to only the middle five interfaces and cured without a rubber mat caul plate. This middle 5 SILC interlayer stacking is similar to the flat cured specimen as seen in FIG. 12C. µCT scans of the center of the laminate in the flat region and the curved region are seen in FIGS. 23A-23B.

In the flat region, the void content for the regions without SILC interlayers was vol %. Similar to the work on flat plates described above, no voids were identified in the region where SILC was applied. However, in the curved region this was not the case. In the curved region where SILC interlayers were placed, interlaminar voids were reduced but not eliminated, and intralaminar voids were also observed. The void content percentage where SILCs were placed as interlayers was 0.95 vol %. This is an improvement from the non-SILC region with a void content of 4.18 vol %.

In both the flat and curved regions without SILC, voids were present. Upon further inspection, the region around the curve had a gloss like finish indicating a lack of full compaction as the peel ply layer would cause there to be a more matte finish to occur if otherwise. Subsequently, a 1 mm thick silicone rubber mat was used. A 1 mm thick Al caul plate was used as described above for the plate speci-mens. Rubber was used in the L-shape specimens as opposed to bent aluminum due to its pliability, which enabled it to conform to the laminate along the curve without needing to be precisely machined. The thickness of only 1 mm also helped in that regard. The addition of this a caul sheet or pressure intensifier is not uncommon and has been seen in previous studies [60, 61]. Layups were completed with no SILC applied to the interlaminar regions and 4.5 gsm 23 µm PA 66 SILC applied to all interfaces. FIGS. 24 and 25 show the results. In the flat region of the specimen with SILC, no discernible voids were found with a void percentage of 0.00 vol % compared to 1.13 vol % of the non-SILC specimen. In the curved section, the void percentage of the specimen with 4.5 gsm 23 µm PA 66 SILC was vol % compared to 1.67 vol % with no SILC as shown in FIG. 26. Two rare scattered interlaminar voids ~5 µm in diameter along the center line of the SILC specimen were observed; however, the contribution to void content percentage were less than 0.01 vol %.

FIG. 22 shows approximate L-shape µCT scan points: in the midpoint of the curved and flat regions and midway through the laminate width.

FIGS. 23A-23B show representative µCT scans of a L-shape specimen with 4.5 gsm 23 µm PA 66 in the middle 5 interfaces cured without the 1 mm thick rubber caul plate. In FIG. 23A, the flat area showed no voids in the SILC regions similar to flat plate results described above. In FIG. 23B, the curved area showed both interlaminar and intralaminar voids in the SILC region.

Figure 24A:
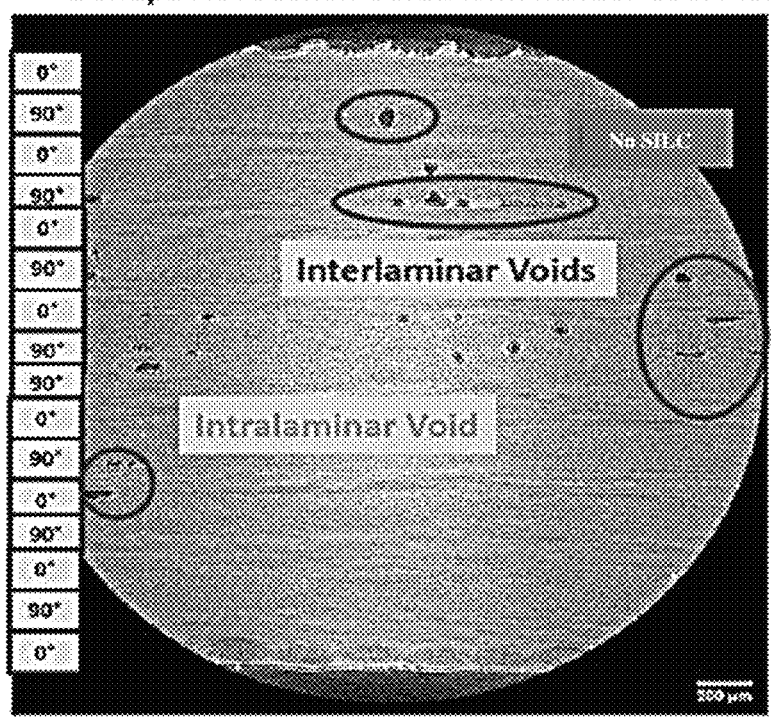
FIGS. 24A-24B depict a flat section of a cured L-shape specimen.
Figure 24B:
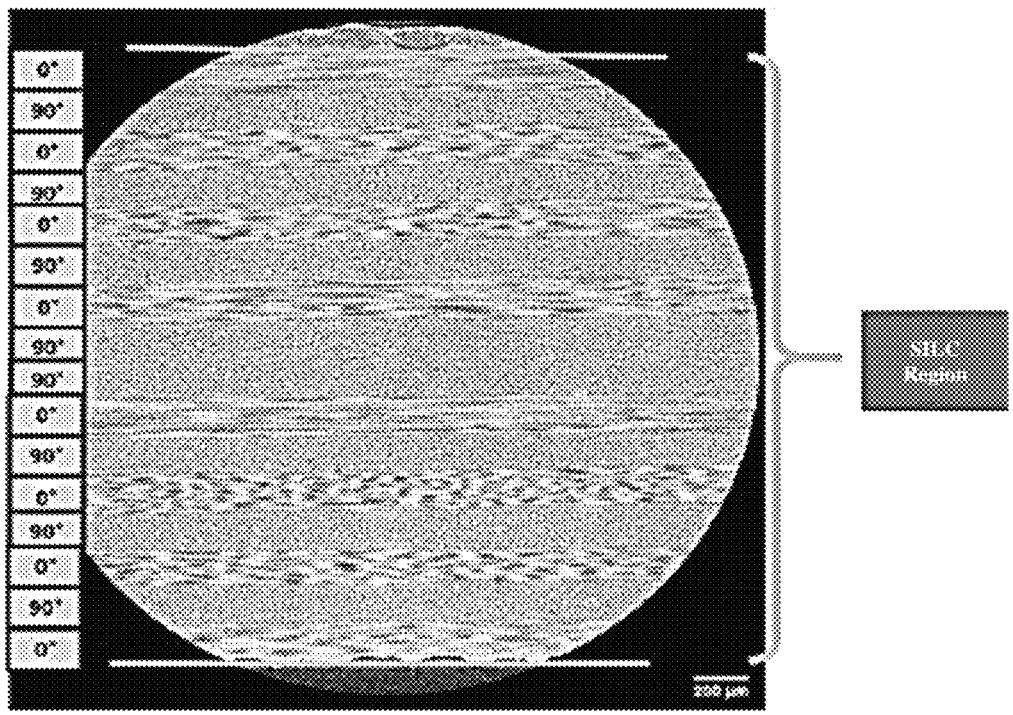

FIGS. 24A-24B show a flat section of L-shape specimen cured with 1 mm thick rubber caul plate. FIG. 24A shows n No SILCs were placed in the interlaminar regions and void content of 1.13 vol % was observed. FIG. 24B shows 4.5 gsm 23 µm PA 66 interlayers were placed in all interlaminar regions (ply-ply interfaces) and void content of 0.00 vol % was observed.

Figure 25A:
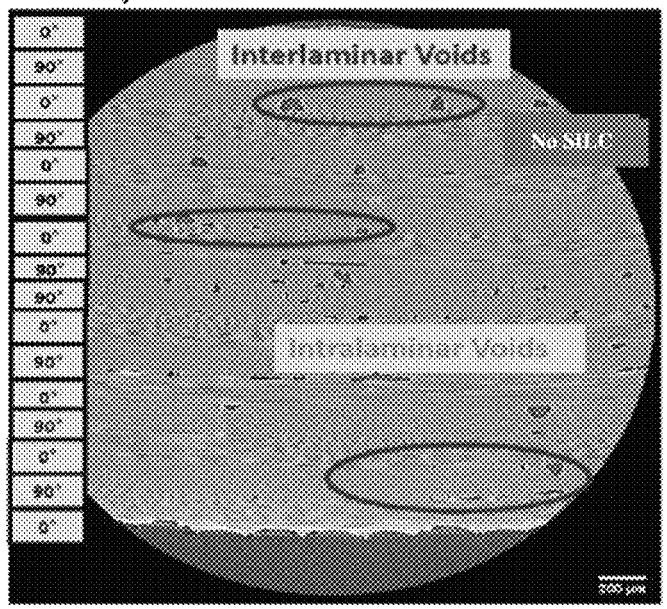
FIGS. 25A-25B depict a curved section of cured L-shape specimen.
Figure 25B:
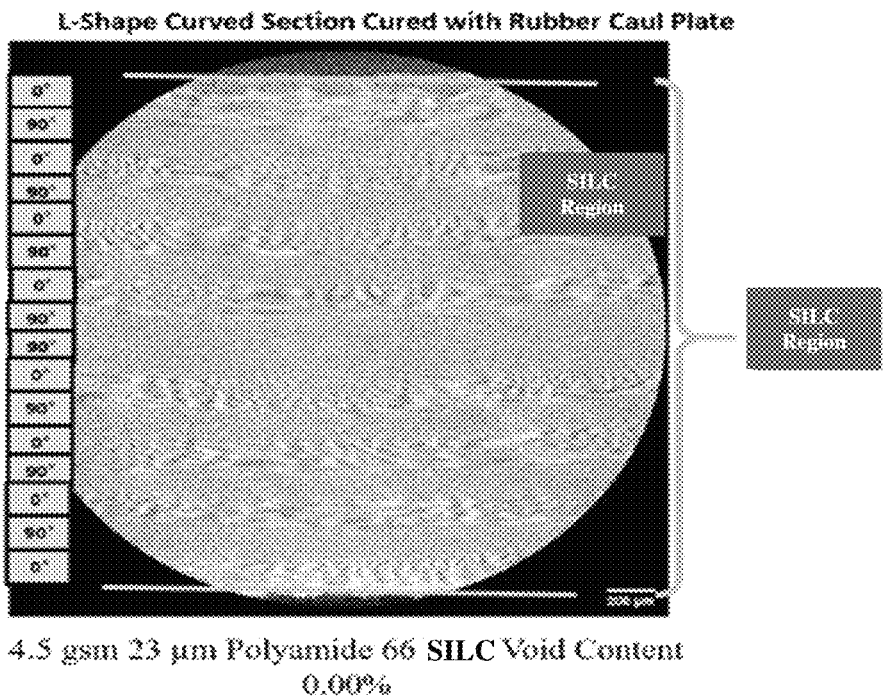
Figure 26:
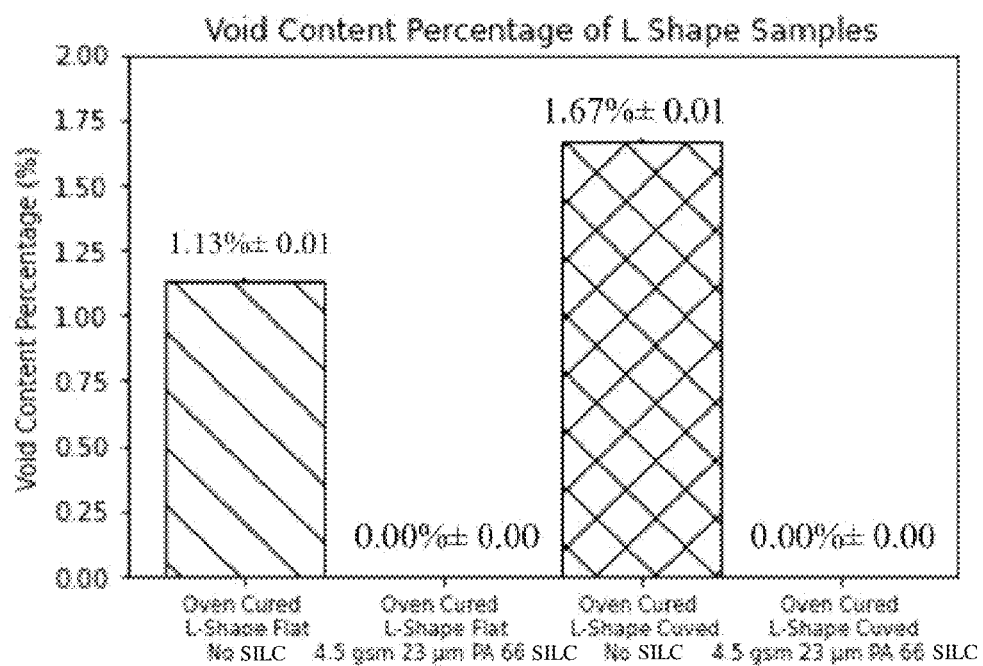
FIG. 26 depicts a void content percentage of L-shape samples.

FIGS. 25A-25B show a curved section of L-shape specimen cured with 1 mm thick rubber caul plate. In FIG. 25A, no SILCs were placed in the interlaminar regions and void content of 1.67 vol % was observed. In FIG. 25B, 4.5 gsm 23 µm PA 66 interlayers were placed in all interlaminar regions (ply-ply interfaces) and void content of 0.00 vol % was observed. Two rare scattered interlaminar voids were observed ~5 µm in diameter along the center line, however, the contribution to void content percentage was less than 0.01 vol %.

FIG. 26 shows a void content percentage of L-shape samples.

Figure 27A:
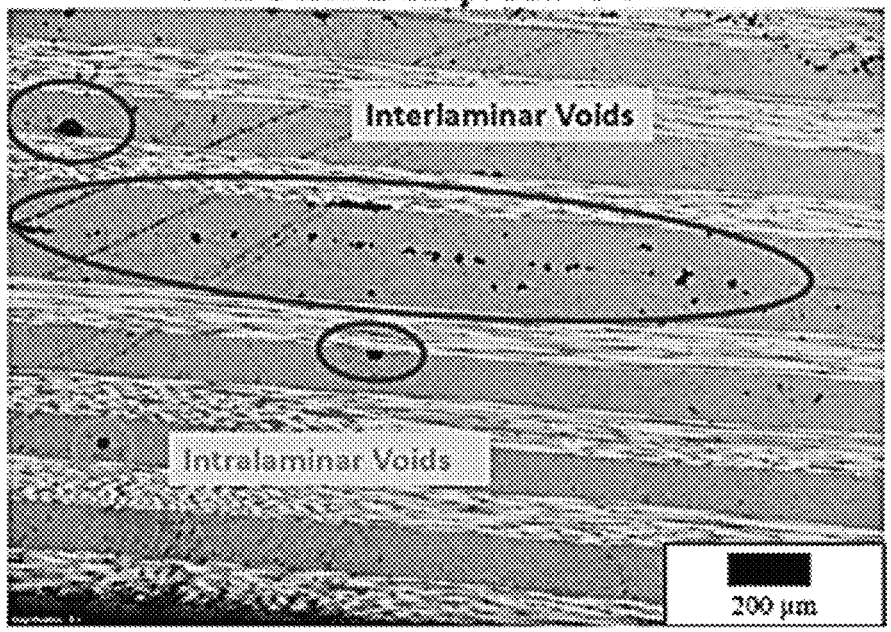
FIGS. 27A-27B depicts representative microscopy images of the flat region of L-shape specimens.
Figure 27B:
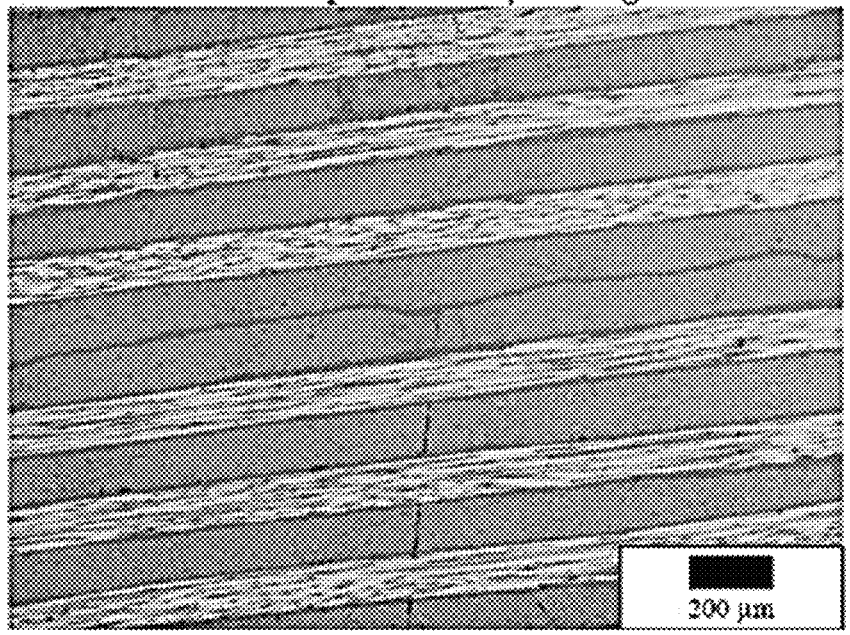

FIGS. 27A-27B show representative microscopy images of the flat region of L-shape specimens. FIG. 27A shows a specimen without any SILC shows interlaminar and intralaminar voids. FIG. 27B shows a specimen with 4.5 gsm 23 µm PA 66 interlayers is void-free. There is a 10-15 µm increase in interlaminar thickness which can be easily seen in the middle interlaminar region.

Figure 28A:
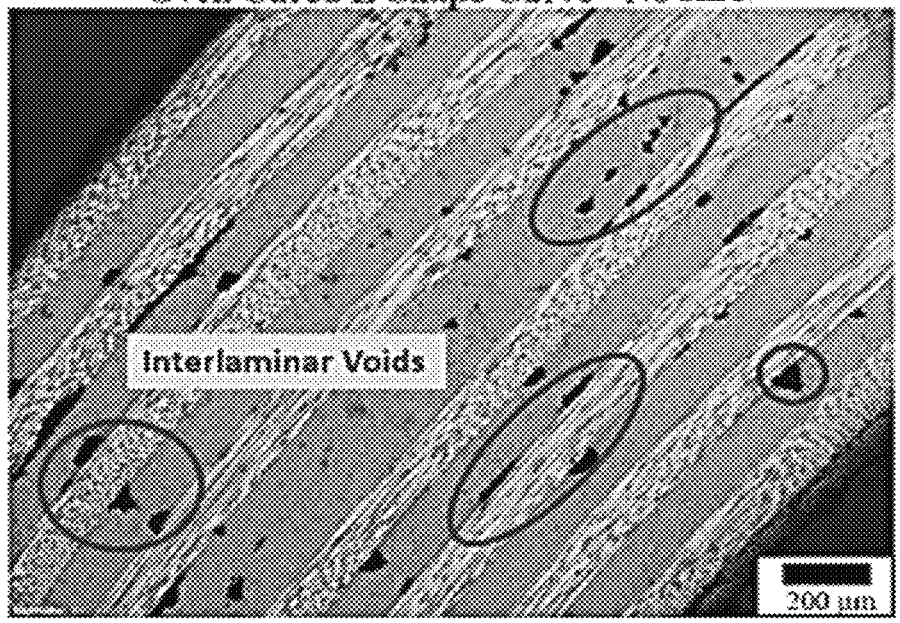
FIGS. 28A-28B depict representative microscopy images of the curved region of L-shape specimens.
Figure 28B:
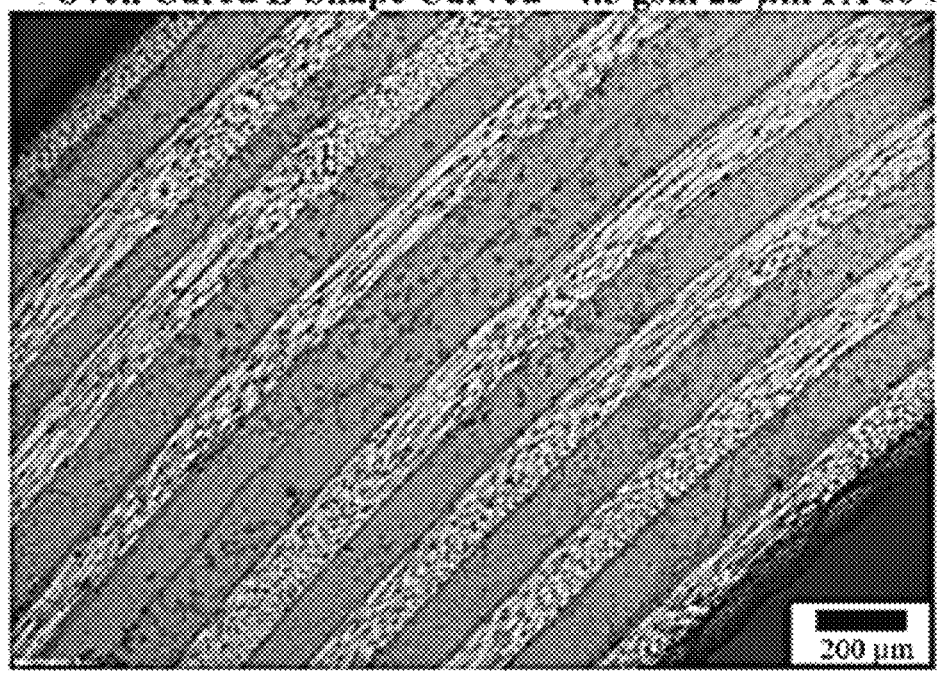

FIGS. 28A-28B show representative microscopy images of the curved region of L-shape specimens. FIG. 28A shows a specimen without any SILC shows interlaminar and intralaminar voids. FIG. 28B shows a specimen with 4.5 gsm 23 µm PA 66 interlayers is void-free. There is a 10-15 µm increase in interlaminar thickness which can be easily seen in the middle interlaminar region.

Microscopy confirmed this result in both of the flat region and the curved region as seen in FIGS. 27A-27B and FIGS. 28A-28B. The microcopy images were taken mid-width of the specimen after being polished with 320, 400, 500, 800, and 1200 American grit sandpaper (P400, P800, P1200, P2400, P1000 European grit). In specimens with no SILC, both interlaminar and intralaminar voids were observed. The higher amount of darker regions optically observed showing voids in non-SILC samples conforms to the higher void percentage measured by μCT. With the SILC specimens, no voids were observed in either the curved or flat regions. There is a clear interlaminar region increase of 10-15 μm that can easily be seen in the middle interface between the 90° plies due to the 23 μm thick 4.5 gsm PA 66 SILC interlayer. Additionally, challenges such as fiber wrinkling were not observed due to the non-tacky and compliant SILC. This promising result shows the VBO curing can be utilized to make void-free composites when SILCs are placed in the interlaminar region in L-shape and other complex geometries that require curved geometries, albeit with a likely undesired increase in interlaminar thickness and laminate total thickness.

Figure 29A:
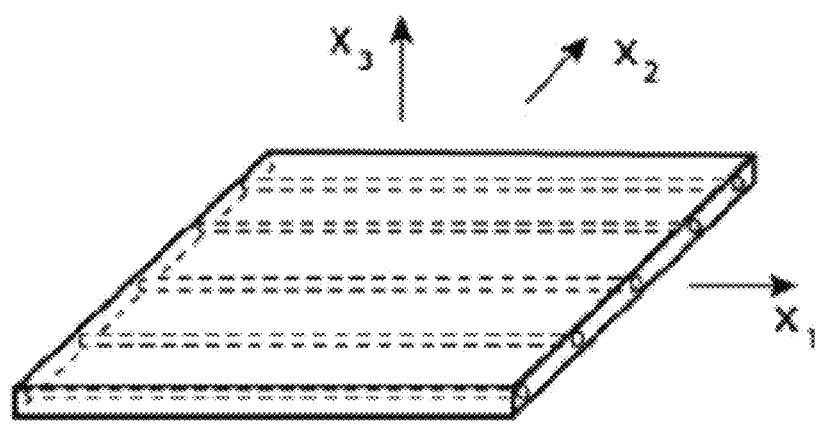
FIGS. 29A-29B depict a comparison of a unidirectional ply and a woven ply.
Figure 29B:
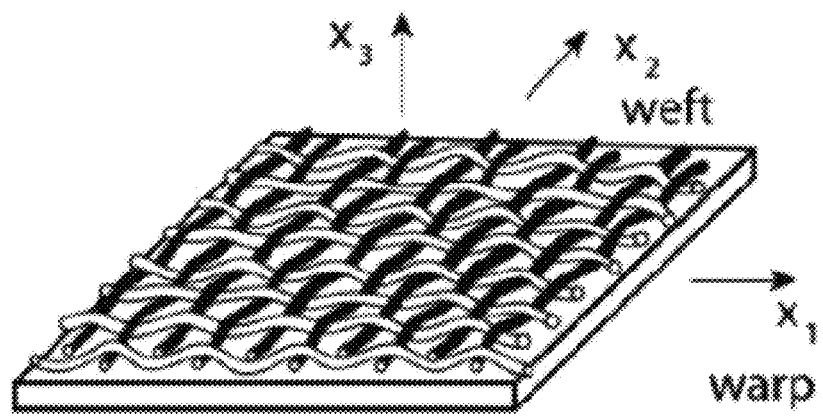

Preliminary Investigations into Autoclave-Grade Woven Prepreg with SILC Interlaminar Integration for VBO Curing Unidirectional (UD) plies have fibers aligned in one direction. They are strong in the fiber direction (longitudinal direction) where the fiber properties dominate and weak in the orthogonal direction (transverse direction) where the matrix properties dominate. Laminates can be engineered to have different mechanical couplings by alternating the direction of stacked plies. Additionally, UD plies have higher static strength, allow for increased fiber volume fractions and elastic properties compared to woven fabrics. Woven fabrics, where fiber tows run in orthogonal directions and woven together, are used to create a fabric with more uniform in plane strength regardless of direction as seen in FIGS. 29A-29B. FIGS. 29A-29B show diagrams comparing: unidirectional ply (FIG. 29A) and woven ply FIG. 29B). This has some drawbacks, such as lower fiber fraction due to the fibers not being as closely packed together and weaves preventing fibers from being straight, both affecting the static strength and stiffness negatively. Woven fabrics tend to have similar transverse and longitudinal strength values and higher drapability due to the weave. They are also more resistant to outer surface damage as, unlike UD prepreg, the fibers cannot peel out or split when damage occurs as they are interwoven. Woven fabrics are often utilized to create hybrid laminates with woven fabrics placed on the surface of a laminate to prevent delamination when holes are drilled, increase the abrasion resistance, and improve impact damage resistance. The interfaces of UD-UD plies (described above) to be investigated for more universal application of VBO with SILC cures. Woven fabrics have been shown to be more challenging than UD plies for OoA prepreg. Ridgard noted that for void suppression, the dry pathways must persist for a significant time during the manufacturing process. To do so the cross sections need to be nearly completely non-impregnated in woven fabrics.

FIG. 30 shows a diagram of the different prepreg morphologies and interfaces of specimens tested.

Figure 31A:
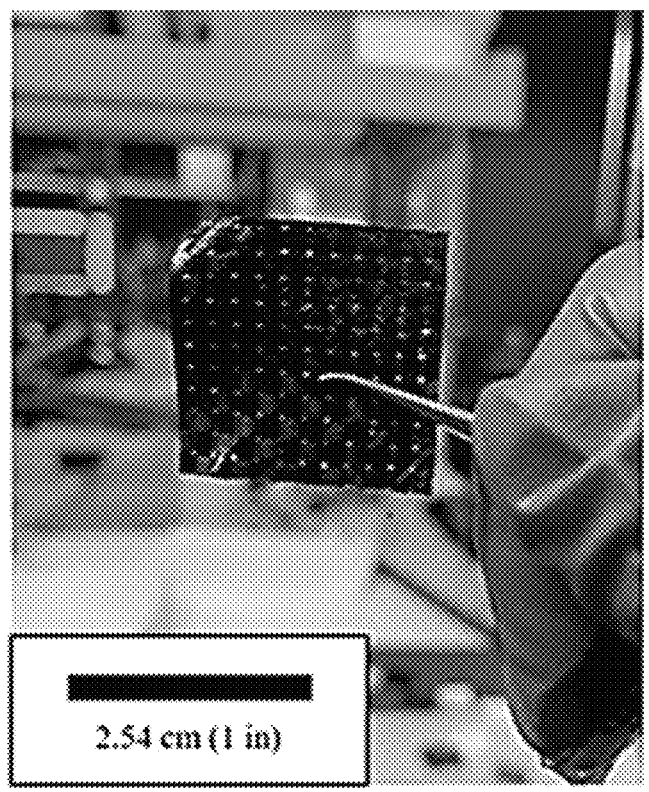
FIGS. 31A-31B depict woven prepreg characteristics.
Figure 31B:
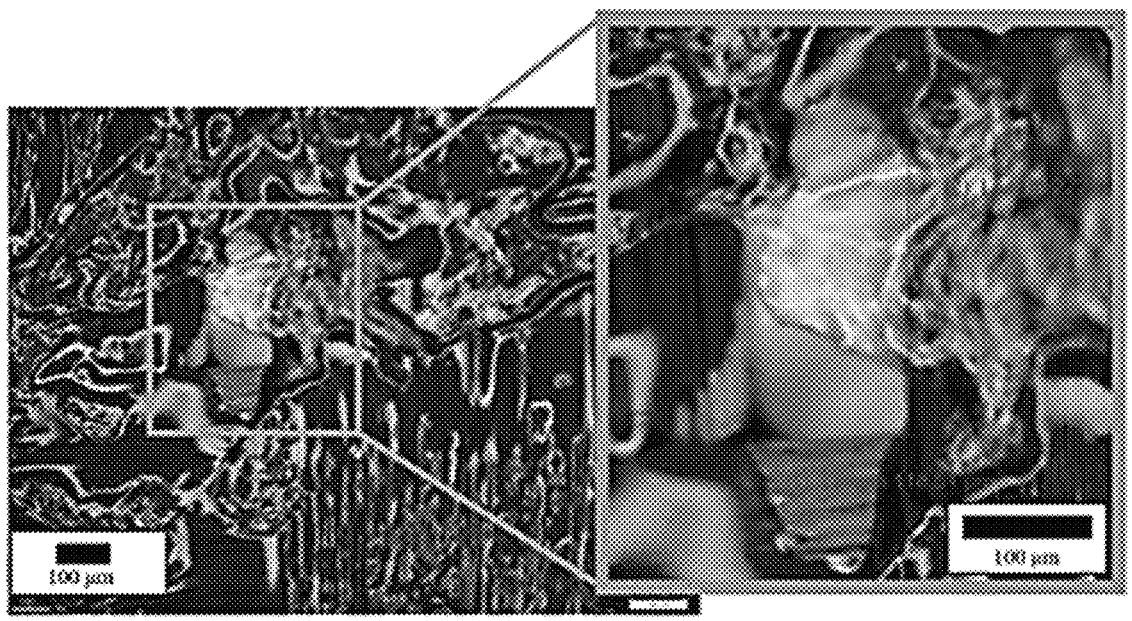

The woven prepreg system utilized was IM7/8552 plain weave which had a warp to fill ratio of 50 to 50, a fiber volume percentage of 55.57 vol %, and a mass of 196 g/m 2. An optical image of the woven fabric can be seen in FIGS. 31A-31B with the call out box showing a region where there are no fiber tows. FIGS. 31A-31B show IM7/8552 woven prepreg characteristics: 1) an optical image of woven fabric ply (FIG. 31A); and an optical microscopy image of woven ply (FIG. 31B). The glossy area is the preimpreginated resin and the gap between the fibers tows as seen in the inset is one of the regions where voids still persist even after the integration of SILC. The laminates were manufactured as described above but laid up in a 8-ply stacking sequence of $[0^{UD}/0^{Fabric}]_{2s}$ with the UD plies for the investigations of UD-woven interfaces and $[0^F]_{4s}$ s for the investigations of woven-woven interfaces. Various methods of SILCs were applied using the VBO and extended VBO cures with mixed success. The specimens showed void reduction but not elimination. The UD-woven laminates achieved a void percentage of under 1 vol % with the 70-80 μm tall A-CNT SILCs. However, after further investigation, large but rare void pockets still existed. For woven-woven laminates void percentage was never reduced to under 1 vol %. The A-CNT SILCs were manufactured as previously described.

SILC Integration at Unidirectional-Woven Ply Interfaces

Figure 32:
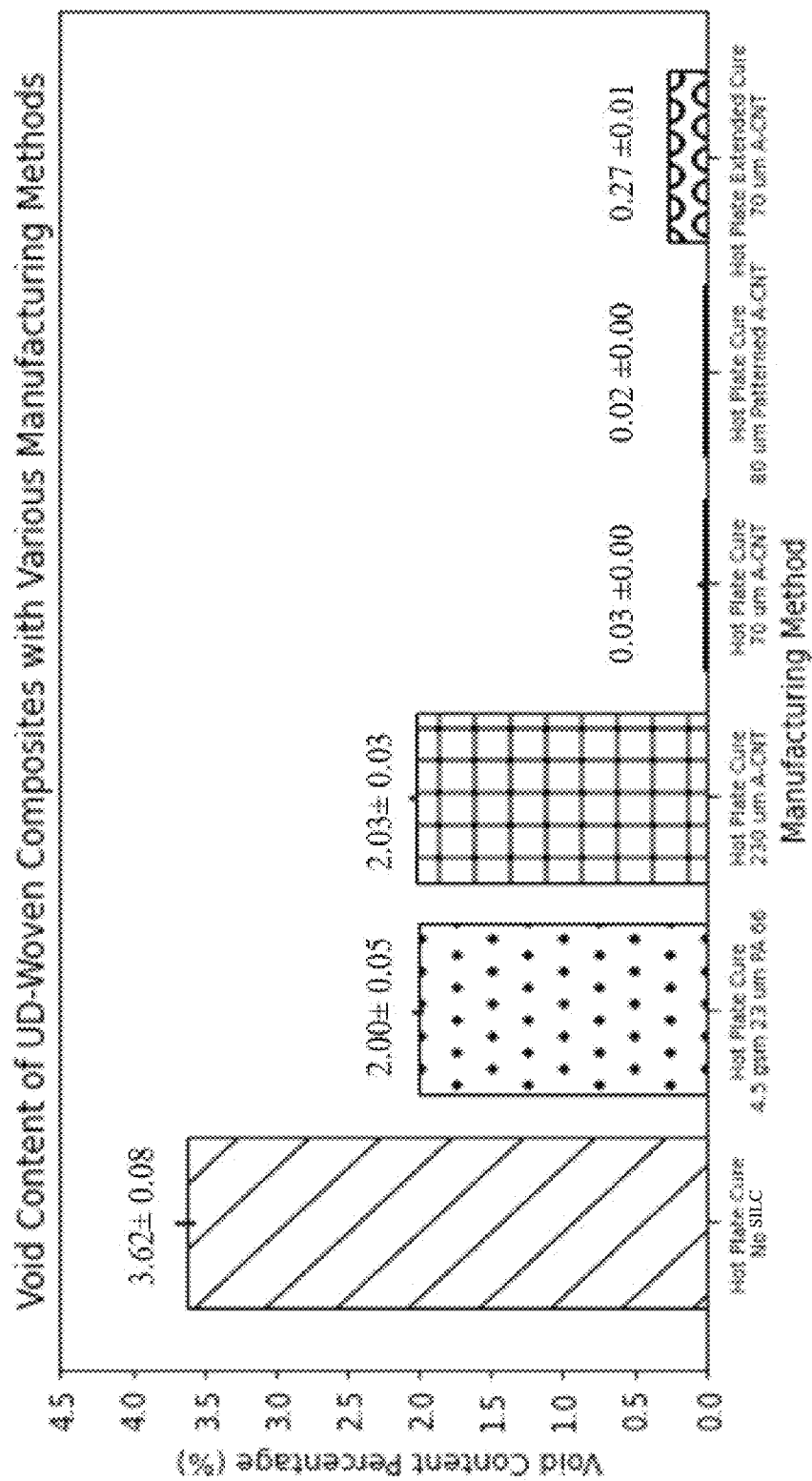
FIG. 32 depicts void content of 8UD-woven fabric laminates cured with various methods and SILC interlayers.
Figure 33A:
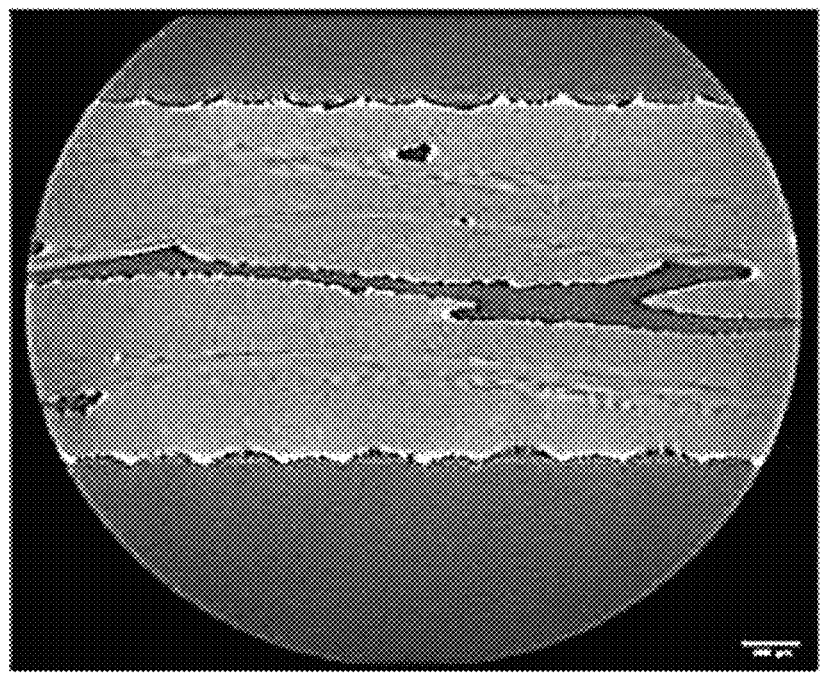
FIGS. 33A-33F depict representative μCT images of hybrid laminates.
Figure 33B:
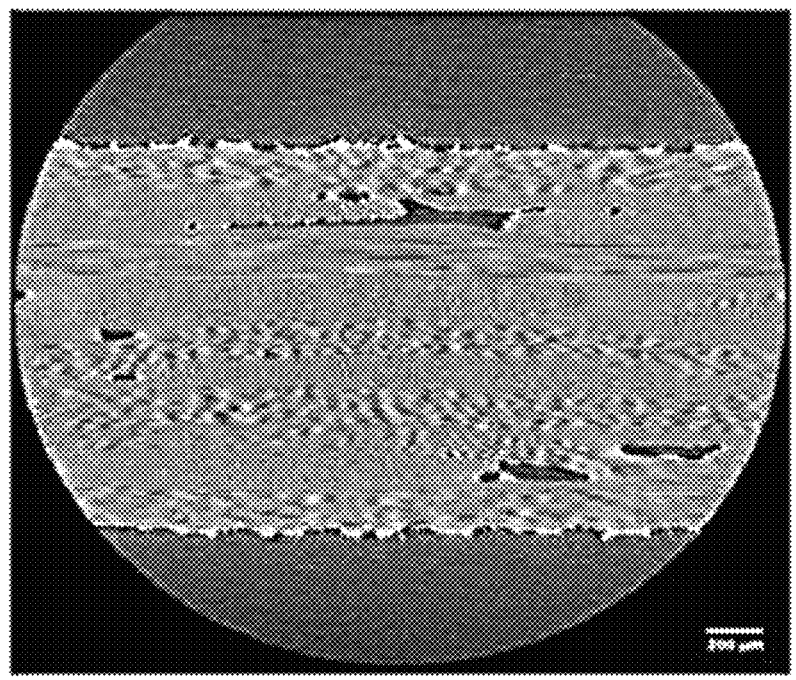
Figure 33C:
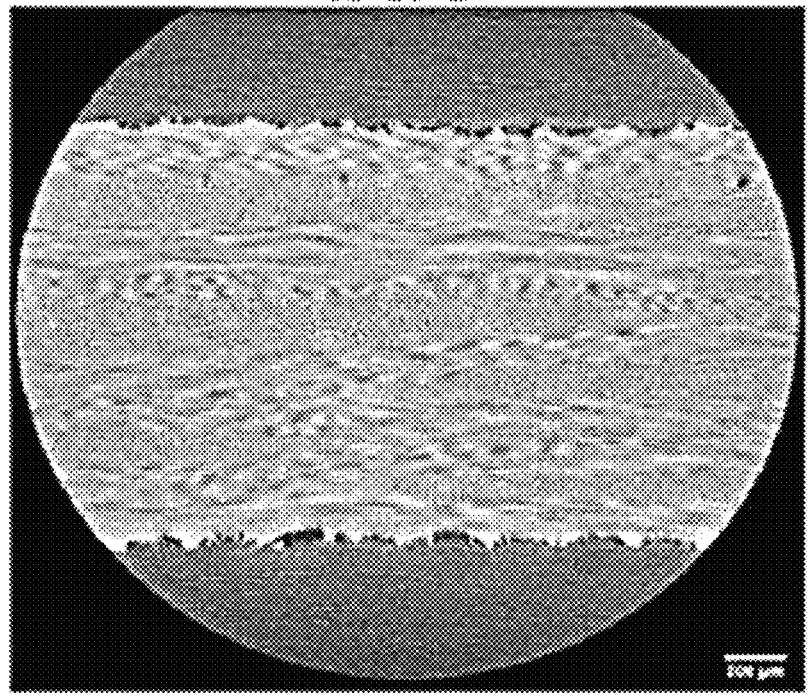
Figure 33D:
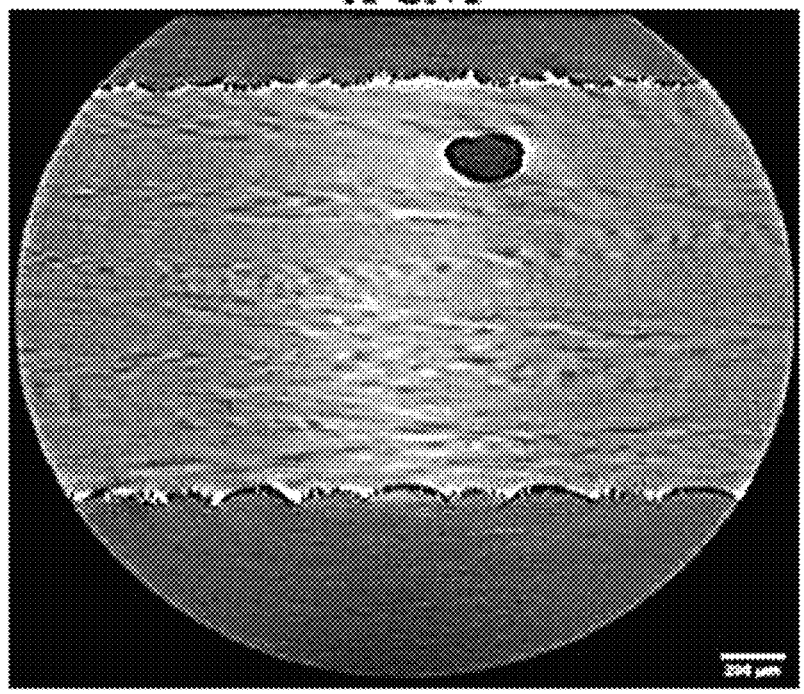
Figure 33E:
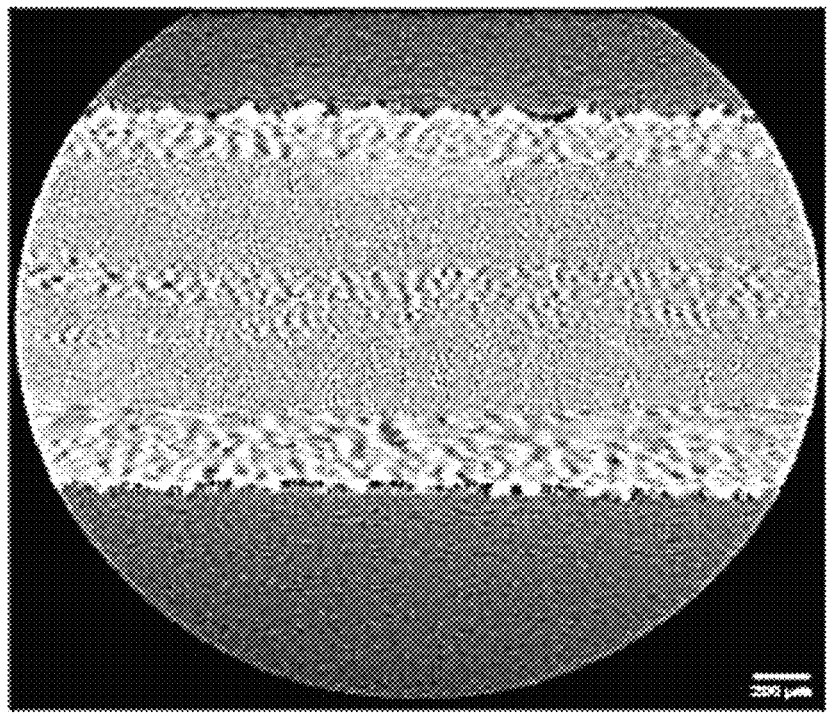
Figure 33F:
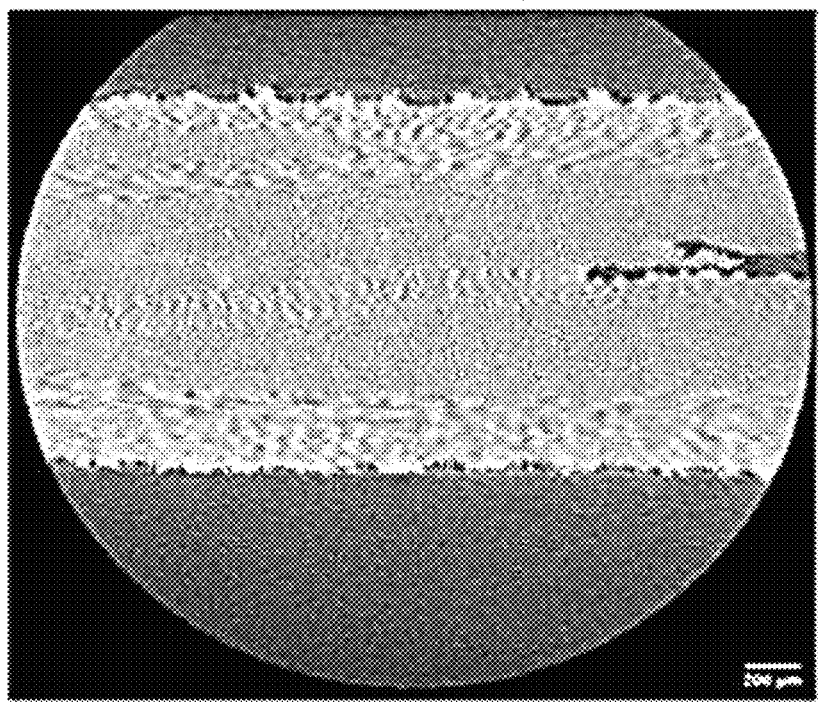

Interfaces between UD and woven plies occur in hybrid laminates where oftentimes a woven ply is placed on the outer layer of the laminate for abrasion, surface, and impact resistance. The natural morphology of the weave presents a larger challenge for void elimination with SILCs due to its varying interlaminar thickness. The μCT imaging and void analysis of the manufactured laminates was completed as described above. The greatest success in void reduction in UD-woven fabric specimens were with 70 to 80 μm A-CNTs, in both patterned and non-patterned configurations, where void content was found to be less than 0.3 vol % as depicted in FIG. 32 and Table 2. FIG. 32 shows void content of 8-ply IM7/8552 UD-woven fabric $[0^{UD}/0^{Fabric}]_{2s}$ laminates cured with various methods and SILC interlayers. However, as FIGS. 33A-33F depict, there are still rare but large (>200 μm) voids seen in some slices and the laminates are not void-free. FIGS. 33A-33F show representative μCT images of 8-ply IM7/8552 hybrid laminates alternating between woven and unidirectional prepreg plies, $[0^{UD}/0^{Fabric}]_{2s}$ cured via hot plate with various SILCs at all ply interfaces showing: in FIG. 33A, the baseline containing no SILC layers with a large elongated voids and an overall void content percentage of 3.62 vol %; in FIG. 33B, 230 μm aligned CNT SILC with a void percentage of 2.03 vol %; in FIGS. 33C-33D, 80 μm patterned CNT SILC with a void percentage of 0.02 vol %; in FIGS. 33E-33F, 70 μm aligned CNT SILC with an extended cure cycle with a void percentage of 0.27 vol %. While most slices of the of the 80 μm patterned CNT and 70 μm aligned CNT SILC with an extended cure can be represented by FIG. 33C and FIG. 33E respectively, FIG. 33D and FIG. 33F show that the specimens are clearly not void-free and contains rare but large voids.

Additionally, A-CNTs with a height of 230 μm and the electrospun 4.5 gsm 23 μm PA 66, as described above, are utilized as SILC materials with a void content percentage of 2.03 vol % and 2.00 vol % respectively. While the introduction of SILC in the interlaminar region using VBO curing decreased void content from 3.62 vol %, more work needs to be done to ensure complete void removal. This result regardless might be might be promising for non-aerospace applications like wind and infrastructure.

TABLE 2

Table of void content for 8-ply IM7/8552 UD-woven fabric $[0^{UD}/0^{Fabric}]_{2s}$ laminates cured with various methods and SILC interlayers.

| Manufacturing Method | Void Content (vol %) | Standard Error (+/−) | Percent Change from No SILC Specimen (%) |
|---|---|---|---|
| Hot Plate Cure No SILC | 3.62 | 0.08 | 0.0% |
| Hot Plate Cure 4.5 gsm 23 µm PA 66 | 2.00 | 0.05 | −44.7% |
| Hot Plate Cure 230 µm A-CNT | 2.03 | 0.02 | −43.9% |
| Hot Plate Cure 70 µm A-CNT | 0.03 | 0.00 | −99.3% |
| Hot Plate Cure 80 µm Patterned A-CNT | 0.02 | 0.00 | −99.5% |
| Hot Plate Extended Cure 70 µm A-CNT | 0.27 | 0.01 | −92.5% |

Figure 34:
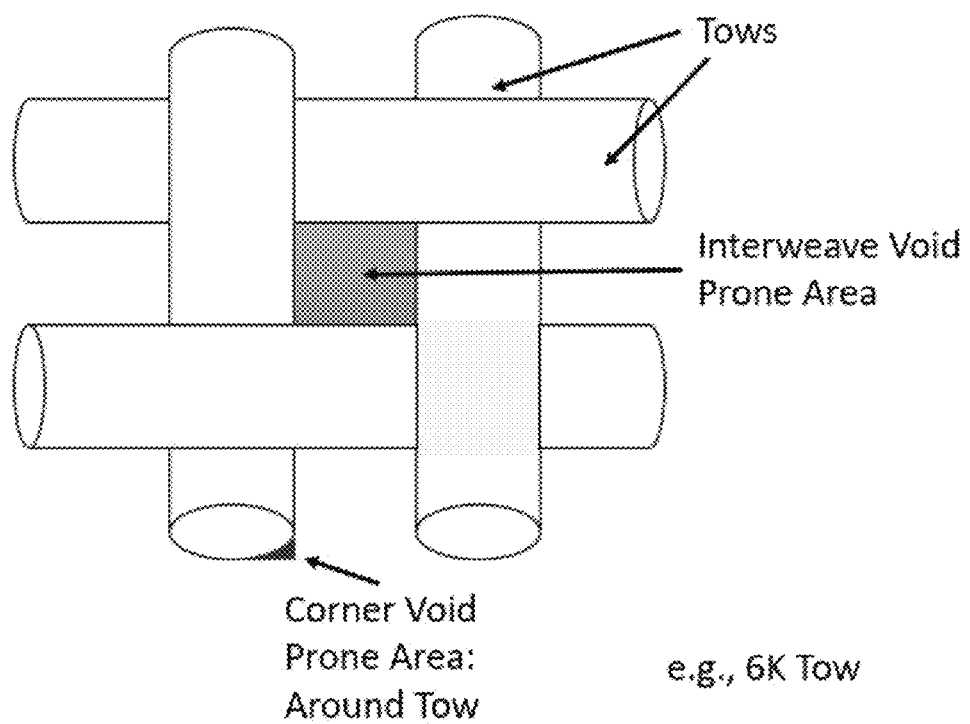
FIG. 34 depicts identified void prone areas.

In specimens made with woven fabric, two void prone areas are identified as depicted in FIG. 34. FIG. 34 shows identified void prone areas. Interweave void prone area (orange) occurs in areas where there are gaps between tows. Corner voids occur in the corner region of the elliptical tows and can generally follow a tow along its length. The first is described as an interweave void prone areas and occurs in between tows where there are no fibers. The second is what is described as corner void prone areas. As the tows typically have an elliptical, not rectangular, cross section, the tow perimeters have regions in the corners where there are no fibers and in these areas the corner voids occur and can follow the tow length. Illustrations on how they appear in the 2D slices of µCT are shown in FIGS. 35A-35B, followed by representative µCT slices showing voids in both regions (FIG. 35B).

Figure 35A:
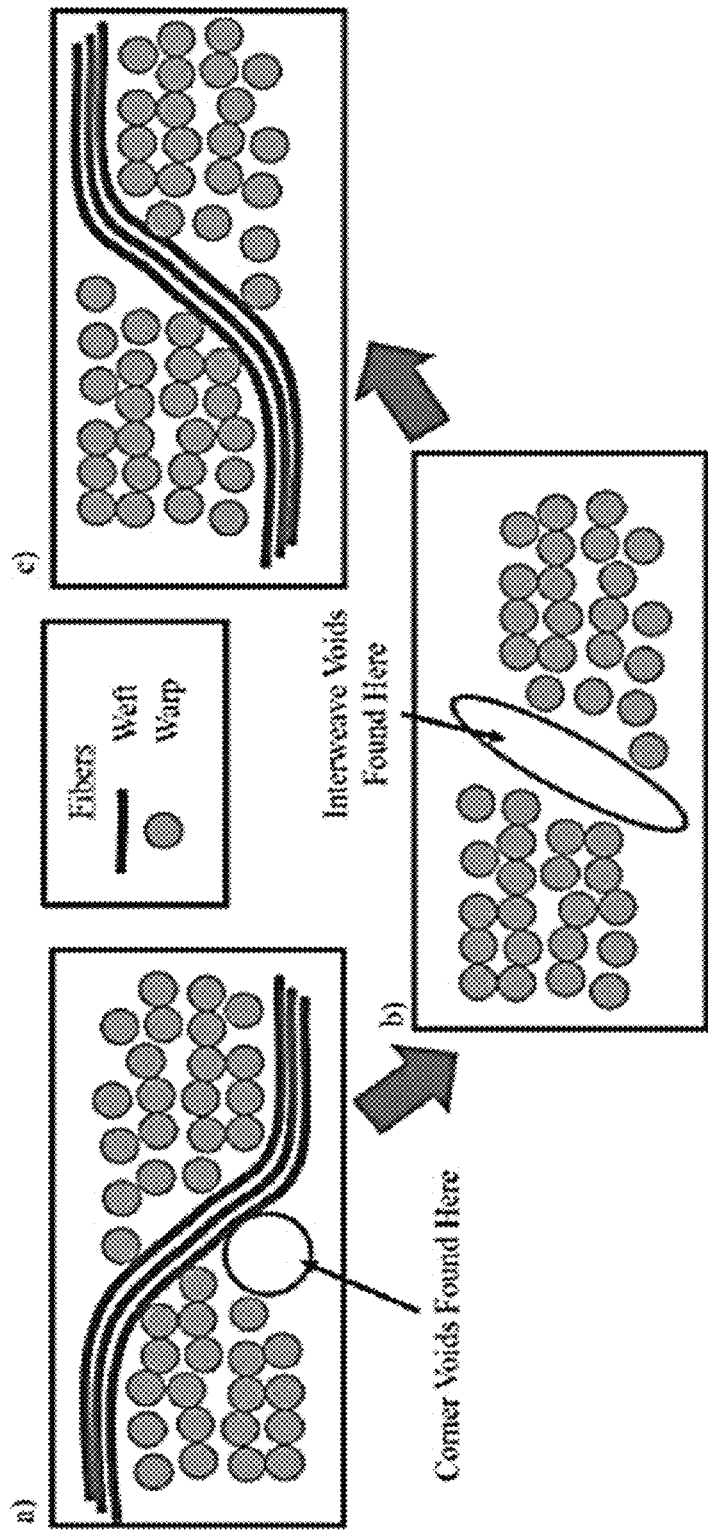
FIGS. 35A-35B depict representative images of void locations in UD-woven laminate interfaces.
Figure 35B:
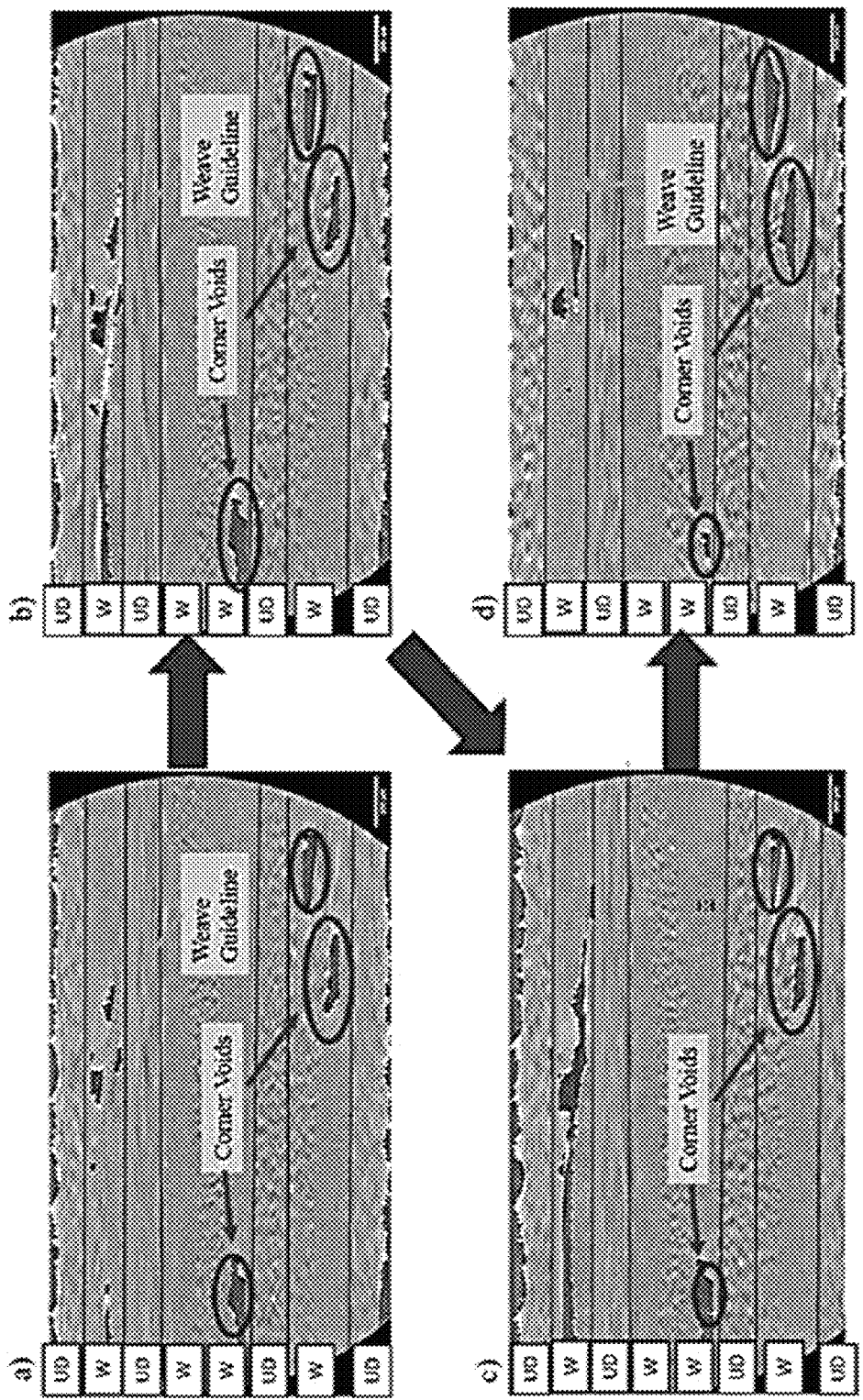

FIGS. 35A-35B show representative images of void locations in UD-woven laminate interfaces: FIG. 35A shows a diagram showing warp (orange) and weft (blue) fiber tows and how interweave voids appear on the slices as they progress (a to c) in a µCT scan where the weft fiber tows disappear. Due to the weave pattern the weft tows have the opposite slope when they reappear; and FIG. 35B shows voids in the µCT images of a UD-woven laminate with 230 µm CNT SILC interlayers. The red circles are corner voids. The interweave void progression can be seen in the green boxed woven ply. An orange guideline drawn to enable tracking of the weave slope flip (a to d).

Figure 36A:
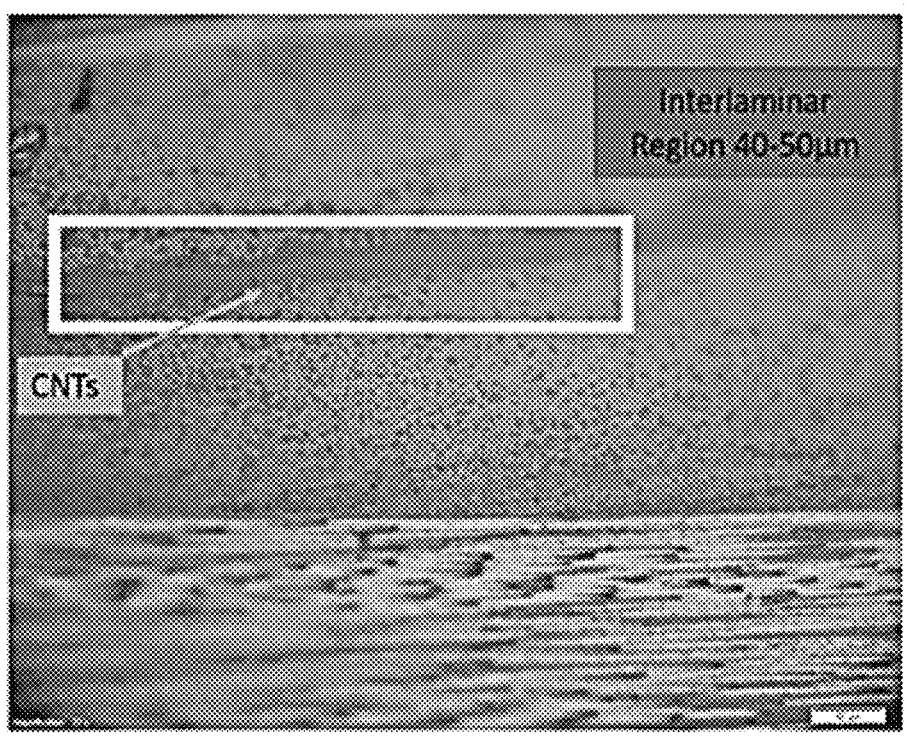
FIGS. 36A-36D depict cross sectional optical microscopy of samples.
Figure 36B:
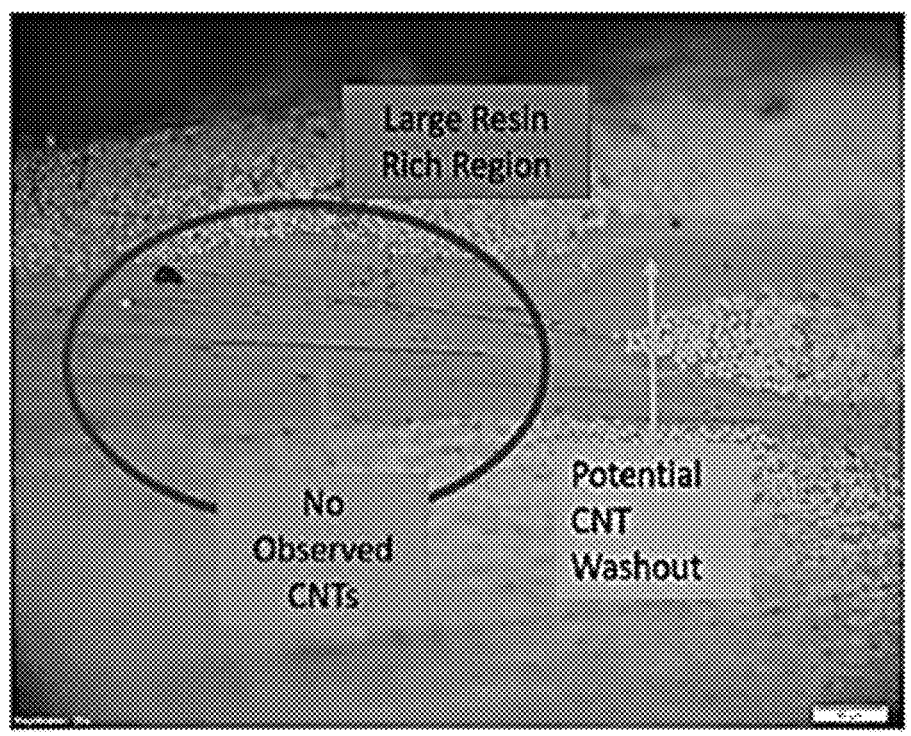
Figure 36C:
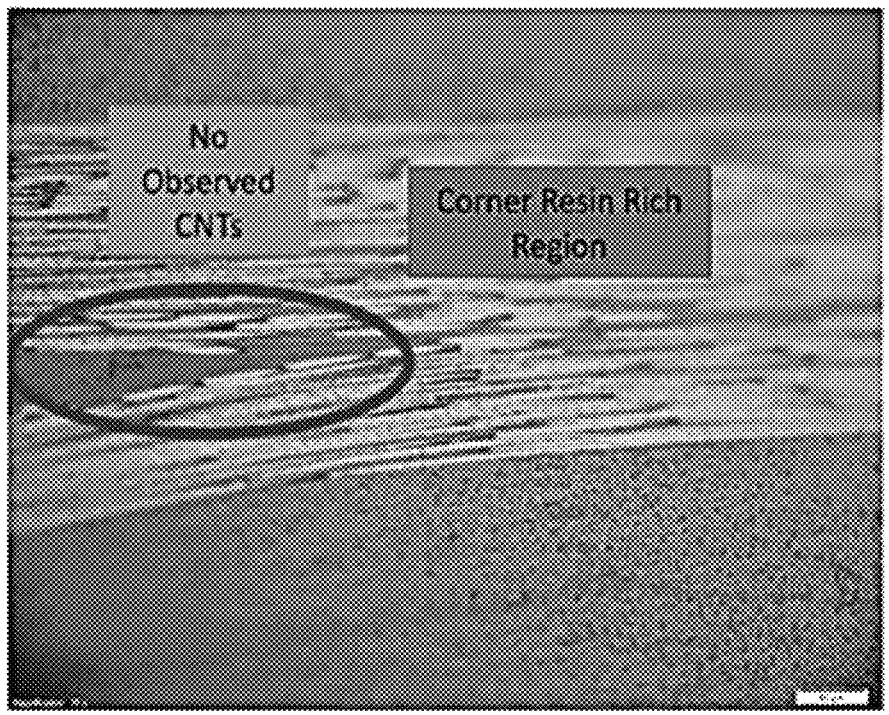
Figure 36D:
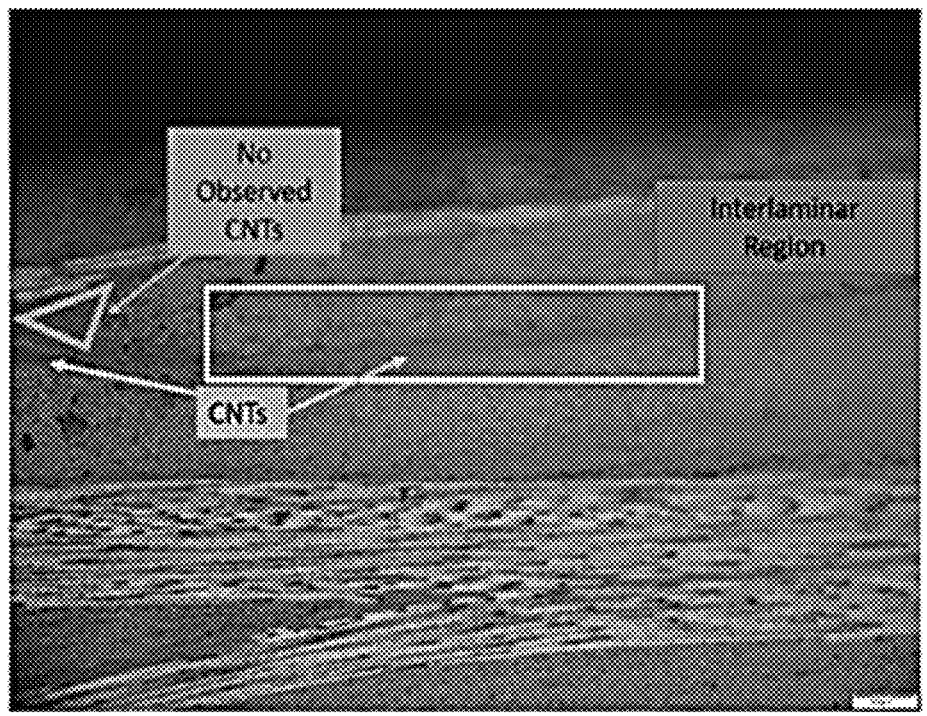

Cross sectional optical microscopy was completed to investigate the voids that occurred in the woven plies. FIGS. 36A-36D show four images of a UD-Woven specimen with µm A-CNT interlayers. FIGS. 36A-36D show cross sectional optical microscopy of interlaminar regions and resin-rich regions in samples of Woven-UD interfaces with 70 µm A-CNT interlayers: CNTs and interlaminar thickness of ~20 µm (FIG. 36A); a large resin-rich interface where there is some evidence of no CNTs (FIG. 36B); corner region where there no CNTs are observed (FIG. 36C); CNTs in the interlaminar region follow the bottom ply and do not integrate into the corner region where there are no observed CNTs (FIG. 36D). The lack of CNTs in the corner region (FIG. 36D) and the interweave resin-rich region (FIG. 36B) is important as those areas are typically where voids have been found with µCT scans. The interlaminar thickness is ~20 µm. There is some evidence of a lack of CNTs in the corner region and the interweave region which are the void heavy regions of the woven plies. FIGS. 36A-36D show that though the CNTs follow the interlaminar region, they fail to enter the corner region leaving a resin-rich region. This leads to the hypothesis that the voids in the woven fabric are not eliminated due to the lack of the penetration of SILC into the corner and interweave regions.

SILC Integration at Woven-Woven Ply Interfaces

Figure 37:
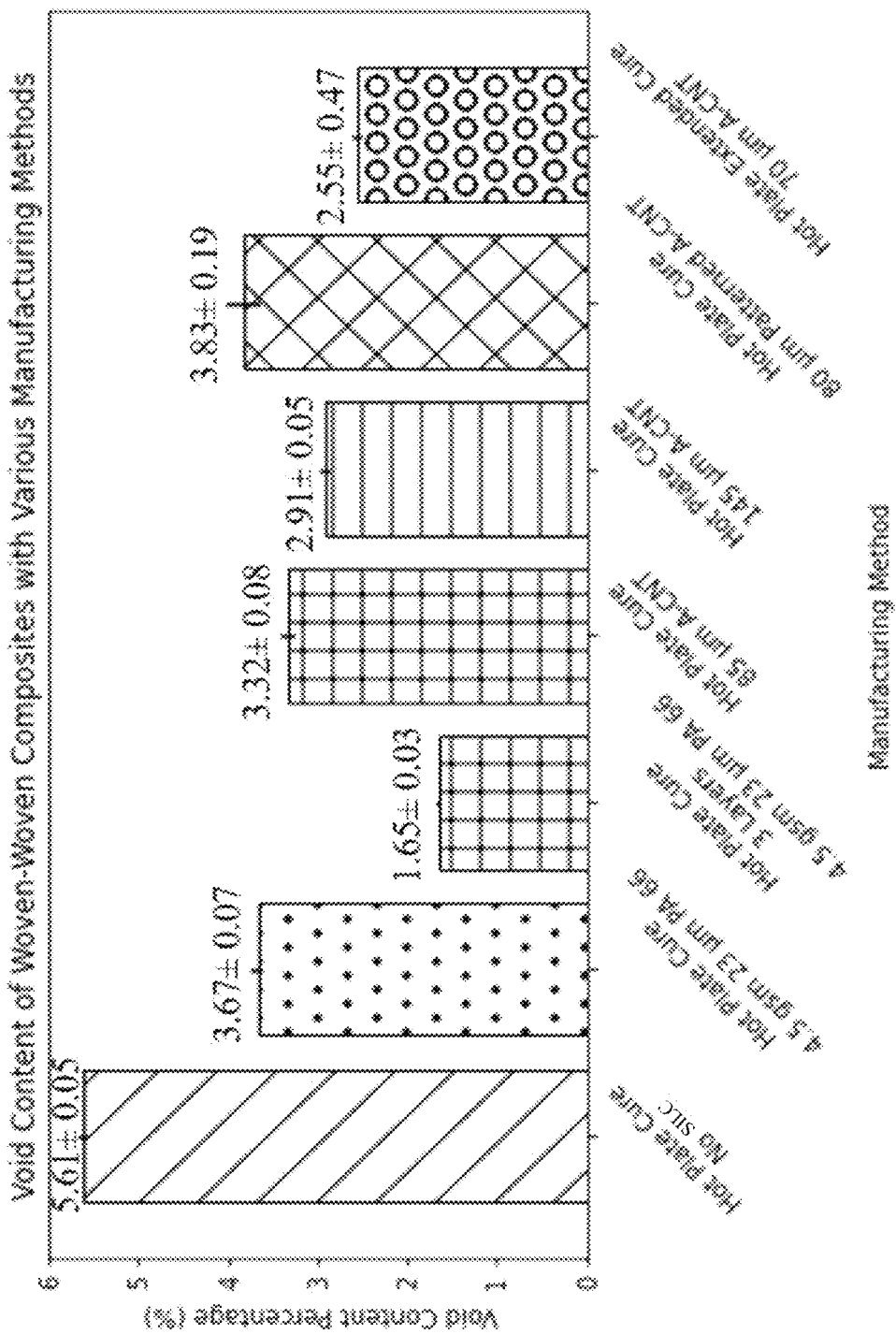
FIG. 37 depicts void content of woven fabric laminates cured with various methods and SILC interlayers.
Figure 38A:
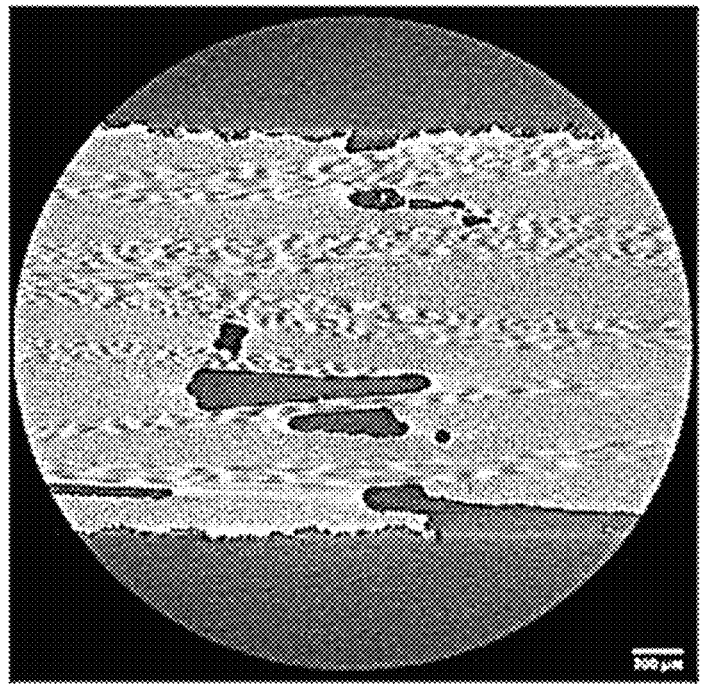
FIGS. 38A-38C depict representative μCT images of woven laminates.
Figure 38B:
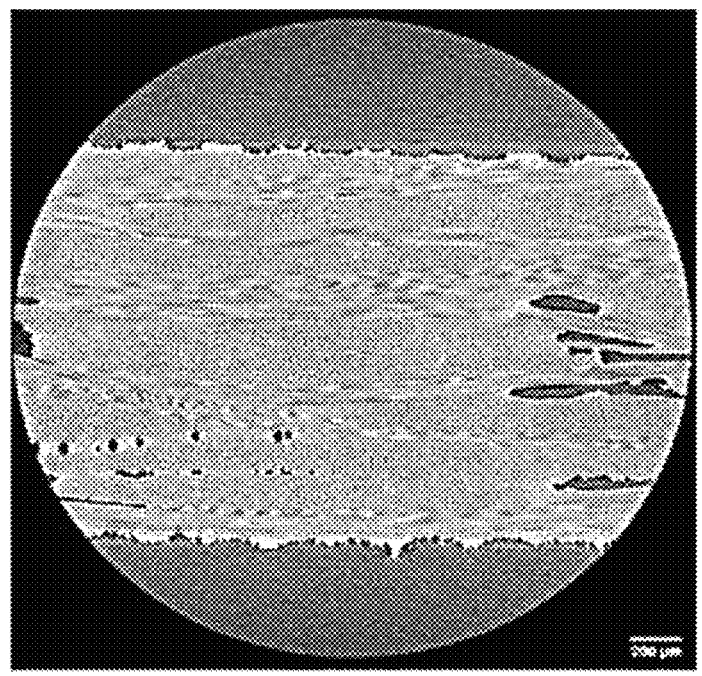
Figure 38C:
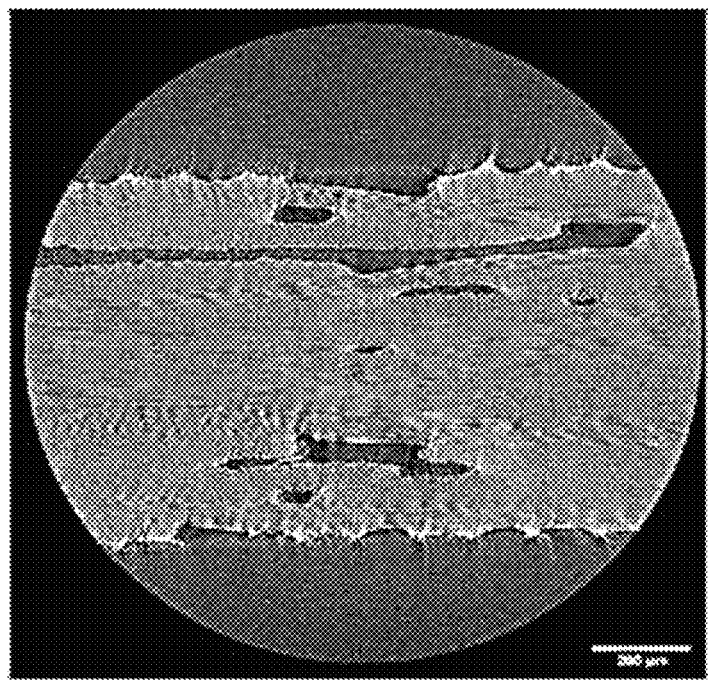
Figure 39:
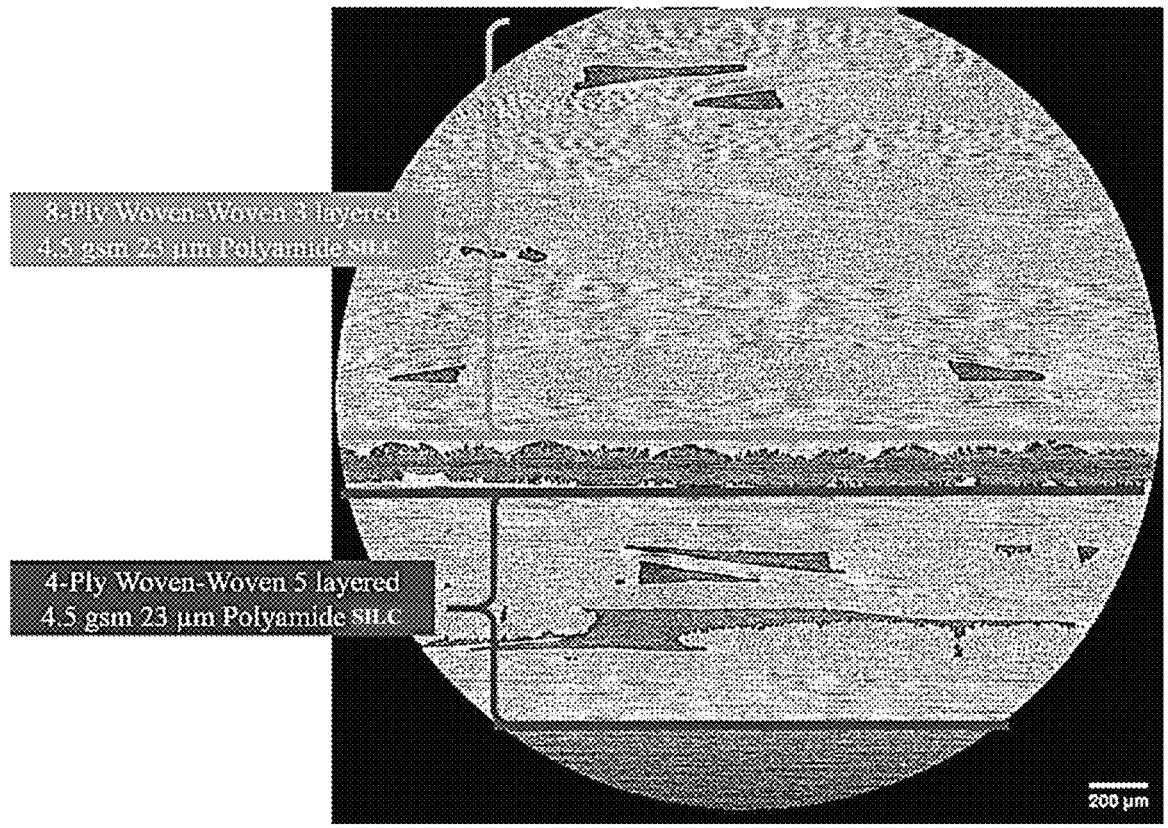
FIG. 39 depicts an 8-ply laminate.
Figure 40:
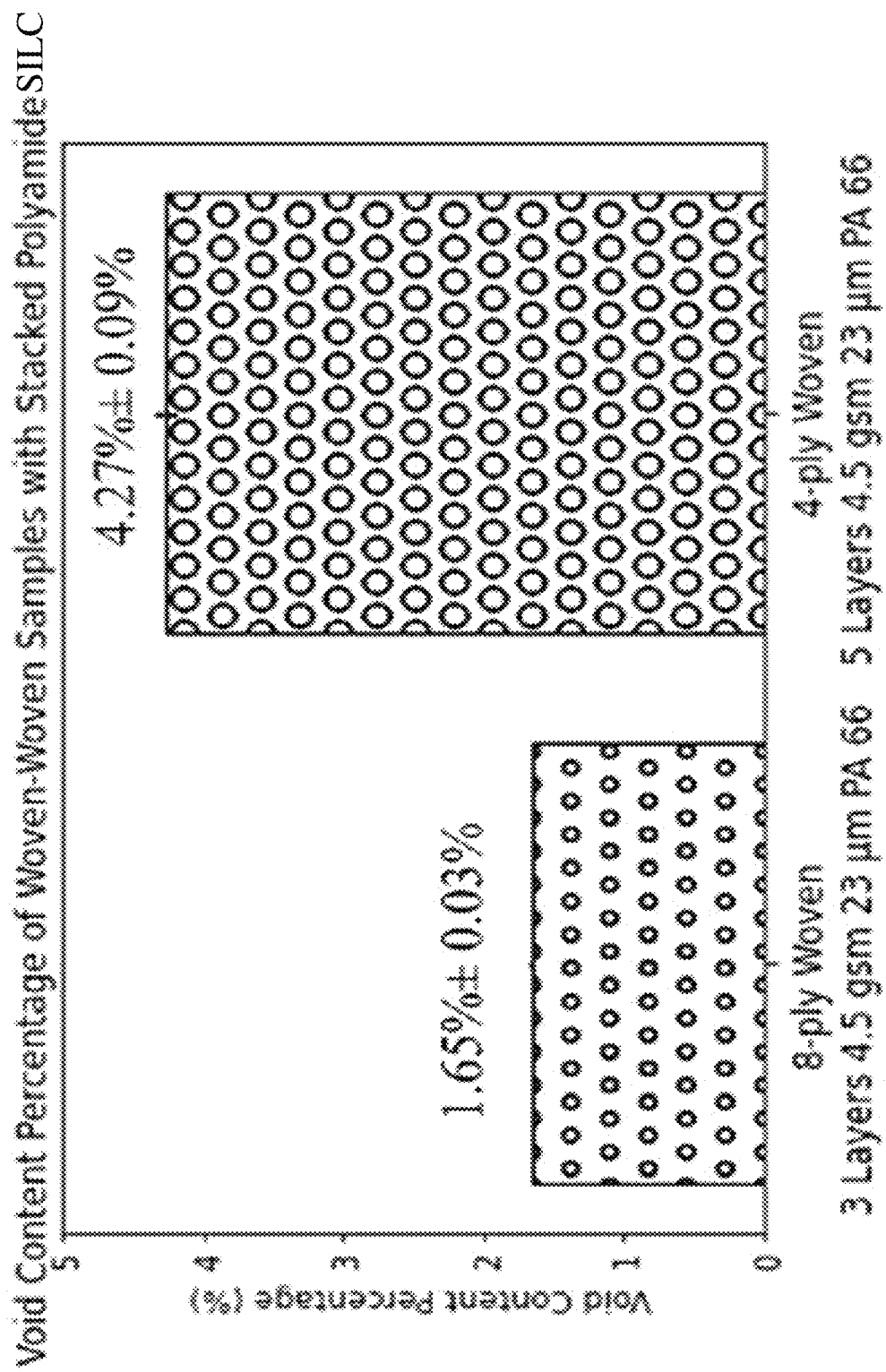
FIG. 40 depicts a void content percentage comparison.

VBO curing of $[0^{Fabric}]_{4s}$ laminates with SILCs integrated in the interlaminar region which has all Woven-Woven interfaces was investigated. FIG. 37 and Table 3 show the various methods and SILC combinations. FIG. 37 shows void content of 8-ply IM7/8552 woven fabric $[0]_{4s}$ laminates cured with various methods and SILC interlayers. All VBO cures with applied SILC interlayers reduced void content compared to the VBO cure with no SILC interlayer which that had a void content percentage of 5.61 vol %. While void content was decreased with the integration of SILCs, voids were not fully eliminated. The laminates did not achieve aerospace-grade quality of a void percentage of under 1 vol % and voids were observed constantly throughout the µCT scans. Representative µCT images of three different specimens are shown in FIGS. 38A-38C. FIGS. 38A-38C show representative µCT images of 8-ply IM7/8552 woven laminates, $[0]_{4s}$, cured via hot plate with various SILCs at all ply interfaces showing: 1) the baseline containing no SILC layers with a void percentage of 5.61 vol % (FIG. 38A); 2) 140 µm aligned CNT SILC with a void percentage of 2.91 vol % (FIG. 38B); and 3) 4.5 gsm 23 µm PA 66 with a void percentage of 3.67 vol % (FIG. 38C). The voids occurred in the same regions in the woven plies as they did in the UD-woven specimens: corner regions and interweave areas. The lowest void content occurred in the specimen with 3 layers of 4.5 gsm 23 µm PA 66 placed in each interlaminar region and had a void content percentage of 1.65 vol %. A 4-ply laminate with 5 layered 4.5 gsm 23 µm PA 66 was also tested but it had a void content percentage of 4.27 vol %. FIG. 39 shows the 8-ply laminate with 3 layers of 4.5 gsm 23 µm PA 66 and the 4-ply laminate with 5 layers of 4.5 gsm 23 µm PA 66 with the void content displayed in FIG. 40. FIG. 39 shows void content of IM7/8552 woven fabric 8-ply $[0]_{4s}$ laminate (green) with 3 layers of 4.5 gsm 23 µm PA 66 in each interface and 4-ply $[0]_{2s}$ laminate (purple) with 5 layers of 4.5 gsm 23 µm PA 66 in each interlaminar region. The void content percentage of the 5 SILC layered 4-ply laminate is higher than the 3 SILC layered 8-ply laminate at 4.27 vol % and 1.65 vol % respectively. FIG. 40 shows void content percentage comparison of 8-ply $[0]_4$ with 3 layers of 4.5 gsm 23 µm PA 66 in each interface and 4-ply $[0]_{2s}$ with 5 layers of 4.5 gsm 23 µm PA 66 in each interface. The increase in void content with additional SILC interlayers led to the conclusion that the continuous increase of EPN SILC material thicknesses would not lead to void removal in woven fabric plies, and SILC thickness has known detrimental effect of increasing interlaminar and laminate thickness.

TABLE 3

Void content of 8-ply IM7/8552 woven laminate fabric $[0]_{4S}$ laminates cured with various methods and SILC interlayers.

| Manufacturing Method | Void Content (vol %) | Standard Error (+/−) | Percent Change from No SILC Specimen (%) |
|---|---|---|---|
| Hot Plate Cure No SILC | 5.62 | 0.05 | 0.0% |
| Hot Plate Cure | 3.67 | 0.07 | −34.7% |

TABLE 3-continued

Void content of 8-ply IM7/8552 woven laminate fabric [0]$_{4S}$ laminates cured with various methods and SILC interlayers.

| Manufacturing Method | Void Content (vol %) | Standard Error (+/−) | Percent Change from No SILC Specimen (%) |
|---|---|---|---|
| Hot Plate Cure 3 Layers 4.5 gsm 23 μm PA 66 | 1.65 | 0.03 | −70.6% |
| Hot Plate Cure 85 μm A-CNT | 3.32 | 0.08 | −40.9% |
| Hot Plate Cure 145 μm A-CNT | 2.92 | 0.05 | −48.1% |
| Hot Plate Cure 80 μm Patterned A-CNT | 3.83 | 0.19 | −31.7% |
| Hot Plate Extended Cure 70 μm A-CNT | 2.55 | 0.05 | −54.6% |

As described herein, investigations into expanding the next generation VBO curing with autoclave-grade prepreg materials into complex geometries and woven prepreg. Increased ply-ply slippage, due to the SILC, can improve ease of manufacture of complex shapes while conveying laminate consolidation benefits. Additionally, A-CNTs and patterned A-CNT arrays were utilized as SILC materials. L-shape geometric laminates were manufactured representing complex geometries that require a curve or a bend expanding VBO+SILC cures into non-2D plate geometries. The L-shape manufacturing process additionally utilized a convection heat source (an oven) as opposed to previous conduction heat sources (hot plate, CNT heater) for VBO+SILC curing. Convection based OoA curing is common in industry and the L-shape specimens verify its compatibility with VBO+SILC cures. The electrospun 4.5 gsm 23 μm PA 66 SILC was utilized as the SILC interlayer material and when cured with a 1 mm thick rubber caul plate, voids were eliminated in both the flat and curved region of the L as observed by both μCT and microscopy. Studies with the woven fabric showed a significant void reduction but not void elimination with the SILC materials tested, though voids were reduced compared to the non-SILC specimens. In the specimens with UD-woven interfaces, voids were suppressed but never eliminated. The best results of the specimens tested had A-CNTs (patterned and non-patterned) with a height of 70-80 μm which had void percentages of under 0.3 vol %. However, upon closer inspection of the μCT scans, rare but large (>200 μm) voids still occurred. In the laminates made with only woven fabric, void content was reduced but never below the aerospace-grade level of 1 vol %, much less eliminated. Two regions were identified as void prone: interweave regions between tows, and corner regions around the perimeter of the elliptical tows. In a specimen with CNTs as the SILC material, no CNTs are observed with microscopy in the interweave and the corner regions leading to the hypothesis that the lack of SILC penetration during transfer in these regions lead to the lack of void reduction. The next generation composite cure methodology of VBO+SILCs for curing autoclave-grade prepreg was demonstrated in convection cures and complex geometries successfully. While the integration of SILCs into the interlaminar regions of laminates with woven prepreg has been shown to reduce voids, it has not lead to complete void elimination yet and work in this area should continue in the future.

FIG. 41 shows a composite layup with PI Aerogel as SILCs. The steps to form the layup include transferring PI Aerogel to prepreg plies, peeling off backing paper on one side of the pre-preg plies, placing directly on PI aerogel, cutting out ply-aerogel by vertically compress a razor blade into the aerogel/backing paper. It can be important to avoid a sliding motion. The final step includes lifting the ply-aerogel for laminate layup.

Figure 42:
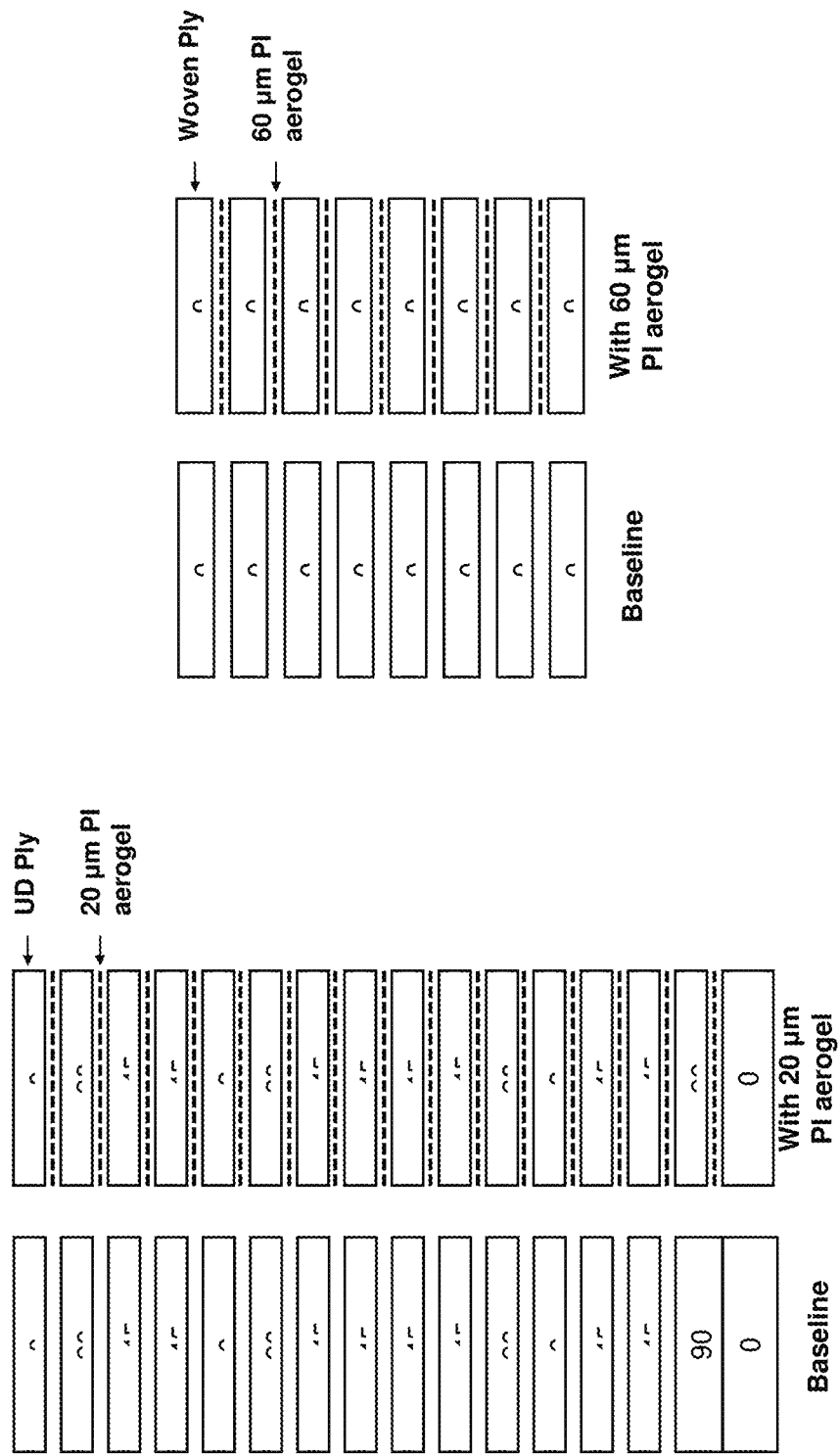
FIG. 42 depicts two sample structures that were tested.
Figure 43:
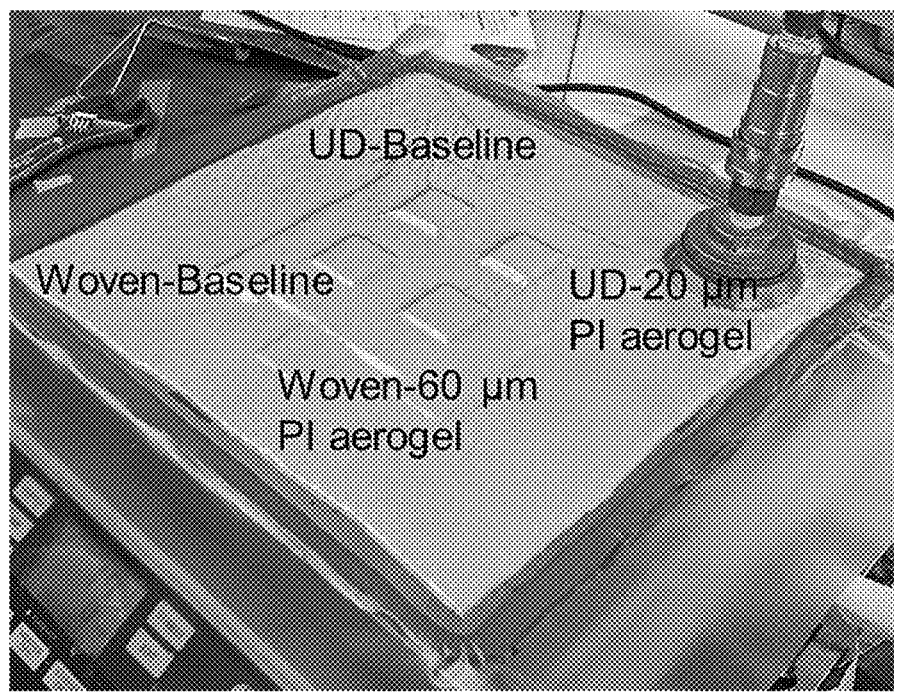
FIG. 43 depicts a vacuum bag apparatus for curing the composites.

FIG. 42 shows two baselines and two samples with PI aerogels as SILCs fabricated:
  1"×1" 16-ply quasi-isotropic [0/90/+45/−45]$_2$s UD IM7/8552 with 20 μm PI aerogel at all interfaces+baseline
  1"×1" 8-ply [0]4s Woven IM7/8552 with 60 μm PI aerogel at all interfaces+baseline The composites were hot plate cured under vacuum-bag-only conditions. FIG. 43 shows an example of a set up for curing.

Figure 44:
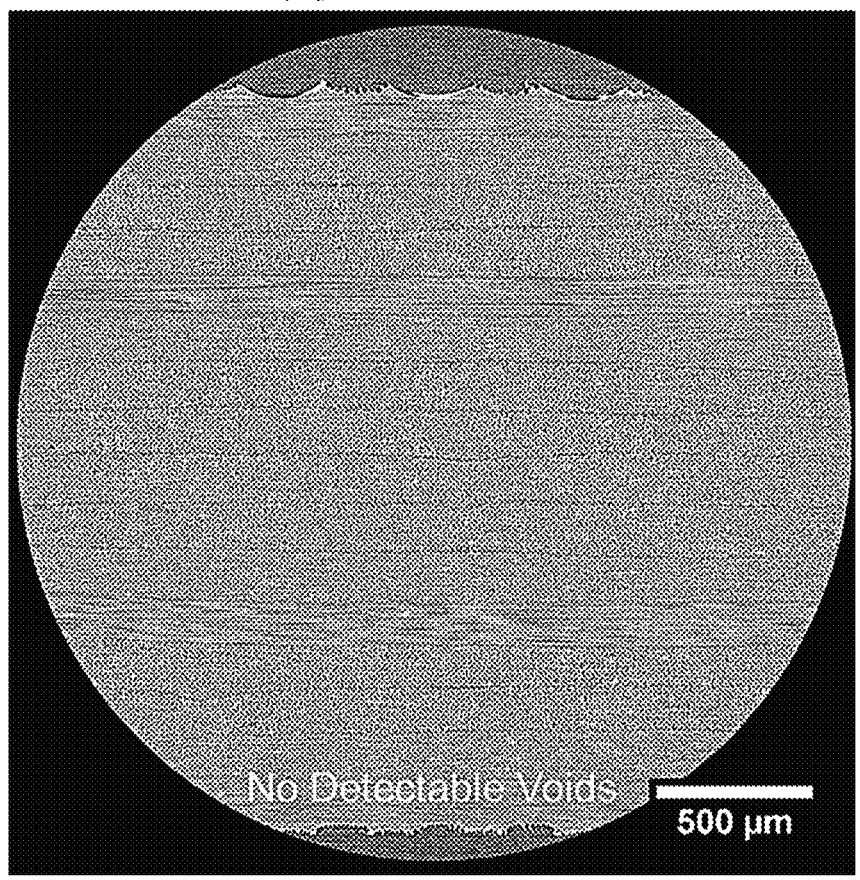
FIG. 44 depict void test results.
Figure 45:
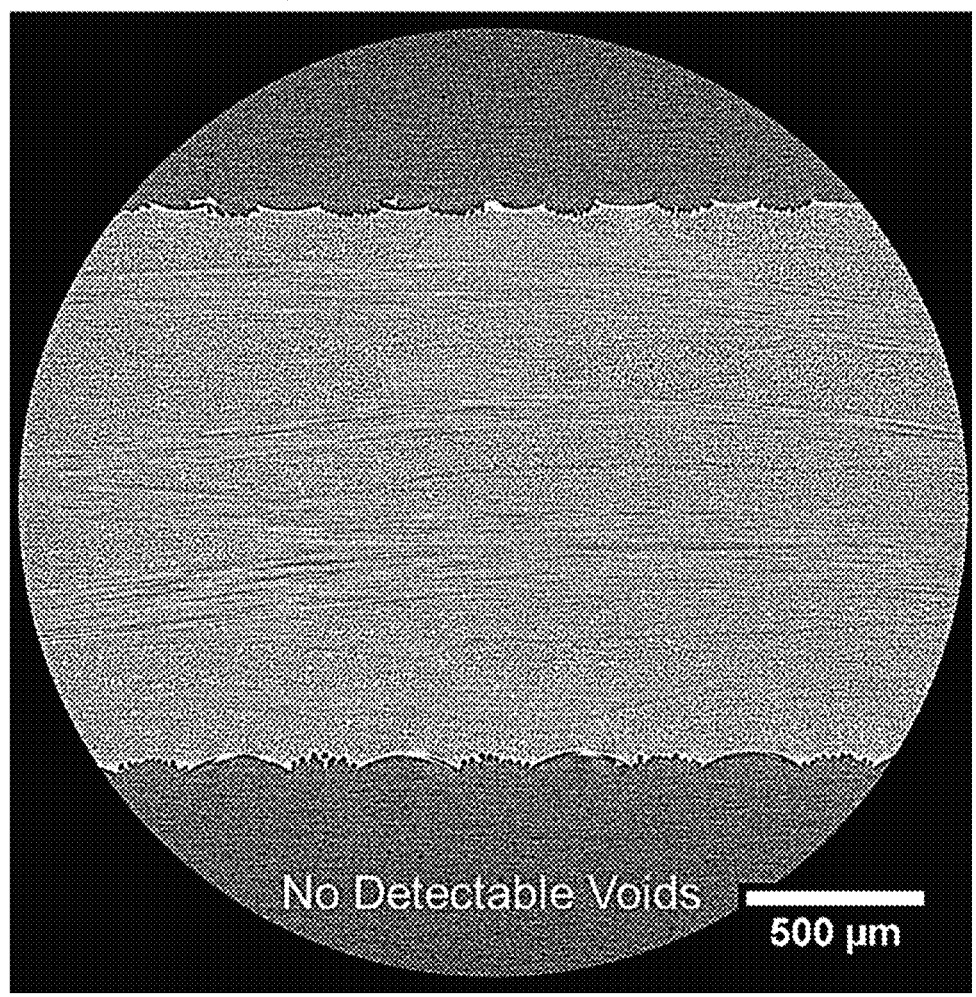
FIG. 45 depict void test results.

FIGS. 44 and 45 are μCT results showing both UD & Woven IM7/8552 showed no voids using an aerogel SILC.

Figure 46:
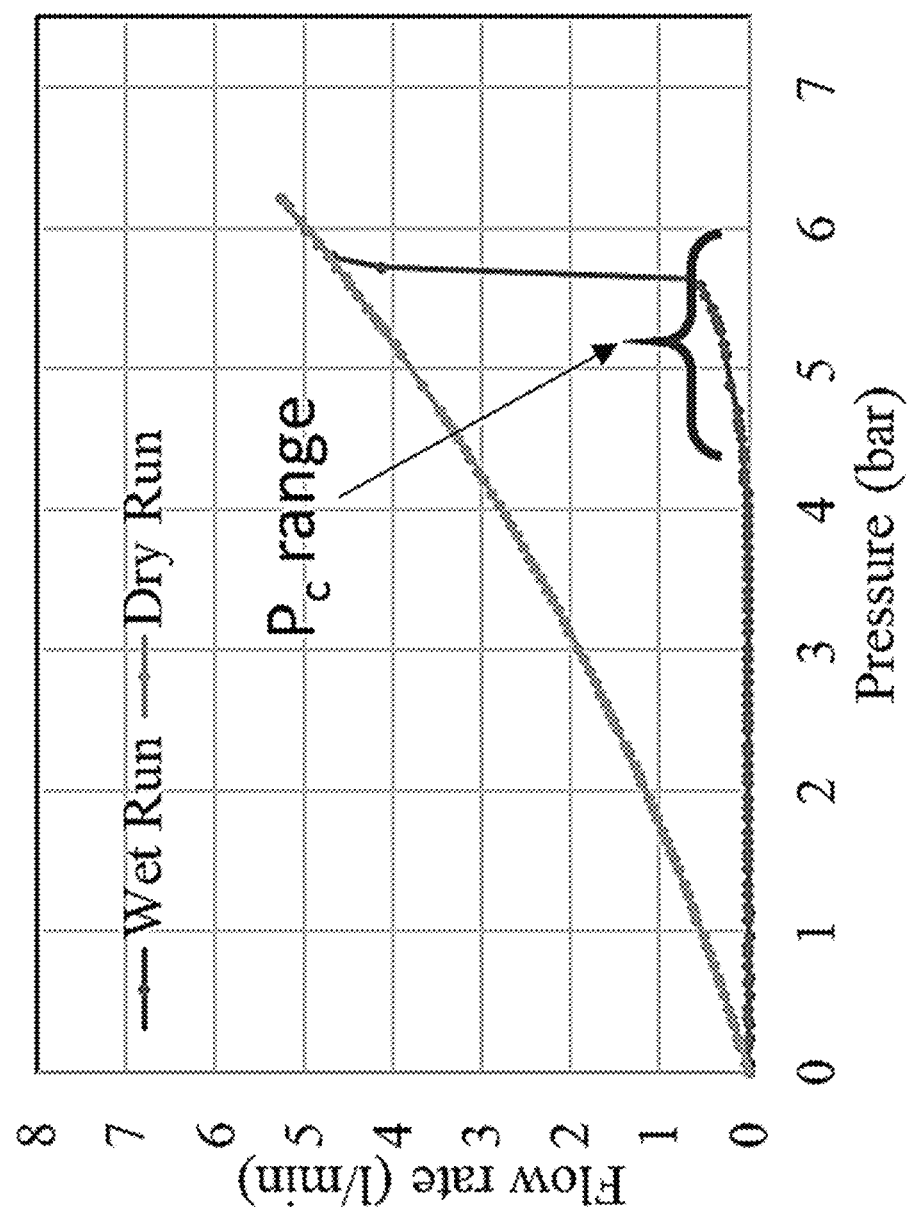
FIG. 46 shows capillary measurements.

FIG. 46 shows capillary measurements on PI aerogel (200 μm thickness) using a capillary flow porometer (PO-ROLUX™) under the following conditions:
  Testing fluid: porefil 125 (perfluoroether)
  Testing fluid surface tension: 16.39±0.02 mN/m
  Estimated capillary pressure achievable with epoxy resin (θepoxy=20° and γepoxy=40 mN/m):
  P$_{c, epoxy}$=0.92-1.49 MPa The following formula was used to determine the capillary pressure with epoxy resin.

$$P_c = \frac{2\sigma\cos\theta}{r_m} \cdot n \quad n: \text{shape factor } 0.715$$

Figure 47:
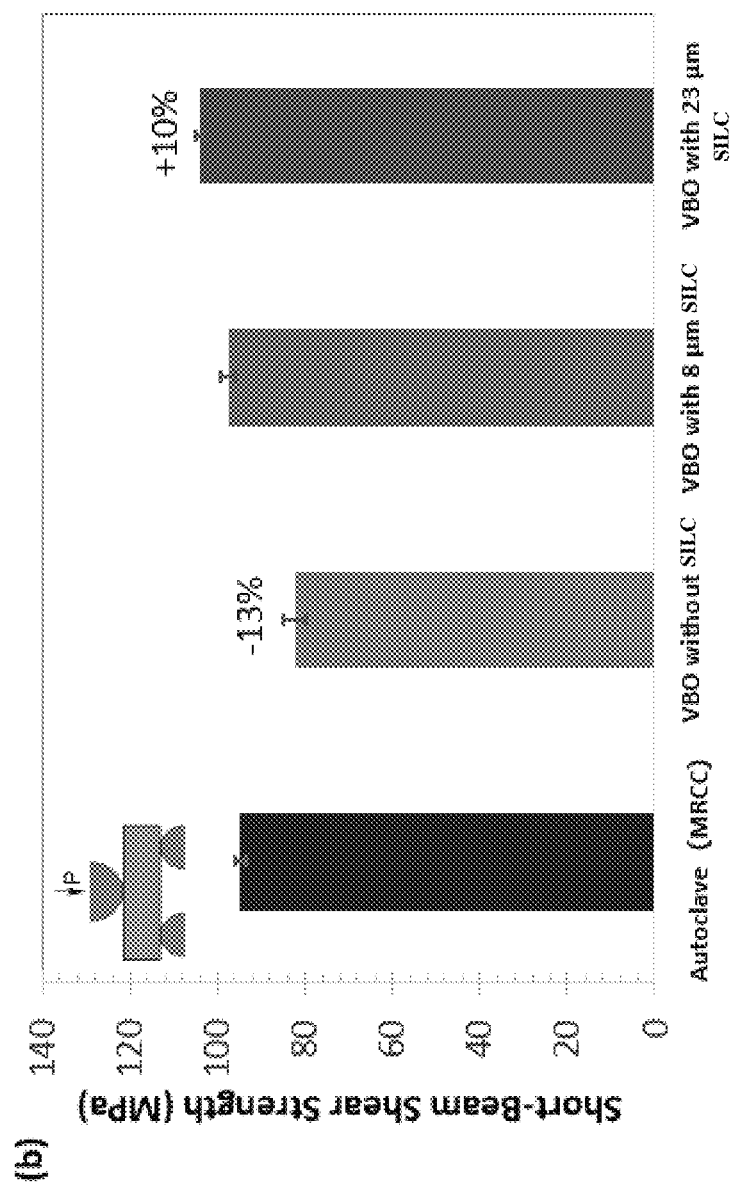
FIG. 47 is a chart comparing a short-beam shear strength of composite laminates manufactured using an autoclave, vacuum bag only, a vacuum bag with a (SILC) polymer with a thickness of 8 μm, and a vacuum bag with a SILC polymer with a thickness of 23 μm, in accordance with exemplary embodiments.

FIG. 47 is a chart comparing a short-beam shear strength of composite laminates manufactured using an autoclave, vacuum bag only, a vacuum bag with a SILC polymer with a thickness of 8 μm, and a vacuum bag with a SILC polymer with a thickness of 23 μm, in accordance with exemplary embodiments. FIG. 47 depicts the differences in short-beam shear strength of composite laminates manufactured using different techniques. A composite laminate that is manufactured using an autoclave with a manufacturer recommended cure cycle can withstand a downward normal pressure of 95 megapascals (MPa) before the composite laminate becomes structurally compromised. A composite laminate that is manufactured using a vacuum bag only (VBO) can withstand a downward normal pressure of 80 megapascals (MPa) before the composite laminate becomes structurally compromised. The composite laminate that is manufactured can withstand 13% less MPa of pressure than the composite laminate manufactured using the autoclave. However a composite laminate that is manufactured using a vacuum bag with a SILC having a thickness of 8 μm can withstand a downward normal pressure of 96 megapascals (MPa) before the composite laminate becomes structurally compromised. And a composite laminate that is manufactured using a vacuum bag with a SILC having a thickness of 23 μm can withstand a downward normal pressure of 100 megapascals (MPa) before the composite laminate becomes structurally compromised. Manufacturing the composite laminate using a combination of the vacuum bag with the SILC can result in an increase in the short-beam shear strength of the composite laminate. For example, manufacturing a composite laminate using the vacuum bag along with the SILC that has a thickness of 23 μm can increase the short-beam shear strength by 10% in comparison to a composite laminate that is manufactured using the autoclave with a manufacturer recommended cure cycle.

Figure 48:
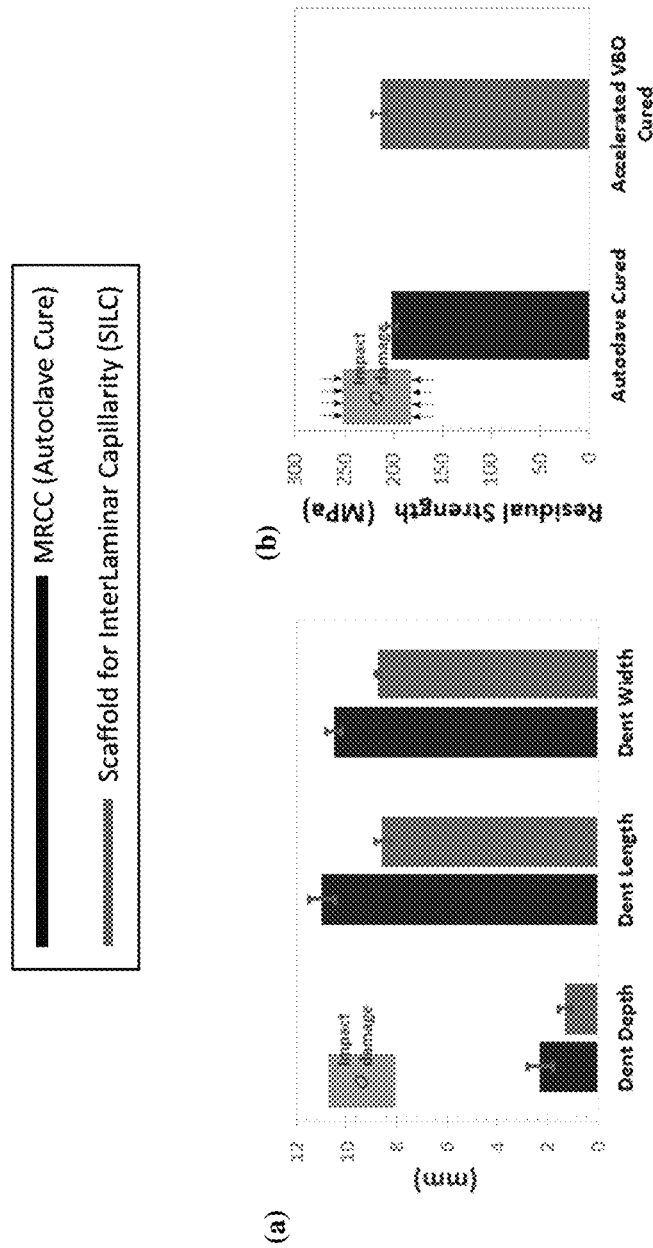
FIG. 48a shows a comparison of dent depth, length, and width in response to an impact force for a vacuum bag only cured composite laminate and an autoclave cured laminate, in accordance with exemplary embodiments.
FIG. 48b shows a comparison of the compression after impact (CAI) residual strength in response to an impact force for a vacuum bag only cured composite laminate and an autoclave cured laminate, in accordance with exemplary embodiments.

FIG. 48a shows a comparison of dent depth, length, and width in response to an impact force for a vacuum bag only cured composite laminate and an autoclave cured composite laminate, in accordance with exemplary embodiments. FIG. 48a shows that the depth, length, and width of a dent, caused by an impact to a composite laminate that is cured using an autoclave is greater than the depth, length, and width of a dent to a composite laminate that is cured using an accelerated vacuum bag only. The accelerated vacuum bag only includes a polymer SILC. Because the dimensions of the dent are decreased when the composite laminate is cured using the accelerated vacuum bag, that means that the composite laminate that is cured using the accelerated vacuum bag is more resilient in the face of obstacles that may hit it. The accelerated vacuum bag cured composite laminate represents an improvement over the autoclave cured composite laminate, because of this enhanced resilience. As a result, a composite laminate that is cured using the accelerated vacuum bag experiences an impact damage that is less than the impact damage experienced by a composite laminate that is cured using the autoclave. The impact damage can be defined as any impact that is normal to the composite laminate or nearly normal to the composite laminate.

FIG. 48b shows a comparison of the compression after impact (CAI) residual strength in response to an impact force for a vacuum bag only cured composite laminate and an autoclave cured laminate, in accordance with exemplary embodiments. The impact damage shown in FIG. 48b is representative of the damage experienced by a composite laminate that is cured using an autoclave or a polymer SILC, when the composite laminate experiences a compressive force. The composite laminate cured with an autoclave and the composite laminate cured with a polymer SILC were both subject to the same impact energy via falling mass following in accordance with the ASTM D4812 and ASTM D7137 standards in order to measure post-impact strength. The residual strength, measured in MPa, in response to a compressive force applied to a composite laminate that is cured using an autoclave is less than the residual strength of a composite laminate that is cured using the accelerated VBO and in response to the same compressive force. The residual strength of the composite laminate that is cured using the autoclave is approximately 200 MPa, whereas the residual strength of the composite laminate that is cured using the accelerated VBO is approximately 210 MPa. The difference in residual strength between the composite laminate cured with the accelerated VBO and the autoclave represents an improvement of the accelerated VBO cured composite laminate over the autoclave cured composite laminate.

Figure 49:
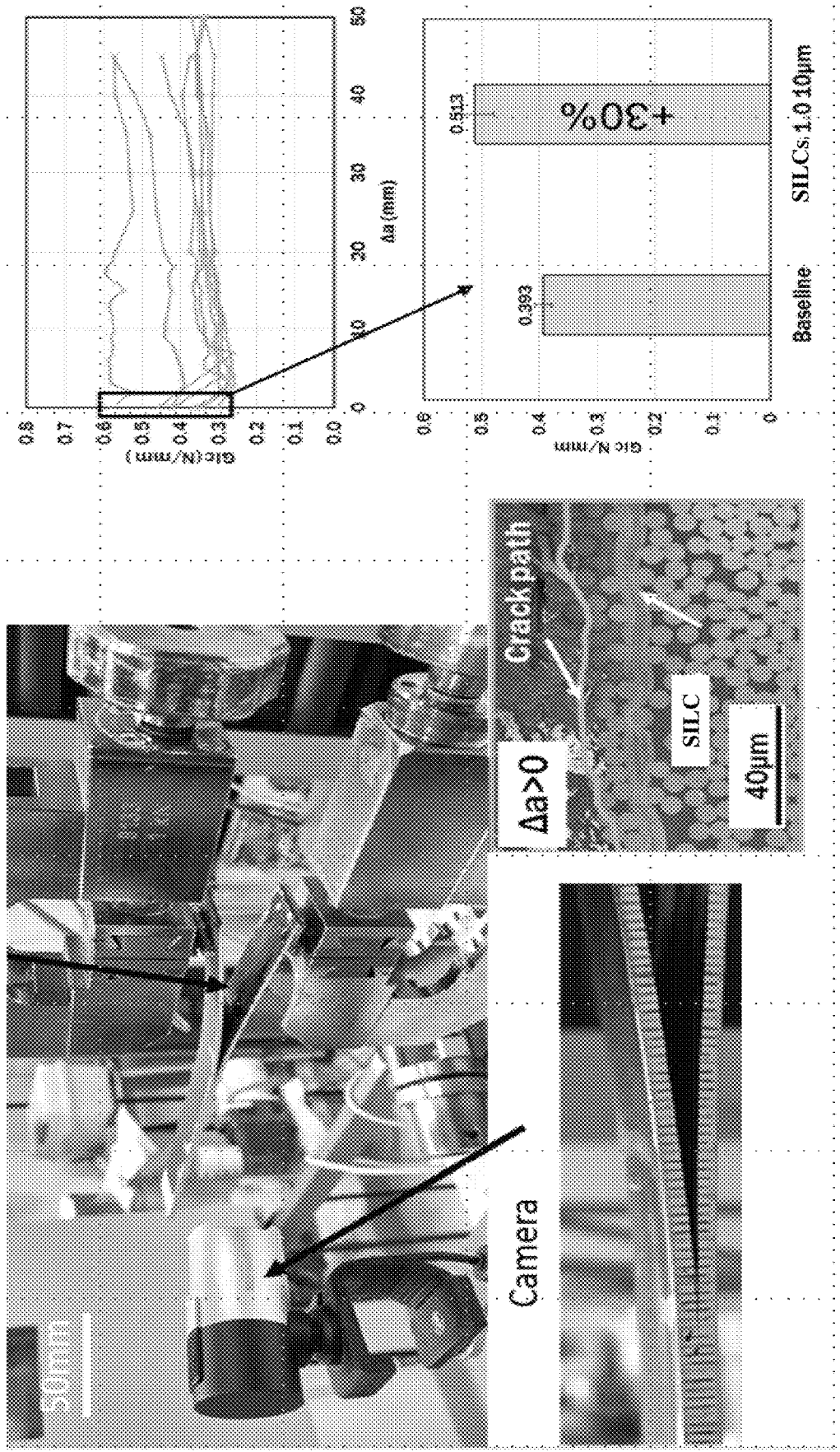
FIG. 49 shows a standard double cantilever beam experimental setup per American Society for Testing and Materials (ASTM) D5528 for measuring Mode I Interlaminar Fracture Toughness GIc.

FIG. 49 shows a standard double cantilever beam experimental setup per ASTM D5528 for measuring Mode I Interlaminar Fracture Toughness GIc. FIG. 49 illustrates how the presence of SILC provides a level of toughness that the crack moves outside of the interlaminar region to avoid propagating through it. The effective fracture toughness is increased by 30%. As opposed to conventional composite laminates, that are not made with SILCs, the presence of the SILC as shown in FIG. 49 is not compromised because the added toughness of the SILC forces any cracks that are formed in the composite laminate to travel along a crack path that is within the intralaminar region. Because the crack formation is within the intralaminar region of the composite laminate, which in FIG. 49 is a double cantilevered beam, the crack does not compromise the SILC, but rather a region of the double cantilevered beam that is not occupied by the SILC. A cantilevered beam that does not include the SILCs as disclosed herein are more susceptible to splitting with even less force because they do not include a SILC network providing the same structure and support as that provided in the cantilevered beam as show in FIG. 49.

FIG. 50 shows a standard end-notched flexture experimental setup per ASTM D7905 for measuring Mode II Interlaminar Fracture Toughness GIIc. FIG. 50 illustrates that the effective fracture toughness is increased by the presence of SILC by over 30%.

TABLE 4

Summary of mechanical test data with standard error for autoclave cured CFRP and accelerated VBO cured CFRP (with polymer SILC).

| Mechanical Test (mean ± SE) | Autoclave (MRCC) Cured | Accelerated VBO (with Polymer SILC) Cured | Change |
|---|---|---|---|
| Short-Beam Shear | | | |
| SBS strength (MPa) | 94.8 ± 1.35 | 100.5 ± 1.5 | +6% |
| Tension | | | |
| Tensile strength (MPa) | 827.9 ± 16.2 | 855.4 ± 12.2 | — |
| Tensile modulus (GPa) | 56.7 ± 0.6 | 57.2 ± 0.15 | — |
| Compression | | | |
| Compressive strength (MPa) | 493.2 ± 3.9 | 581.4 ± 13.8 | +18% |
| Compressive modulus (GPa) | 54.1 ± 1.0 | 50.1 ± 1.4 | −7% |
| Open-Hole Compression | | | |
| OHC strength (MPa) | 346.3 ± 8.4 | 362.0 ± 3.3 | +5% |
| Bearing Tension | | | |
| Bearing strength (MPa) | 934.2 ± 55.7 | 970.5 ± 29.8 | — |
| Compression After Impact | | | |
| CAI residual strength (MPa) | 201.6 ± 6.2 | 213.7 ± 7.6 | — |
| Dent depth (mm) | 2.3 ± 0.5 | 1.3 ± 0.3 | −43.4% |
| Dent length (mm) | 11.0 ± 0.5 | 8.6 ± 0.3 | −21.8% |
| Dent width (mm) | 10.5 ± 0.3 | 8.7 ± 0.1 | −17.1% |

Table 4 provides a number or metrics illustrating the benefits of a CFRP that is cured using an accelerated VBO in comparison to a CFRP that is cured using an autoclave.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:

1. A multiscale composite material stack-up comprising:
one or more planar fibrous layers comprising micron scale fibers that are substantially continuous and aligned in a single unidirectional arrangement or a multidirectional planar weave;
one or more planar porous layers with a porosity of no less than 50% that are thinner than the one or more planar fibrous layers, the one or more planar porous layers formed by nanoscale electrospun polymer fibers, and a distribution of structural elements and pore regions within the nanoscale electrospun polymer fiber layers, wherein the pore regions are defined by spaces between the structural elements, and a geometry and the distribution of the structural elements results in the pore regions having a regular pore size distribution,
wherein the structural elements take the form of one or more of fibers, tubes, gels, foams or lattices, and the structural elements comprise organic polymers made from carbon, nitrogen, boron, and oxygen and include a covalent organic network, or inorganic network of silicon, oxide, nitride or carbide compounds and metals, or a combination of the covalent organic network and the inorganic network comprising a polymer-reinforced inorganic structure, and the structural elements are made by growing, printing, molding, forming, depositing, electrospinning, etching or solvent evaporation, and
a polymer matrix that penetrates and binds the one or more planar fibrous layers and the one or more planar porous layers during a curing, forming or heat treatment process;
wherein the geometry and the distribution of the structural elements and the regular pore size distribution of the pore regions of the one or more planar porous layers are configured to:
promote capillary pressure and infusion of the polymer matrix through the one or more planar porous layers, and
reduce void content of the multiscale composite material stack-up after the polymer matrix penetrates through the one or more fibrous layers.

2. The multiscale composite material stack-up of claim 1, wherein the one or more planar porous layers are less than half the thickness of the one or more planar fibrous layers.

3. The multiscale composite material stack-up of claim 1, wherein at least one of the one or more planar fibrous layers comprise carbon, glass, aramid, boron or polymer-based fibers.

4. The multiscale composite material stack-up of claim 1 further comprising:
either one or more non-fibrous layers or one or more non-porous layers in the multiscale composite material stack-up, wherein the one or more non-fibrous layers and the one or more non-porous layers include polymer sheets or metal foils.

5. The multiscale composite material stack-up of claim 1, wherein the polymer matrix is either a thermoset or a thermoplastic.

6. The multiscale composite material stack-up of claim 1, wherein the polymer matrix is pre-infused within the one or more planar fibrous layers or the one or more planar porous layers, or the polymer matrix is pre-infused within the one or more planar fibrous layers and the one or more planar porous layers.

7. The multiscale composite material stack-up of claim 6, wherein the one or more planar fibrous layers are discrete layers, the one or more porous layers are discrete layers, and the one or more planar fibrous layers and the one or more porous layers are pre-assembled to form a first planar hybrid layer that can be packaged and stored together, and
wherein the first planar hybrid layer is stacked together with at least a second planar hybrid layer that is pre-assembled in a manner similar to the first planar hybrid layer prior to the polymer matrix penetrating and binding the first planar hybrid layer and the second planar hybrid layer.

8. The multiscale composite material stack-up of claim 6, wherein the polymer matrix is curable in an autoclave oven under pressure, temperature and vacuum.

9. The multiscale composite material stack-up of claim 8, wherein the one or more planar porous layers provide an internal capillary pressure sufficient to promote the polymer matrix to penetrate the one or more planar fibrous layers without a need for an externally applied pressure from an autoclave oven.

10. The multiscale composite material stack-up of claim 9, wherein the multiscale composite material stack-up is manufactured conductively on a heated mold tool.

11. The multiscale composite material stack-up of claim 1, wherein at least a portion of the one or more planar porous layers are microporous, mesoporous, or macroporous.

12. The multiscale composite material stack-up of claim 1, wherein the one or more planar porous layers improves post-manufactured interlaminar strength or toughness of the multiscale composite material stack-up after the polymer matrix penetrates and binds the one or more fibrous layers.

13. A fabrication process for manufacturing a multiscale composite material, including:
providing a multiscale composite material stack-up including:
one or more planar fibrous layers comprising micron scale fibers that are substantially continuous and aligned in a single unidirectional arrangement or a multidirectional planar weave;
one or more planar porous layers with a porosity of no less than 50% that are thinner than the one or more planar fibrous layers, the one or more planar porous layers formed by nanoscale electrospun polymer fibers and a distribution of structural elements and pore regions within the nanoscale electrospun polymer fiber layers, wherein the pore regions are defined by spaces between the structural elements and a geometry and the distribution of the structural elements results in the pore regions having a regular pore size distribution,
wherein the structural elements take the form of one or more of fibers, tubes, gels, foams or lattices, and the structural elements comprise organic polymers made from carbon, nitrogen, boron, and oxygen and include a covalent organic network, or inorganic network of silicon, oxide, nitride or carbide compounds and metals, or a combination of the covalent organic network and the inorganic network comprising a polymer-reinforced inorganic structure, and the structural elements are made by growing, printing, molding, forming, depositing, electrospinning, etching or solvent evaporation, and
a polymer matrix that penetrates and binds the one or more planar fibrous layers and the one or more planar porous layers during a curing, forming or heat treatment process;
wherein the geometry and the distribution of the structural elements and the regular pore size distribution of the pore regions of the one or more planar porous layers are configured to:
promote capillary pressure and infusion of the polymer matrix through the one or more planar porous layers, and
reduce void content of the multiscale composite material stack-up after the polymer matrix penetrates through the one or more fibrous layers; and
heating the multiscale composite material stack-up to promote flow of the polymer matrix to penetrate and bind the one or more planar fibrous layers and the one or more planar porous layers during the curing, forming or heat treatment process.

14. The fabrication process of claim 13, wherein the one or more planar porous layers are less than half the thickness of the one or more planar fibrous layers.

15. The fabrication process of claim 13, wherein at least one of the one or more of the planar fibrous layers are comprises carbon, glass, aramid, boron or polymer-based fibers.

16. The fabrication process of claim 13, wherein the multiscale composite material stack further comprises:
   either one or more non-fibrous layers or one or more non-porous layers, and the one or more non-fibrous layers or one or more non-porous layers include polymer sheets or metal foils.

17. The fabrication process of claim 13, wherein the polymer matrix is either a thermoset or a thermoplastic.

18. The fabrication process of claim 13, wherein the polymer matrix is pre-infused within the one or more planar fibrous layers or the one or more planar porous layers or the polymer matrix is pre-infused within the one or more planar fibrous layers and the one or more planar porous layers.

19. The fabrication process of claim 18, wherein the one or more planar fibrous layers are discrete layers, the one or more porous layers are discrete layers, and the one or more planar fibrous layers and the one or more porous layers are pre-assembled to form a first planar hybrid layer that can be packaged and stored together, and wherein the first planar hybrid layer is stacked together with at least a second planar hybrid layer that is pre-assembled in a manner similar to the first planar hybrid layer prior to the polymer matrix penetrating and binding the first planar hybrid layer and the at least second planar hybrid layer.

20. The fabrication process of claim 18, wherein the polymer matrix is curable in an autoclave oven under pressure, temperature and vacuum.

21. The fabrication process of claim 20, wherein the one or more planar porous layers provides an internal capillary pressure sufficient to promote the polymer matrix to penetrate the one or more planar fibrous layers without a need for an externally applied pressure from an autoclave oven.

22. The fabrication process of claim 13, wherein at least a portion of the one or more planar porous layers are microporous, or mesoporous, or macroporous.

23. The fabrication process of claim 13, wherein the one or more planar porous layers improves post-manufactured interlaminar strength or toughness of the multiscale composite material stack-up after the polymer matrix penetrates and binds the one or more fibrous layers.

24. The fabrication process of claim 13, wherein, the heating is applied conductively by one or more heated surfaces, and the heating is provided by a heated mold tool, a heated press, or a heated roller.

25. The fabrication process of claim 13, further comprising:
   applying a vacuum to the multiscale composite material stack-up to remove gaseous volatiles, solvents, and byproducts, while supplying compaction to promote flow of the polymer matrix while the polymer matrix is heated.

* * * * *